United States Patent [19]

Inoue et al.

[11] Patent Number: 5,402,519
[45] Date of Patent: Mar. 28, 1995

[54] NEURAL NETWORK SYSTEM ADAPTED FOR NON-LINEAR PROCESSING

[75] Inventors: Haruki Inoue, Katsuta; Kenichi Nakamura, Hitachiota; Keiji Oshima, Katsuta; Masakazu Yahiro, Hitachi; Minoru Koide, Hitachi; Noboru Abe, Hitachi, all of Japan

[73] Assignees: Hitachi, Ltd., Tokyo; Hitachi Engineering Co., Ltd., Ibaraki, both of Japan

[21] Appl. No.: 797,534

[22] Filed: Nov. 25, 1991

[30] Foreign Application Priority Data

Nov. 26, 1990 [JP] Japan ................... 2-317807
Nov. 30, 1990 [JP] Japan ................... 2-329138
Sep. 11, 1991 [JP] Japan ................... 3-231482

[51] Int. Cl.$^6$ .................... G06F 15/18; G06F 9/44
[52] U.S. Cl. ......................... 395/22; 395/11; 395/900; 395/51; 395/61
[58] Field of Search ............... 395/11, 3, 51, 61, 900, 395/22

[56] References Cited

U.S. PATENT DOCUMENTS

| 5,014,327 | 5/1991 | Potter et al. ............... 382/14 |
| 5,091,864 | 2/1992 | Baji et al. ................ 395/27 |
| 5,159,660 | 10/1992 | Lu et al. ................ 395/22 |
| 5,175,797 | 12/1992 | Funabashi et al. ............. 395/22 |
| 5,195,169 | 3/1993 | Kamiya et al. ............. 395/23 |
| 5,220,373 | 6/1993 | Kanaya ................ 355/204 |

FOREIGN PATENT DOCUMENTS

| 378689 | 7/1990 | European Pat. Off. . |
| 1082133 | 3/1989 | Japan ............ G06F 9/44 |
| 1201764 | 8/1989 | Japan ............ G06F 15/18 |
| 1241667 | 9/1989 | Japan ............ G06F 15/18 |
| 1243102 | 9/1989 | Japan ............ G05B 13/00 |
| 2098770 | 4/1990 | Japan ............ G06F 15/18 |
| 2292602 | 12/1990 | Japan ............ G05B 13/02 |

OTHER PUBLICATIONS

Eppler, W., "Implementation of Fuzzy Production Systems with Neural Networks," Parallel Processing in Neural Systems and Computers, 1990, 249–252.
Kamisaka et al., "Algorithm of Pattern Recognition and Learning", Bunichi Sougou Shuppan Co., Ltd.
Lippmann, R. P., "An Introduction to Computing with Neural Nets," IEEE ASSP Magazine, Apr. 1987, 4–20.
Keller et al., "Fuzzy Logic Inference Neural Networks," SPIE vol. 1192 Intelligent Robots and Computer Vision, 1989, 582–591.
Johnson, R. C., "Japan clear on fuzzy-neural link," Electronic Engineering Times, Aug. 20, 1990, 1, 16.
Berenji, H., "Neural networks and Fuzzy Logic in Intelligent Control," Proc. 5th IEEE Intl. Symp. on Intelligent Control, Sep. 1990, 916–920.
Amano, Akio, et al. "On the Use of Neural Networks and Fuzzy Logic in Speech Recognition," IJCNN International Joint Conference on Neural Networks, Jun. 19, 1989, pp. 301–305.

(List continued on next page.)

Primary Examiner—Robert W. Downs
Attorney, Agent, or Firm—Antonelli, Terry, Stout & Kraus

[57] ABSTRACT

A neural network system includes a qualitative evaluation section, a neural network section, a quantifying section and a display section. The qualitative evaluation section qualitatively analyzes an unknown data supplied thereto, and normalizes the result of analysis within a predetermined range. The neural network section having a neural network with plural neurons computes the network output data from the normalized unknown data produced by the qualitative evaluation section. Each neuron is connected to plural other neurons through synapses, each of which is assigned an individual weight coefficient. Each neuron is adapted to output an output function value assigned thereto associated with the total sum of the products of the output from the neurons connected thereto and the synapse weight coefficient. The quantifying section quantifies the network output data to produce desired data. The desired data thus produced is displayed on the display section.

15 Claims, 44 Drawing Sheets

OTHER PUBLICATIONS

Hutchinson, R. A. and W. J. Welsh, "Comparison of Neural Networks and Conventional Techniques for Feature Location in Facial Image," *First IEE International Conference on Artificial Neural Networks*, Oct. 16, 1989, pp. 201–205.

Mascia, Antoine H. And Rokuya Ishii, "Neural Net Implementation on Single-Chip Digital Signal Processor," *IECON89: 15th Annual Conference of IEE Industrial Electronics Society*, Nov. 6, 1989, pp. 764–769.

Perfetti, R., "$L_1$ Normalisation in Neural Networks Using Parallel Automatic Level Control," *Electronics Letters*, Jan. 181, 990, pp. 82–84.

10-1 PRODUCT VALUE TABLE

| | 0 | 1 | 2 | 3 | 4 | ... | $2^c-1$ |
|---|---|---|---|---|---|---|---|
| 0 | 0 | 0 | 0 | 0 | 0 | | 0 |
| 1 | 0 | 1 | 2 | 3 | 4 | | $2^c-1$ |
| 2 | 0 | 2 | 4 | 6 | 8 | | $2^c$ |
| 3 | 0 | 3 | 6 | 9 | 12 | | $3*(2^c-1)$ |
| 4 | 0 | 4 | 8 | 12 | 16 | | $4*(2^c-1)$ |
| 5 | 0 | 5 | 10 | 15 | 20 | | $5*(2^c-1)$ |
| 6 | 0 | 6 | 12 | 18 | 24 | | $6*(2^c-1)$ |
| 7 | 0 | 7 | 14 | 21 | 28 | | $7*(2^c-1)$ |
| 8 | 0 | 8 | 16 | 24 | 32 | | $8*(2^c-1)$ |
| ... | | | | | | | |
| $2^b-1$ | 0 | $2^b-1$ | $2^b$ | $3*(2^b-1)$ | $4*(2^b-1)$ | | $(2^b-1)*(2^c-1)$ |

10-2 SIGMOID FUNCTION VALUE TABLE $-P_x2^{b+c}$
$-P_x2^{b+c}+1$
$-P_x2^{b+c}+2$
$-P_x2^{b+c}+3$
$-P_x2^{b+c}+4$
------
$-1$
$0$    0.5
$1$
------
$-P_x2^{b+c}$

FIG. 17A

PRODUCT VALUE TABLE (b=c=11, RANGE FROM -1000 TO 1000)

10-1a

|      | -1000    | -999    | -998    | ... | 0 | ... | 998     | 999     | 1000     |
|------|----------|---------|---------|-----|---|-----|---------|---------|----------|
| -1000| 1000000  | 999000  | 998000  |     | 0 |     | -998000 | -999000 | -1000000 |
| -999 | 999000   | 998001  | 997002  |     | 0 |     | -997002 | -998001 | -999000  |
| -998 | 998000   | 997002  | 996004  |     | 0 |     | -996004 | -997002 | -998000  |
| ...  |          |         |         |     |   |     |         |         |          |
| -2   | 2000     | 1998    | 1996    |     | 0 |     | -1996   | -1998   | -2000    |
| -1   | 1000     | 999     | 998     |     | 0 |     | -998    | -999    | -1000    |
| 0    | 0        | 0       | 0       |     | 0 |     | 0       | 0       | 0        |
| 1    | -1000    | -999    | -998    |     | 0 |     | 998     | 999     | 998      |
| 2    | -2000    | -1998   | -1996   |     | 0 |     | 1996    | 1998    | 2000     |
| ...  |          |         |         |     |   |     |         |         |          |
| 998  | -998000  | -997002 | -996004 |     | 0 |     | 996004  | 997002  | 998000   |
| 999  | -999000  | -998001 | -997002 |     | 0 |     | 997002  | 998001  | 999000   |
| 1000 | -1000000 | -999000 | -998000 |     | 0 |     | 998000  | 999000  | 1000000  |

FIG. 17B

SIGMOID FUNCTION VALUE TABLE 10-2a

| -10000000 | 0    |
|-----------|------|
| -9999999  | 0    |
| -9999998  | 0    |
| ...       | ---- |
| -2        |      |
| -1        |      |
| 0         | 500  |
| 1         |      |
| 2         |      |
| 3         |      |
| ...       | ---- |
| 9999998   | 1000 |
| 9999999   | 1000 |
| 10000000  | 1000 |

VALUE OF $\delta = \dfrac{1}{1+e^{-(S/1000000)}} \times 1000$ STORED $S = P \times (\pm 1000000 \equiv -10000000)$ (P=10; MAX NUMBER OF LAYER NEURONS)

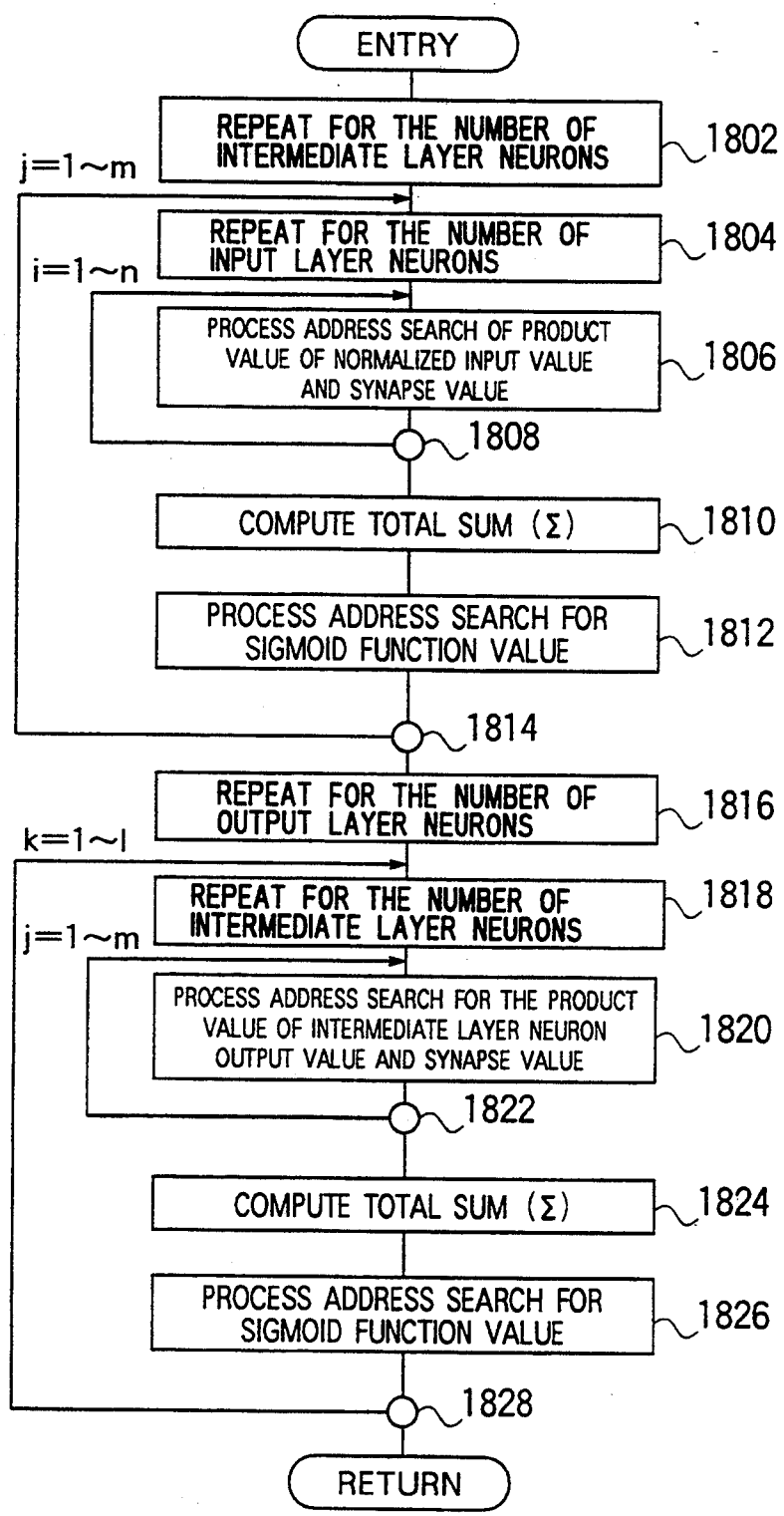

FIG. 19

| PROCESS | COMPUTATION TYPE | PRIOR ART | INVENTION |
|---|---|---|---|
| C (INPUT VALUE X SYNAPSE WEIGHT) | ADDRESS (ta) | | n x m |
| | SUM (tadd) | | |
| | PRODUCT (tm) | n x m | |
| D (TOTAL SUM ($\Sigma$)) | ADDRESS (ta) | | |
| | SUM (tadd) | m | m |
| | PRODUCT (tm) | | |
| E (COMPUTATION OF SIGMOID FUNCTION) | ADDRESS (ta) | | m |
| | SUM (tadd) | m | |
| | PRODUCT (tm) | 2 x m | |
| H (INTERMEDIATE LAYER NEURON OUTPUT VALUE X SYNAPASE WEIGHT) | ADDRESS (ta) | | m x l |
| | SUM (tadd) | | |
| | PRODUCT (tm) | m x l | |
| I (TOTAL SUM ($\Sigma$)) | ADDRESS (ta) | | |
| | SUM (tadd) | l | l |
| | PRODUCT (tm) | | |
| J (COMPUTATION OF SIGMOID FUNCTION) | ADDRESS (ta) | | l |
| | SUM (tadd) | l | |
| | PRODUCT (tm) | 2 x l | |
| TOTAL | ADDRESS (ta) | 0 | n x m + m x l |
| | SUM (tadd) | 2 x (m + l) | m + l |
| | PRODUCT (tm) | (N+2) x m + (m+2) x l | 0 |
| COMPARISON OF PROCESSING TIME (HYPOTHETICAL) ta= 1 ($\mu$s) tadd= 5 ($\mu$s) tm=50 ($\mu$s) (n=m=l=100 (NEURONS)) | | 1,022,000 ($\mu$s) =1,022 (ms) | 21,000 ($\mu$s) =21 (ms) |

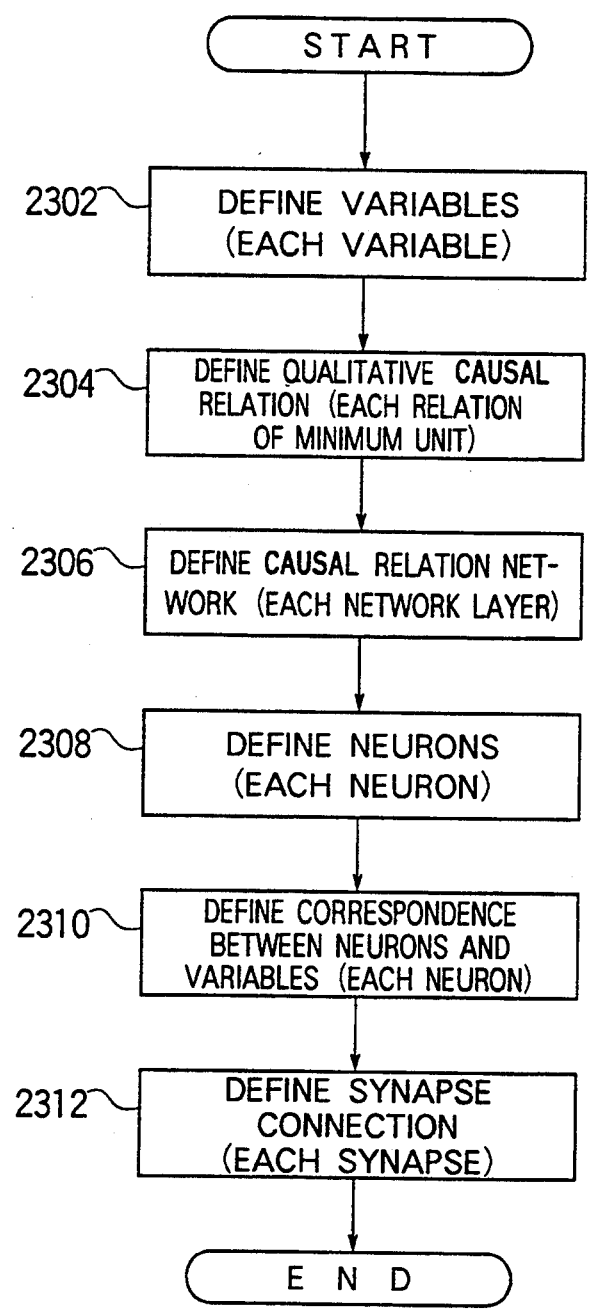

FIG. 24A 10-3

| VARIABLE NO. | VARIABLE NAME |
|---|---|
| 1 | |
| 2 | |
| 3 | |
| 4 | |
| 5 | |
| 6 | |
| 7 | |

FIG. 24B 10-4

| INPUT VARIABLE NO. | OUTPUT VARIABLE NO. |
|---|---|
| 1 | 5 |
| 2 | |

| INPUT VARIABLE NO. | OUTPUT VARIABLE NO. |
|---|---|
| 3 | 6 |
| 4 | |

| INPUT VARIABLE NO. | OUTPUT VARIABLE NO. |
|---|---|
| 5 | 7 |
| 6 | |

FIG. 24C 10-5

| SERIAL NO. | 1ST LAYER | 2ND LAYER | 3RD LAYER |
|---|---|---|---|
| #1 | 1 | 5 | 7 |
| #2 | 2 | 6 | |
| #3 | 3 | | |
| #4 | 4 | | |

FIG. 25A

| NEURON NO. | NEURON NAME |
|---|---|
| 1 | |
| 2 | |
| 3 | |
| 4 | |
| 5 | |
| 6 | |
| 7 | |

| VARIABLE NO. | NEURON NO. |
|---|---|
| 1 | 1 |
| 2 | 2 |
| 3 | 3 |
| 4 | 4 |
| 5 | 5 |
| 6 | 6 |
| 7 | 7 |

10-7

(1 : SYNAPSES CONNECTED)

FIG. 28
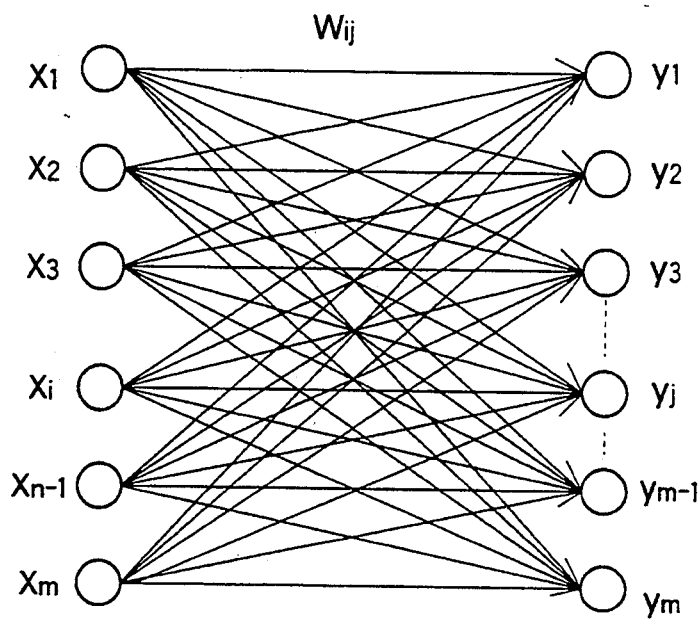
IMPROVED SPEED
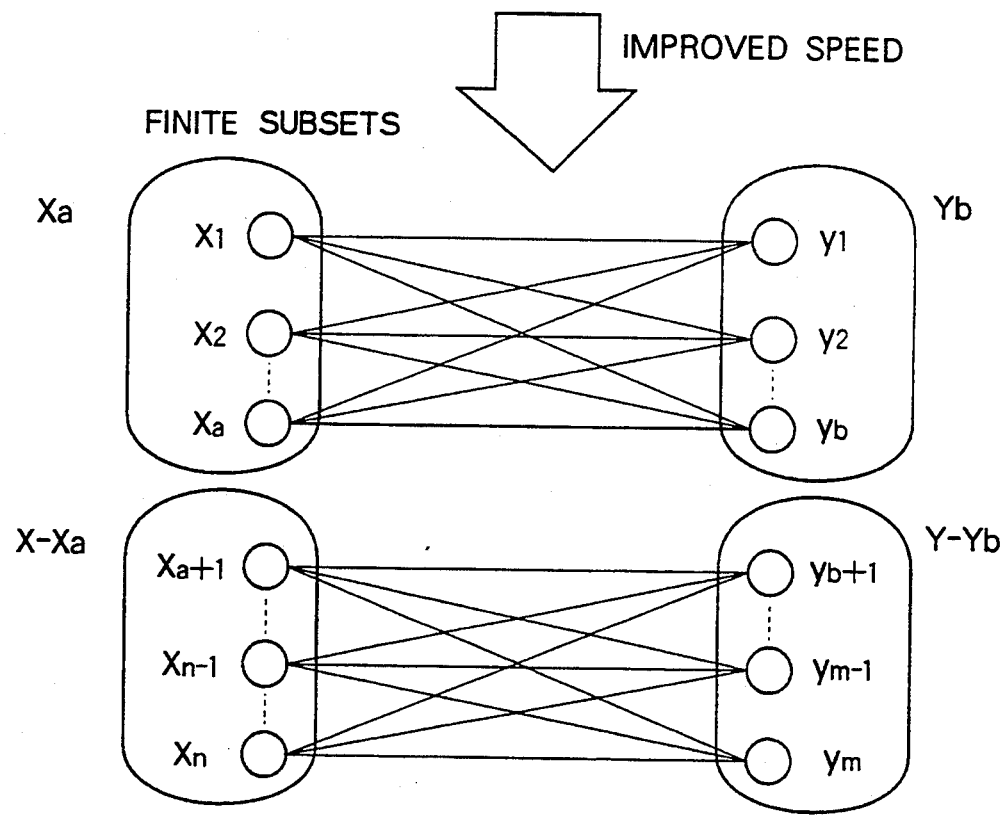

FIG. 29
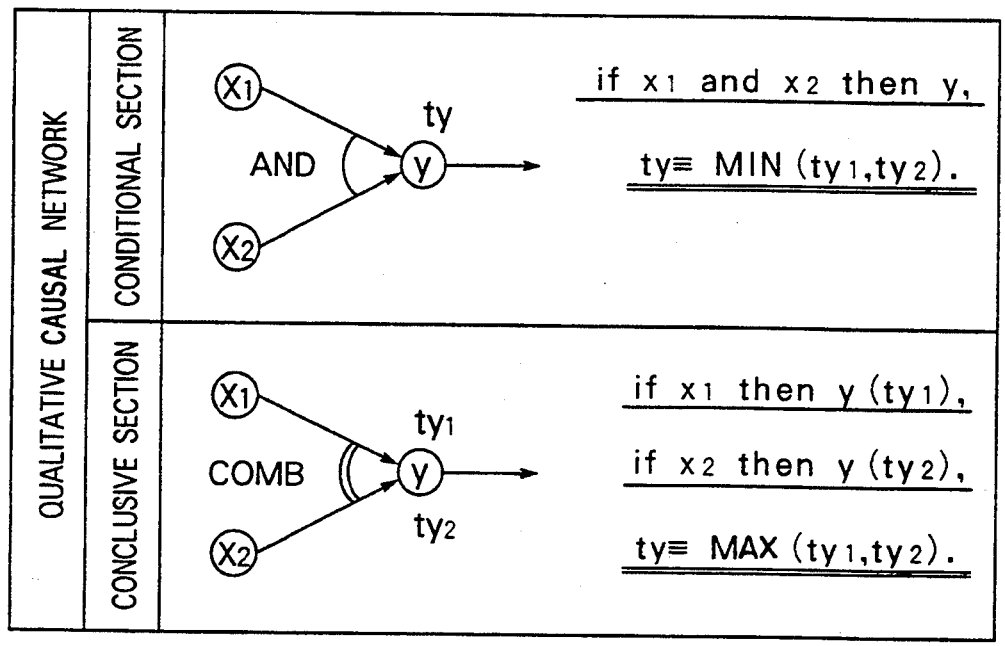
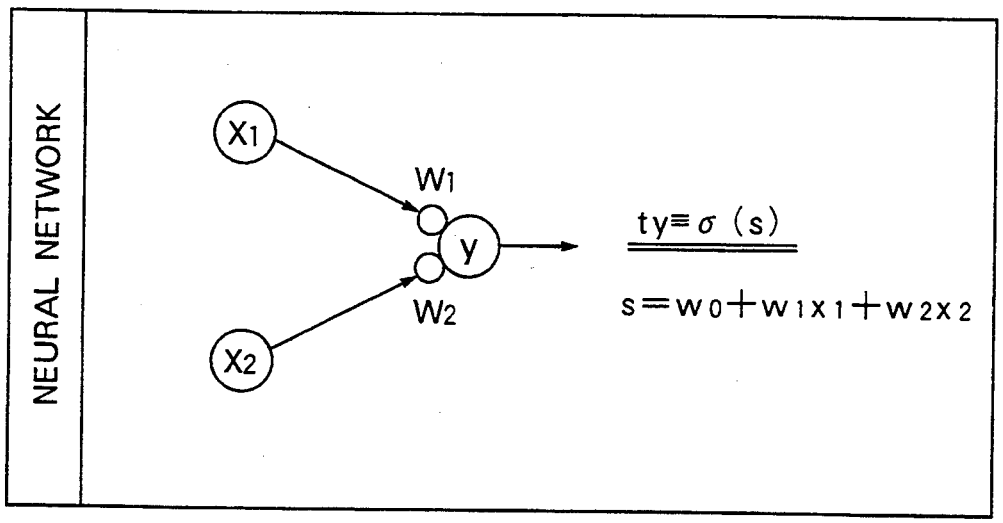

FIG. 45A

| VARIABLE NO. | VARIABLE NAME | LOWER LIMIT | UPPER LIMIT |
|---|---|---|---|
| 1 | $\Delta TB_t$ NUMBER OF LARGE-SIZED VEHICLES (VEHICLES/5 MIN) | 0 | 200 |
| 2 | $\Delta TS_t$ VEHICLE SPEED (km/h) | 0 | 120 |
| 3 | $\Delta Vi_t$ PRESENT POLLUTION LEVEL (%) | 0 | 100 |
| 4 | $\Delta TR_t$ TRAFFIC VOLUME (VEHICLES/5 MIN) | 0 | 400 |
| 5 | $WN_t$ NATURAL WIND (m/s) | −5 | +10 |
| 6 | $\Delta M_t$ MECHANICAL VENTILATION ($m^3/s$) | −500 | +1200 |
| 7 | POLLUTION IN TUNNEL | — | — |
| 8 | OVERALL VENTILATION CAPACITY | — | — |
| 9 | $\Delta Vi_{t+1}$ PREDICTED POLLUTION LEVEL (%) | 0 | 100 |

| SERIAL NO. | 1ST LAYER | 2ND LAYER | 3RD LAYER |
|---|---|---|---|
| # 1 | 1 | 7 | 9 |
| # 2 | 2 | 8 | |
| # 3 | 3 | | |
| # 4 | 4 | | |
| # 5 | 5 | | |
| # 6 | 6 | | |

FIG. 46A
| NEURON NO. | NEURON NAME |
|---|---|
| 1 | N-TBt |
| 2 | Z-TBt |
| 3 | P-TBt |
| 4 | N-TSt |
| 5 | Z-TSt |
| 6 | P-TSt |
| ∫ | ∫ |
| 25 | NB-Vltl |
| 26 | NM-Vltl |
| 27 | NS-Vltl |
| 28 | ZO-Vltl |
| 29 | PS-Vltl |
| 30 | PM-Vltl |
| 31 | PB-Vltl |
FIG. 46B
| VARIABLE NO. | NEURON NO. |
|---|---|
| 1 | 1~3 |
| 2 | 4~6 |
| 3 | 7~9 |
| 4 | 10~12 |
| 5 | 13~15 |
| 6 | 16~18 |
| 7 | 19~21 |
| 8 | 22~24 |
| 9 | 25~31 |
FIG. 46 C-1
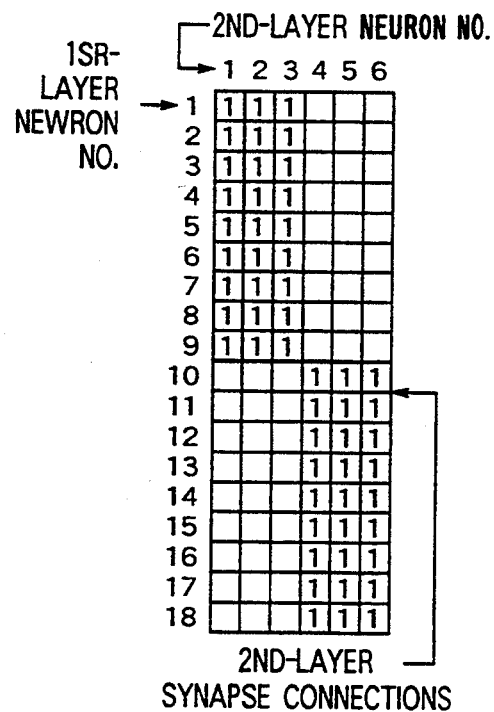
2ND-LAYER SYNAPSE CONNECTIONS
FIG. 46 C-2
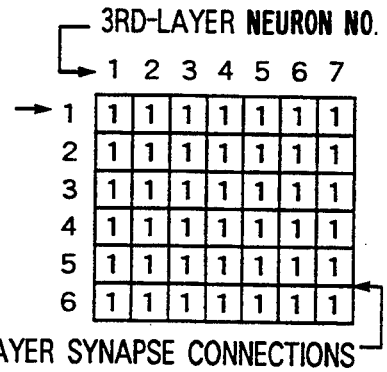
3RD-LAYER SYNAPSE CONNECTIONS

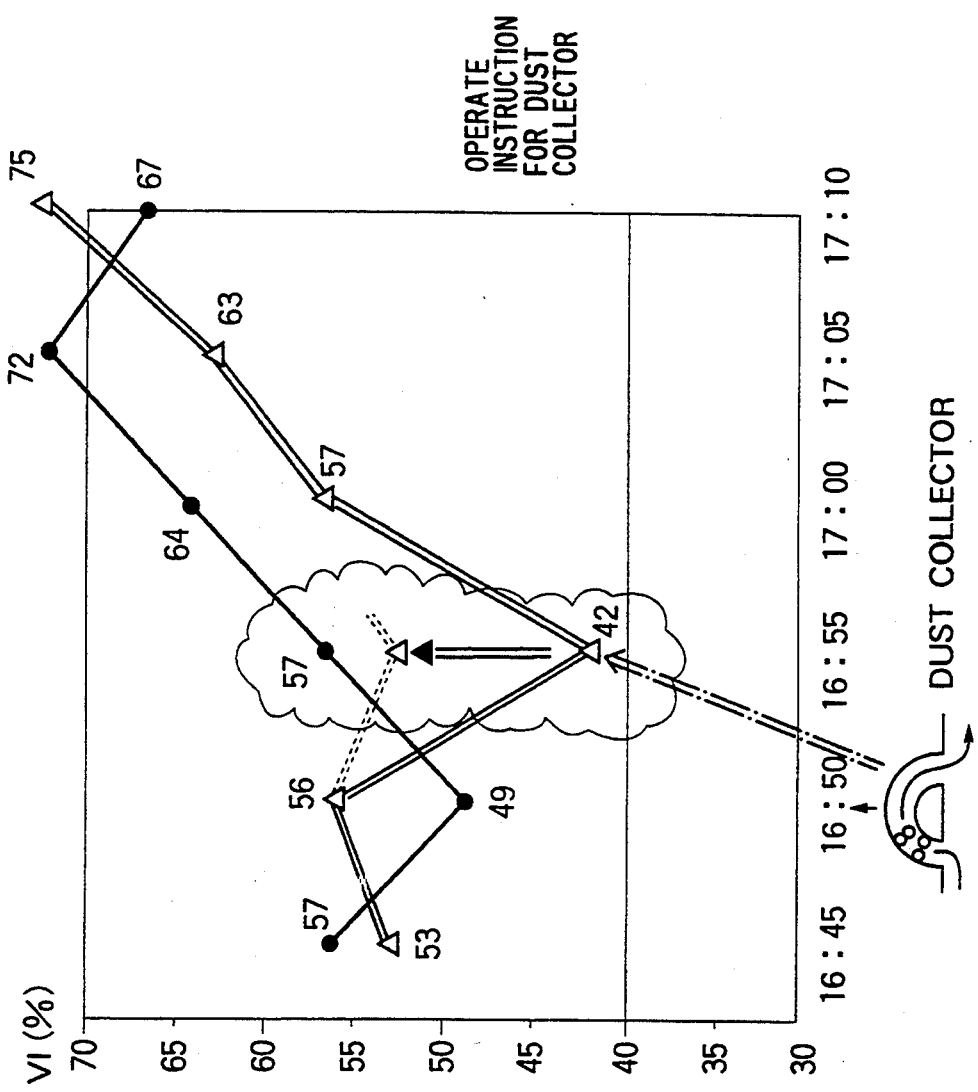

NEURAL NETWORK SYSTEM ADAPTED FOR NON-LINEAR PROCESSING

BACKGROUND OF THE INVENTION

The present invention relates to a neural network system, or more in particular to a neural network system suitable for high-speed learning/recalling of non-linear processing.

DESCRIPTION OF THE RELATED ART

A neural network can perform the pattern recognition of an image or a voice by learning reference patterns in an information processing system without using a complicated algorithm. In the learning of a neural network system, when an information pattern to be learned is input, the couplings between neurons in the neural network are corrected in such a manner as to minimize an error between a recalled output pattern from the neural network system and a teacher information pattern. By repeating this processing, each neuron in the neural network is set to perform a designated operation. A configuration and an operation of such a neural network are described, for example, in "Algorithm of Pattern Recognition and Learning" by Yoshinori Kamisaka and Kazuhiko Ozeki, published by Bunichi Sougou Shuppan Co., Ltd.

One of the important problems in applying a neural network to an actual apparatus is to learn the features of various types of input learning information patterns and to assure an adaptability also for an unknown input information pattern analogous or homogeneous to the learning information patterns.

Even for the pattern of the same word, for example, the duration of vocalization of the word is different depending on vocalization or a speaker, and an input of voice data to the neural network needs to be devised differently. As a measure for this, JP-A-01-241667 discloses a neural network system in which variations in the duration of unknown voice data are normalized dynamically along the time axis to recognize the same word.

On the other hand, JP-A-2-98770 discloses a learning system for a multilayered neural network which responds uniquely to an input information pattern by non-linear processing of an input information pattern through a Gaussian filter.

In the aforementioned prior art systems, a satisfactory result is obtained for many input information like voices or image signals which are homogeneous or have a strong correlation. These systems prove disadvantageous and difficulty is encountered, however, when a neural network is applied to a process control or diagnosis in which various types of process quantities make up input information patterns, in view of frequent vibrations or oscillations occurring at the time of learning, making it often impossible to secure a stable convergence.

In the pollution prediction in a road tunnel, for instance, the number of running vehicles and the natural wind which are quite heterogenous from each other are a part of the input information pattern. The former has a unit (vehicles/five min) ranging from 0 to 200, and the latter (m/sec) ranging from $-5$ to $+5$. The effect of the former on pollution is so non-linear that there is substantially no effect in the range from 0 to 10 (vehicles/five mins), the effect becomes substantially conspicuous and approaches a linear form in the range from 30 to 70 (vehicles/five mins), and the effect on the pollution slackens, again in the range for more than 70 (vehicles/five mins). In addition, the non-linearity is excessive for large-sized trucks which emit a large amount of exhaust gases. The latter, on the other hand, has a comparatively uniform effect on the pollution and is small in range.

In the case where the input information has various dynamic ranges and considerable indefinite or non-linear elements as described above, application of a plurality of input information directly to a neural network would make it difficult to extract the features of each information and therefore to converge the learning.

Further, objects for which the input information can be processed in a non-linear fashion by a specific filter as in the prior art are limited. In many cases, definite means for feature extraction, are not available.

Furthermore, the process control or the like requires conversion of the recalled output of a neural network from a crisp value into a continuous quantity. Quantification is therefore difficult when a non-linear element is conspicuous.

Another important problem in applying a neural network to an actual apparatus is the fact that a long time is required for computation of the product and a non-linear function in the learning and recalling. A solution for this problem is disclosed in JP-A-1-201764. According to this disclosure, a new state (output value) of the next neuron is determined by computation of products of the states (output values) of a plurality of neurons and a plurality of coupling coefficients (weights of synapses) and non-linear computation based on the total sum of these products. In this process, a suggestion has been made to improve the speed of the non-linear computation by performing the computation on the neurons in parallel.

A solution for this problem from another point of view, as disclosed in JP-A-64-82133, proposes a method of improving the learning ability of a neural network by again initializing the neurons inhibited in the process of learning.

Nevertheless, the above-described conventional systems still have unsolved disadvantages remaining in that the neural network fails to be optimized for the problems involved and that application to an object requiring a vast amount of computation or real-time processing is difficult. This makes it difficult to apply the conventional systems to the prediction, diagnosis or control of a process or the like requiring a great amount of learning or recalling process.

Still another important problem encountered in applying a neural network to an actual apparatus is that it is often impossible to secure the convergence of learning and a high speed of recalling.

A typical neural network recently introduced by many references has a multilayer structure including an input layer, an output layer and an intermediate (hidden) layer with all the neurons of adjacent layers interconnected by synapses. The learning method is called "the error back propagation learning method" and is such that a learned information pattern is input to the neural network and the coupling coefficient (weight of synapse) is adjusted in such a manner that the deviation from an ideal value of the output information pattern, i.e., the teacher information pattern is minimal.

Upon completion of learning, the weight of each synapse is fixed. The output information of the process, for example, can be obtained also for an unknown input information pattern different from the teacher information pattern. This technique of the neural network is described in detail, for instance, in "Algorithm of Pattern Recognition and Learning" cited above. Also, a specific circuit configuration of a neural network is disclosed, for instance, in JP-A-1-201764.

A comparatively effective application of a neural network such as described above is found in prediction of stock prices and pattern recognition. In this case, the features of a given event, i.e., the chronological change of stock prices or an image distribution is learned for prediction and recognition. An application of a neural network to the process control and various diagnoses, however, requires handling of a great variety of parameters and actuators, so that if they are applied as inputs/outputs of the neural network as they are, it is practically impossible in many cases to secure the convergence of learning or high-speed recalling. In fact, the neural network is fraught with great difficulties regarding application to complex problems.

The above-mentioned problems of the prior art will be explained taking the pattern recognition of numerals shown in FIGS. 49A and 49B as an example. The neural network shown in FIG. 49A has an image divided into 64 segments as an input information pattern and corresponding 64 neurons of the input layer. Twenty neurons are allocated to an intermediate layer. According to this neural network, as compared with FIG. 49B, the learning is converged in a short time with a higher accuracy of recalling. An increased number of neurons, however, decreases the recalling speed.

The neural network shown in FIG. 49B, on the other hand, has the same image divided into 16 segments as an input information pattern and includes 16 neurons of an input layer, ten neurons of an intermediate layer and ten neurons of an output layer. In this neural network, as compared with that shown in FIG. 49A, the smaller number of neurons increases the recalling speed although the convergence of learning and the recalling accuracy are decreased. In other words, with the increase in the total number of neurons, the sum-of-the-products computation becomes so extensive that the processing speed is decreased.

Also, since a decreased number of neurons leads to fewer elements processed, the convergence of learning and the recalling accuracy are adversely affected.

In this way, the prior art has the contradictory problems of processing speed and accuracy, which makes difficult their application to the solution of actual problems of the neural network.

Various suggestions have been made in an attempt to obviate these problems of the prior art. JP-A-64-82133, for example, discloses a method of improving the accuracy by several percentage points by initialization of neurons inhibited in the process of learning for relearning. Also, JP-A-1-248268 proposes a method of improving the processing speed of propagation of a neural network by a plurality of parallel computation circuits and pipelining.

None of these proposals, which improve either efficiency or speed based on general information processing techniques, provides a substantive solution to the problems of an improved processing speed and higher accuracy.

Research, in which the brain is assumed to be an assembly of subsystems, is aimed at analyzing the contents of the subsystems, to grasp the essential nature of the brain. This effort is considered to contribute to optimization by minimizing the network configuration in modelling the brain by a neural network. Under the circumstances, however, no effective method of segmentation of subsystems has been proposed.

SUMMARY OF THE INVENTION

The present invention has been developed in view of the above-mentioned problems, and the object thereof is to provide a neural network system for and a method of learning or recalling optimized objects for learning/recalling.

According to a first aspect of the invention, the processing in a neural network is effected not according to the absolute values of input information such as a linear model, but rather according to extraction of feature quantities thereof and is based on the idea that each input value of an input layer neuron is not required to be handled in the same dimension (unit dimension). This invention is, therefore, such that even when the input information has various ranges and contains a strong non-linearity or many indefinite elements, if the correlation between input values and the recalled result can be grasped to some extent and expressed in a qualitative fashion, then the learning/recalling are made possible by using qualitative values evaluated by fuzzy membership functions for providing particular qualitative expressions as input information to the neural network.

Also, even in the case where the recalled result of a neural network contains a strong non-linear element, a quantified value can be determined by defuzzying the recalled result of the neural network as long as the correlation between the evaluated value and the quantified value is known to some extent, in view of the fact that the recalled result represents a qualitative evaluation.

As explained above, according to the present invention, the learning/recalling of a neural network which can properly respond to various types of characteristics of a process is made possible, if the present invention is applied to various information on process diagnosis and control, which have so far been considered not applicable, in accordance with the nature of each information. Further, the non-linear processing is effected based on the fuzzy set concept and hence the present invention can be applied to the non-linear processing if the correlation between input information and a recalled result is predetermined from experiences and experiments to some extent, resulting in a range of application being extended.

Also, in a neural network system which combines fuzzy evaluation of input information and quantification of a recalled result, the inference rule in conventional fuzzy interference is replaceable by the particular neural network. As a result, the tuning time can be shortened and accuracy can be improved as compared with the conventional fuzzy inference.

According to a second aspect of the present invention, a forward neural network is based on the characteristic that the more sufficiently the learning is effected, the more asphyctic states of synapses/neurons occur, thereby making it more difficult to refresh the asphyctic synapses/neurons in their direct form. More specifically, a neural network is optimized by separating both the synapses having the absolute value of synapse weight less than a predetermined value near to zero and the neurons with all the synapses thereof separated. It is thus possible to eliminate the redundant product computation and the computation of non-linear function values in the learning and recalling, thereby improving the processing performance.

According to a third aspect of the present invention, there is provided a neural network system based on the technique that an actual system in the fields of industry and information is sufficiently effective in a limited range of input information and weight coefficient, and therefore the computation of the products and non-linear function requiring a great amount of time are facilitated by limiting the numerical space used in a neural network to a predetermined range. As a result, a plurality of input values $x_i$ (i=1 to n) to neurons of an input layer are normalized in a predetermined range, so that the computation results and synapse weights in neurons from input to output layers are set to a predetermined range. Thus, the required results of computations such as the product, quotient, power computation and the like are preset in tables and hence these computations can be replaced by a direct process of referring to the tables by addressing in correspondence with an input, so that the speed of a vast amount of computation processing in the learning and recalling can be remarkably improved.

Further, the processing in a neural network is effected not on the basis of the absolute values of input information like a linear model but by extracting the feature quantities thereof. The normalization of each input value $x_i$ (i=1 to n) to the neurons of the input layer, therefore, is not necessarily expanded or reduced in the same dimension (unit dimension). This factor is useful especially in the diagnosis and control of a process which is an object of application of the present invention, and the normalization including the linear and non-linear processing of various input information permits high-speed and high-accuracy learning/recalling.

According to a fourth aspect of the present invention, the segmentation unit of a neural network is clearly defined on the basis of the experiences of a qualitative causal network between input information and a recalled target. Since subnets having causal relations are accumulated, the network configuration is optimized to thereby improve the processing speed and accuracy at the same time.

Also, synapse connections of neurons not correlated to each other, i.e., asphyctic synapses are excluded from the neural network. All operations redundant for the learning of the neural network, therefore, can be eliminated, thereby making convergence of the learning possible within a short amount of time.

Furthermore, a process control system according to the present invention, which uses an optimized neural network behaving as if a qualitative causal network of the process has been transplanted for qualitative inference, facilitates construction of a control system and realizes a highly accurate prediction as well as a real-time processing thereof.

The optimized neural network and the learning function thereof according to the present invention, which can replace the conventional fuzzy theory with high accuracy, completely eliminates the definition of the inference rule and tuning of membership functions which have posed a bottleneck in applications of the fuzzy theory to complicated processes.

BRIEF DESCRIPTION THE DRAWINGS

Figure 10:
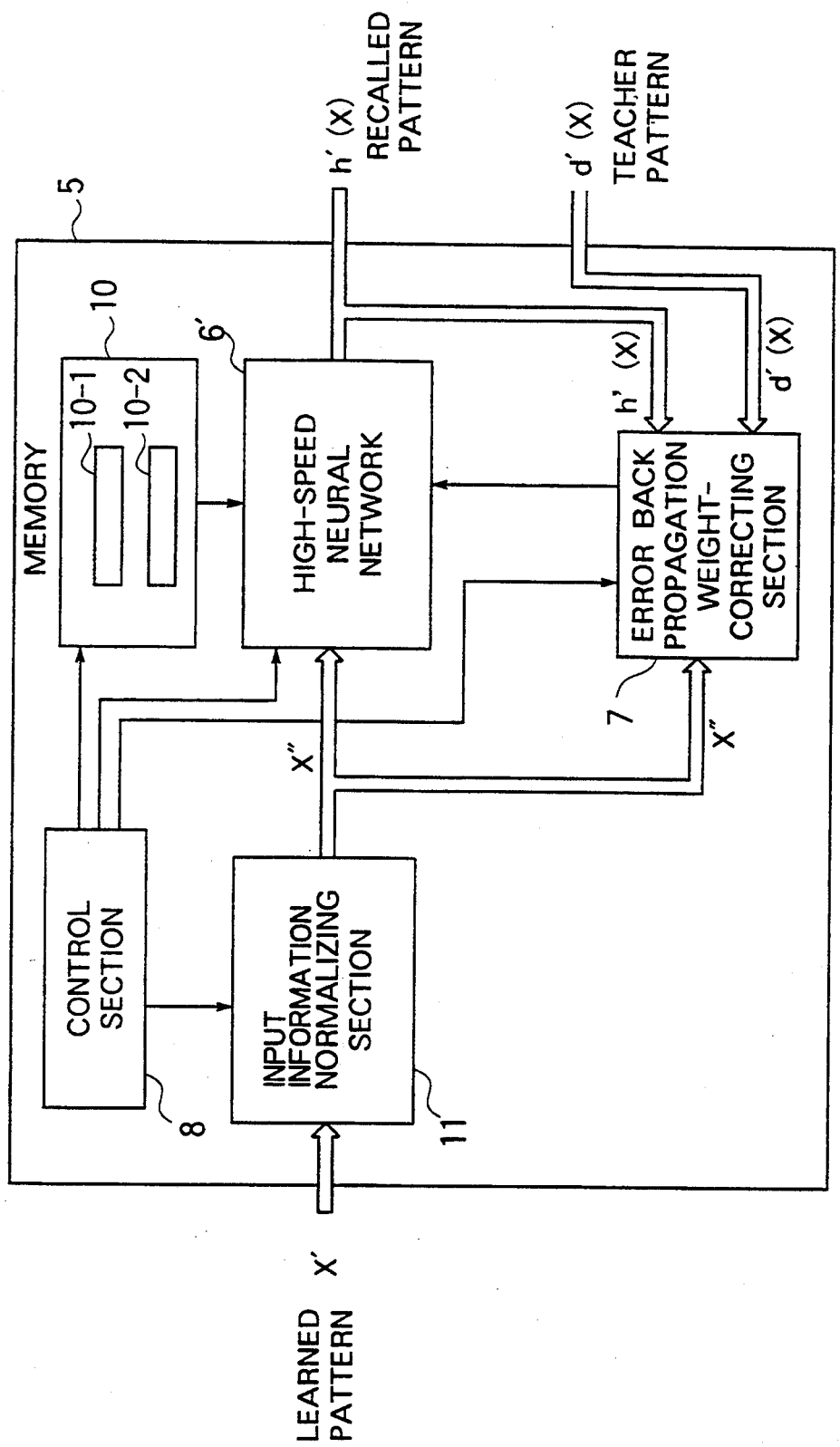
FIG. 10 is block diagram showing a configuration of the second modification of the neural network section shown in FIG. 1.
Figure 11:
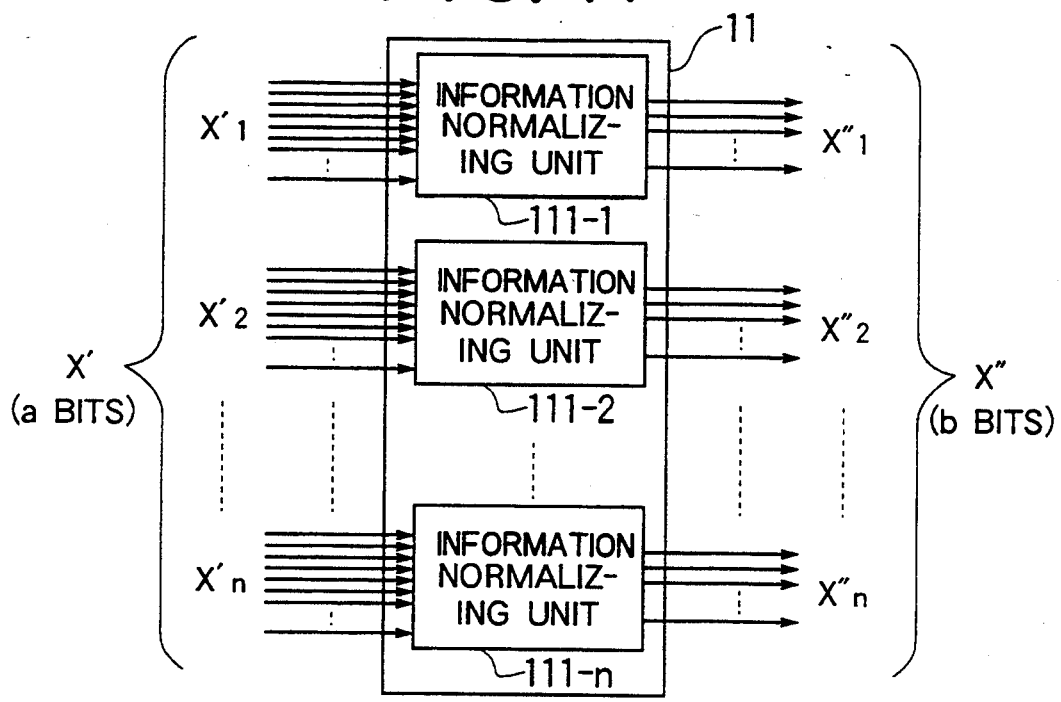
Figure 12:
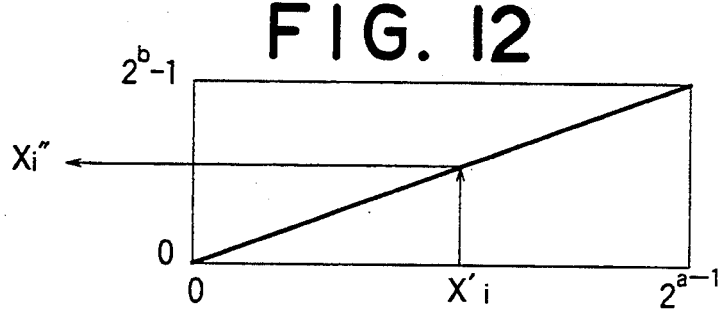
Figure 13:
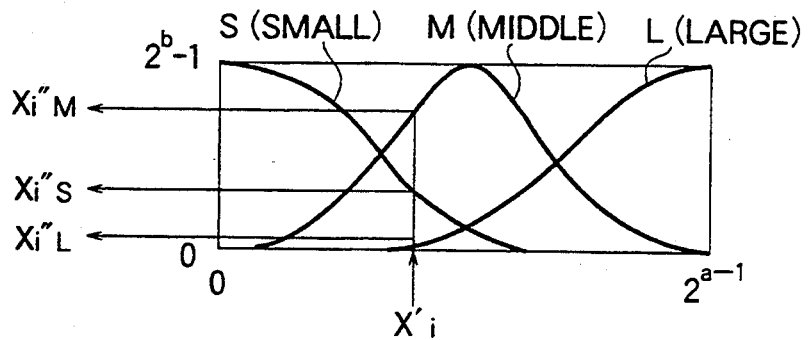
Figure 14:
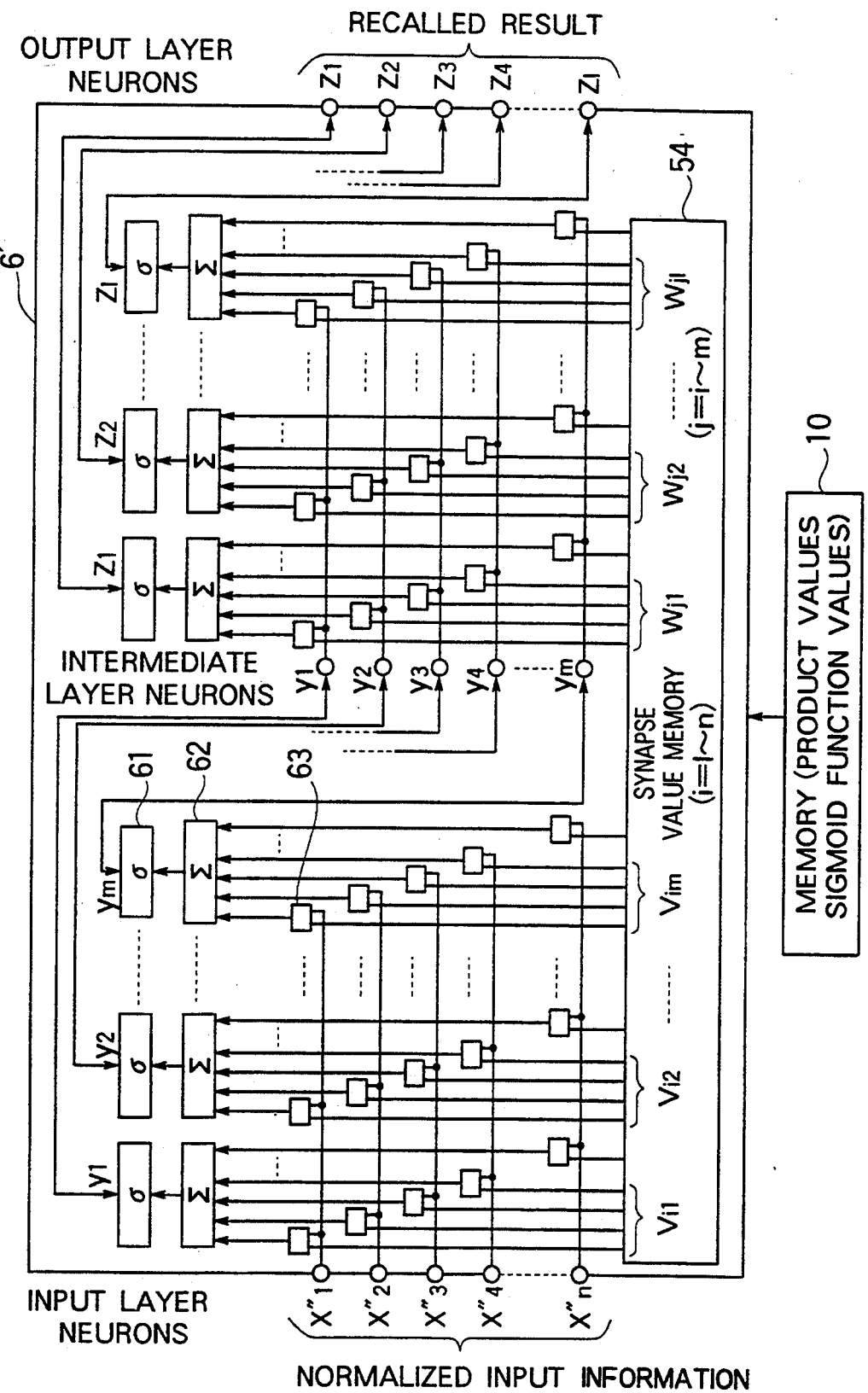
Figure 15:
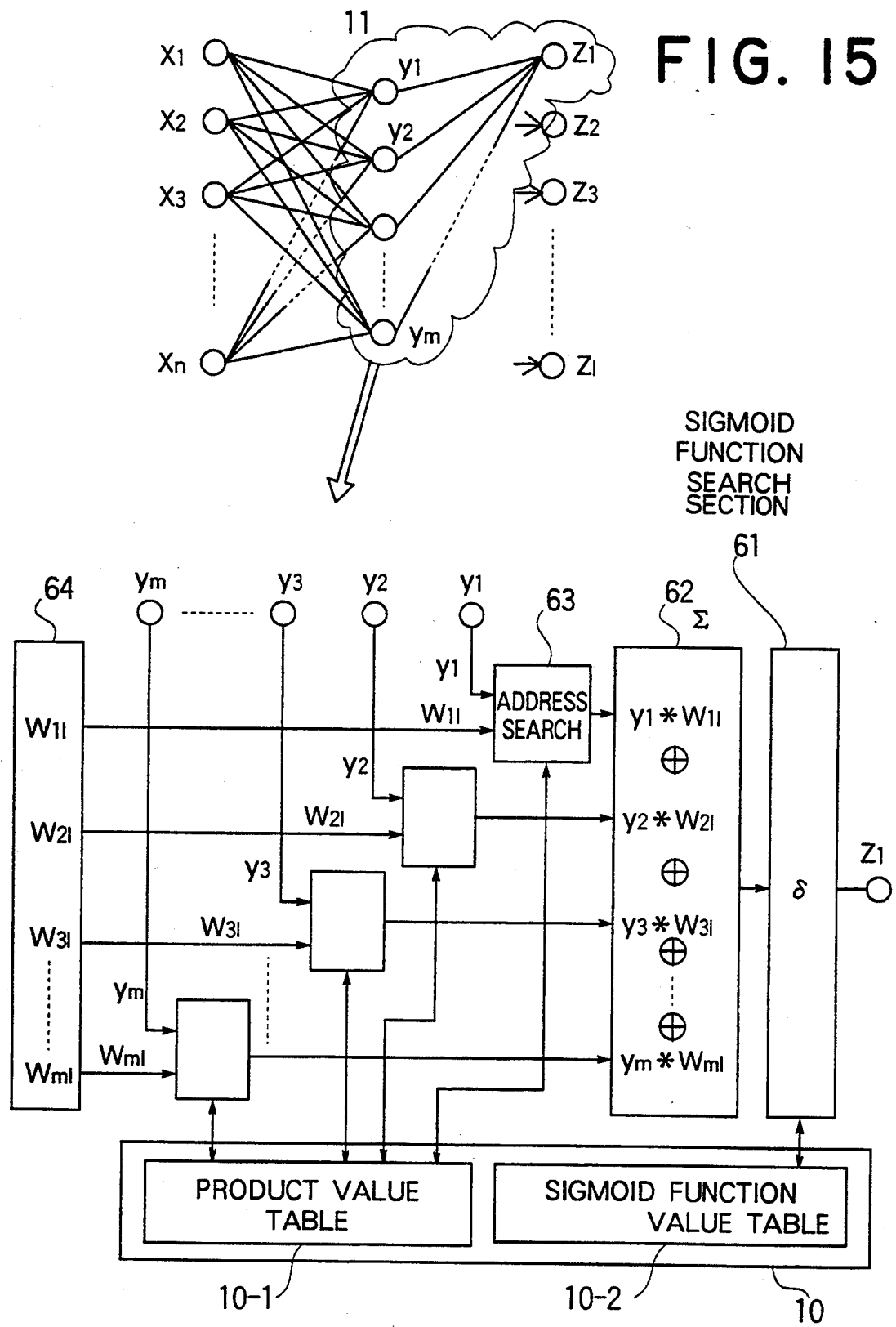
Figures 16A, 16B:
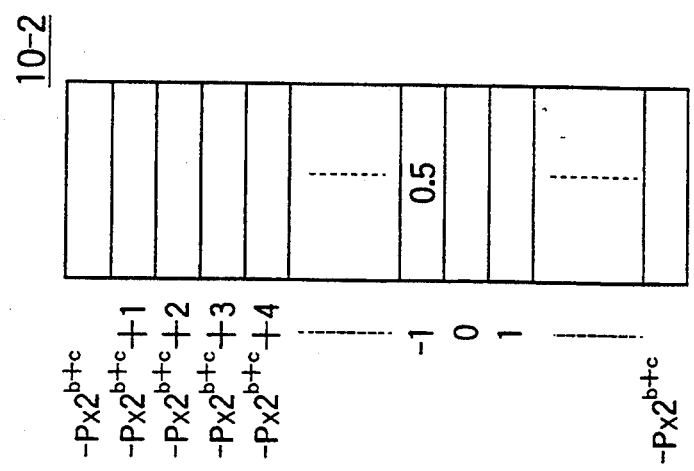
Figure 20:
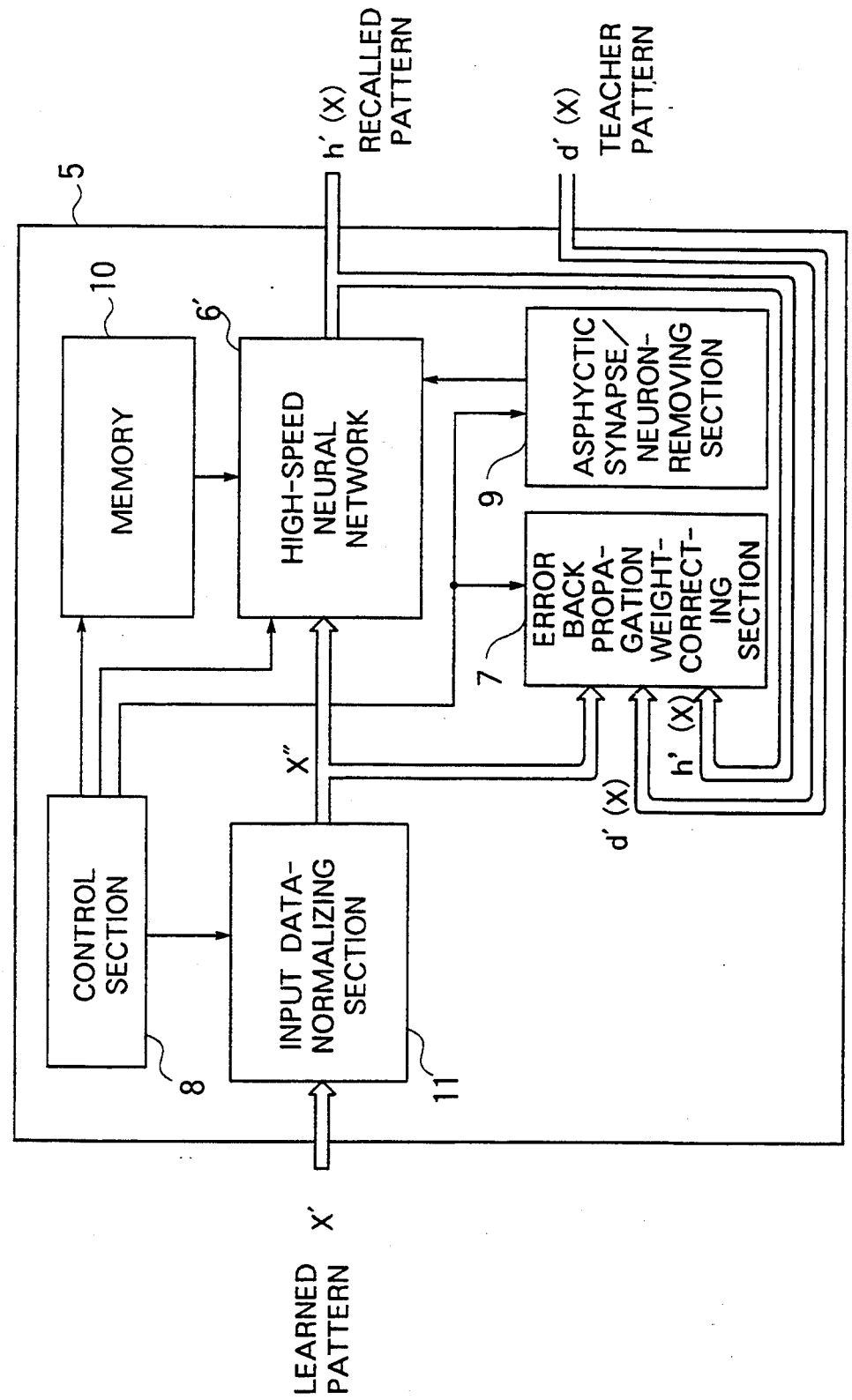
Figure 21:
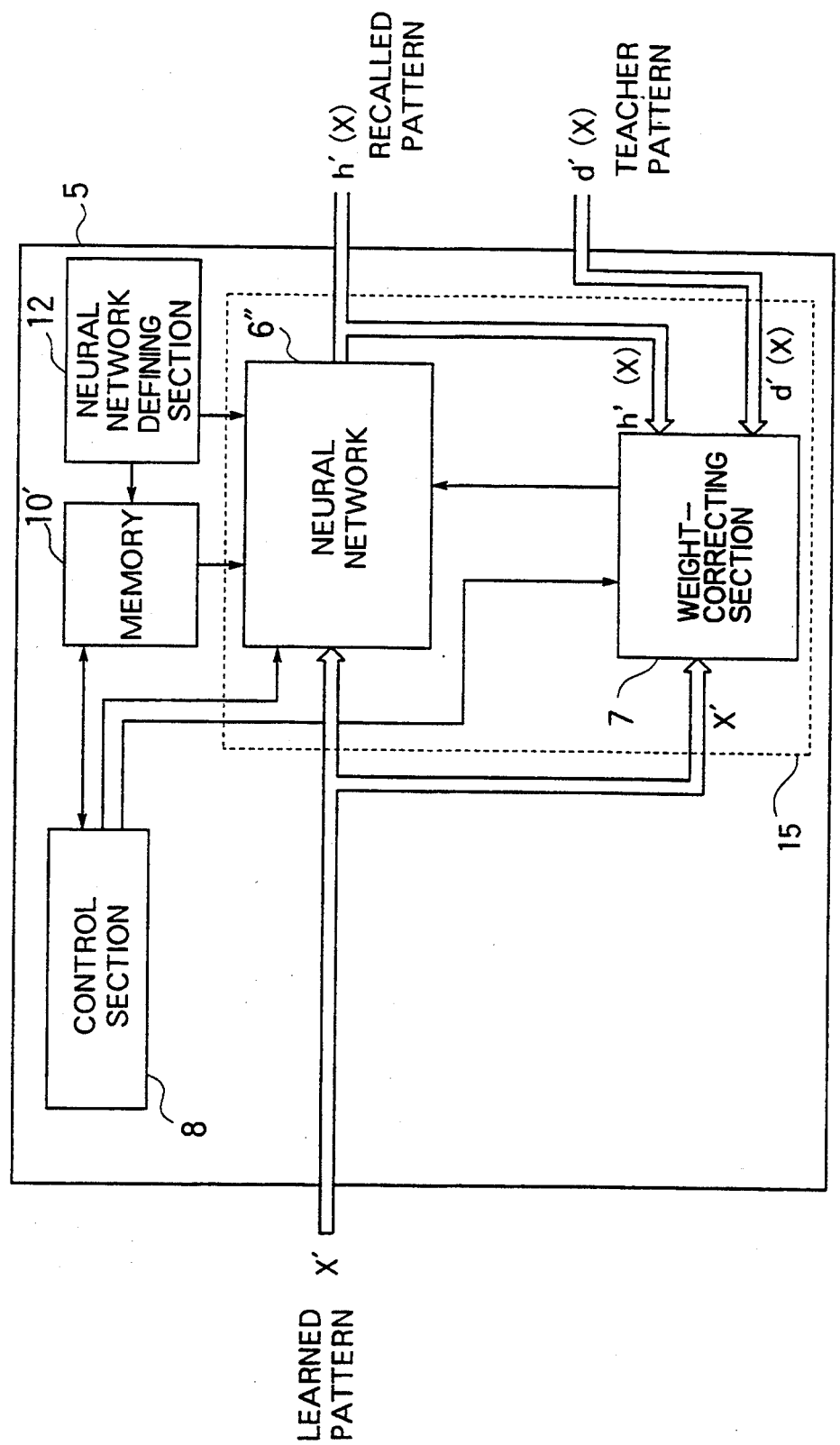
Figure 22:
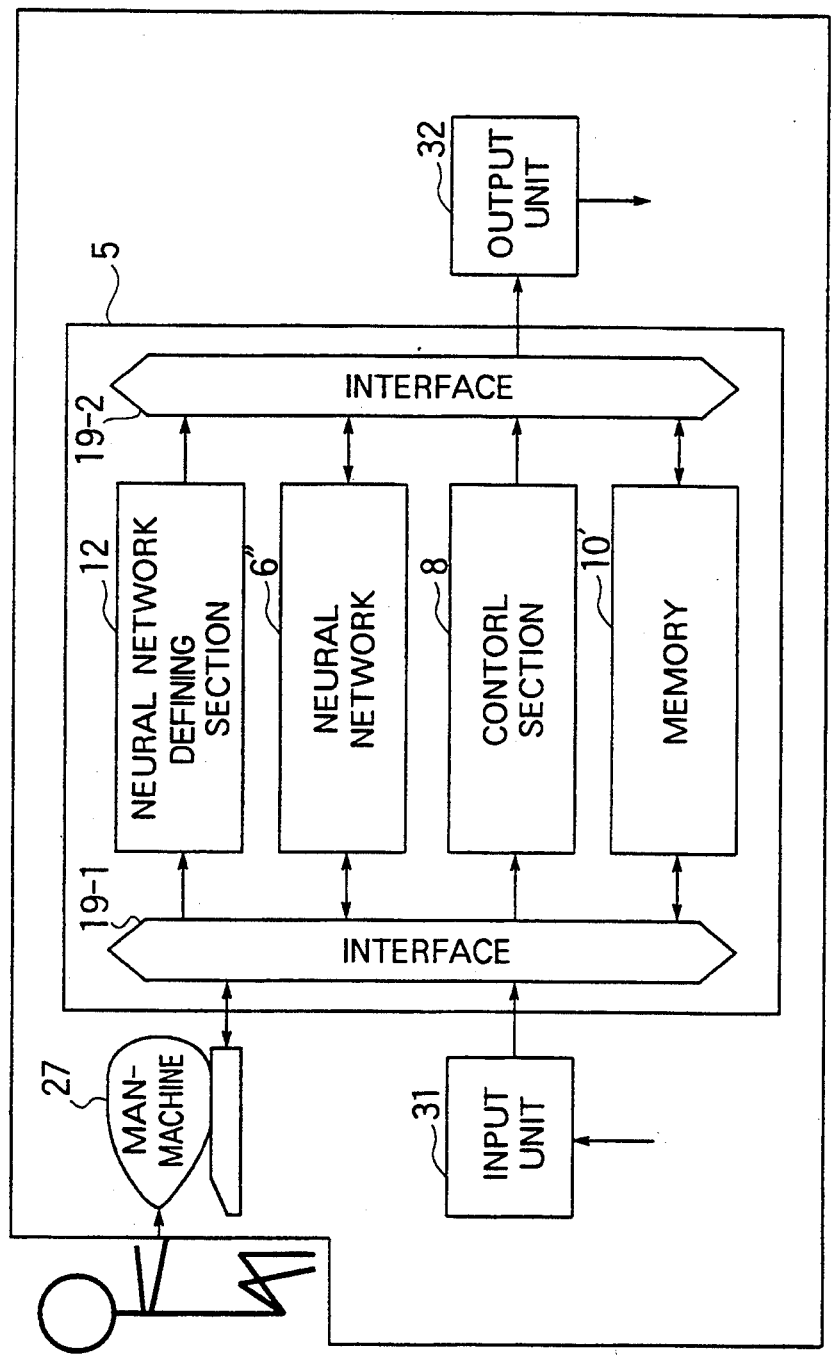
Figure 26:
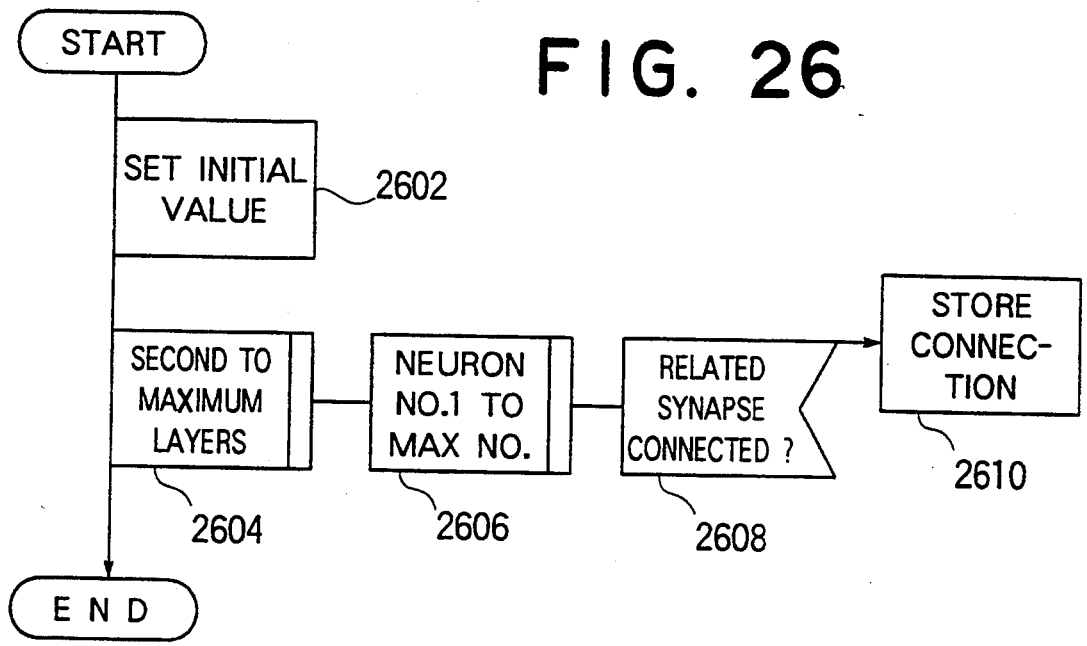
Figure 27:
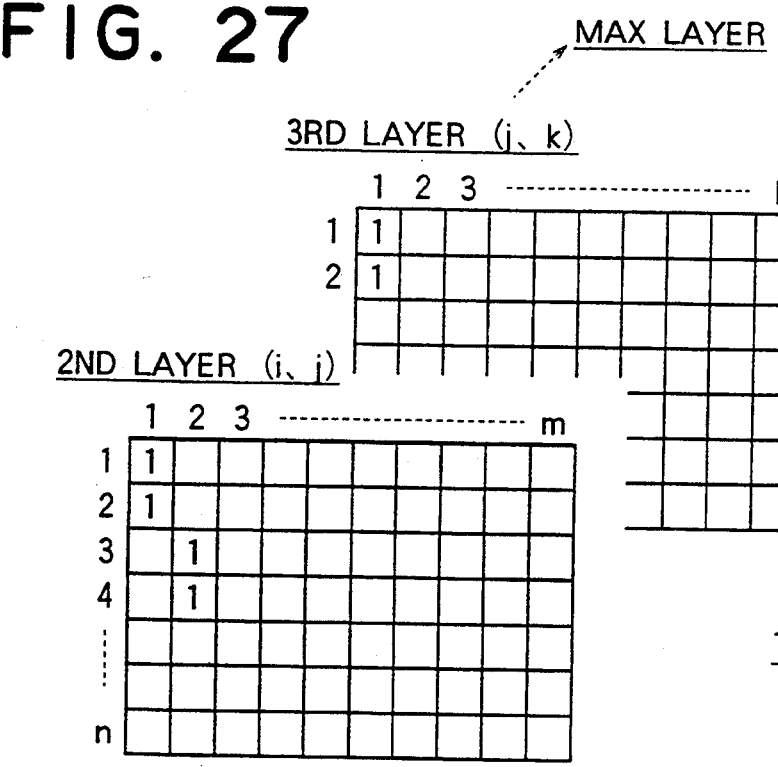
Figure 30:
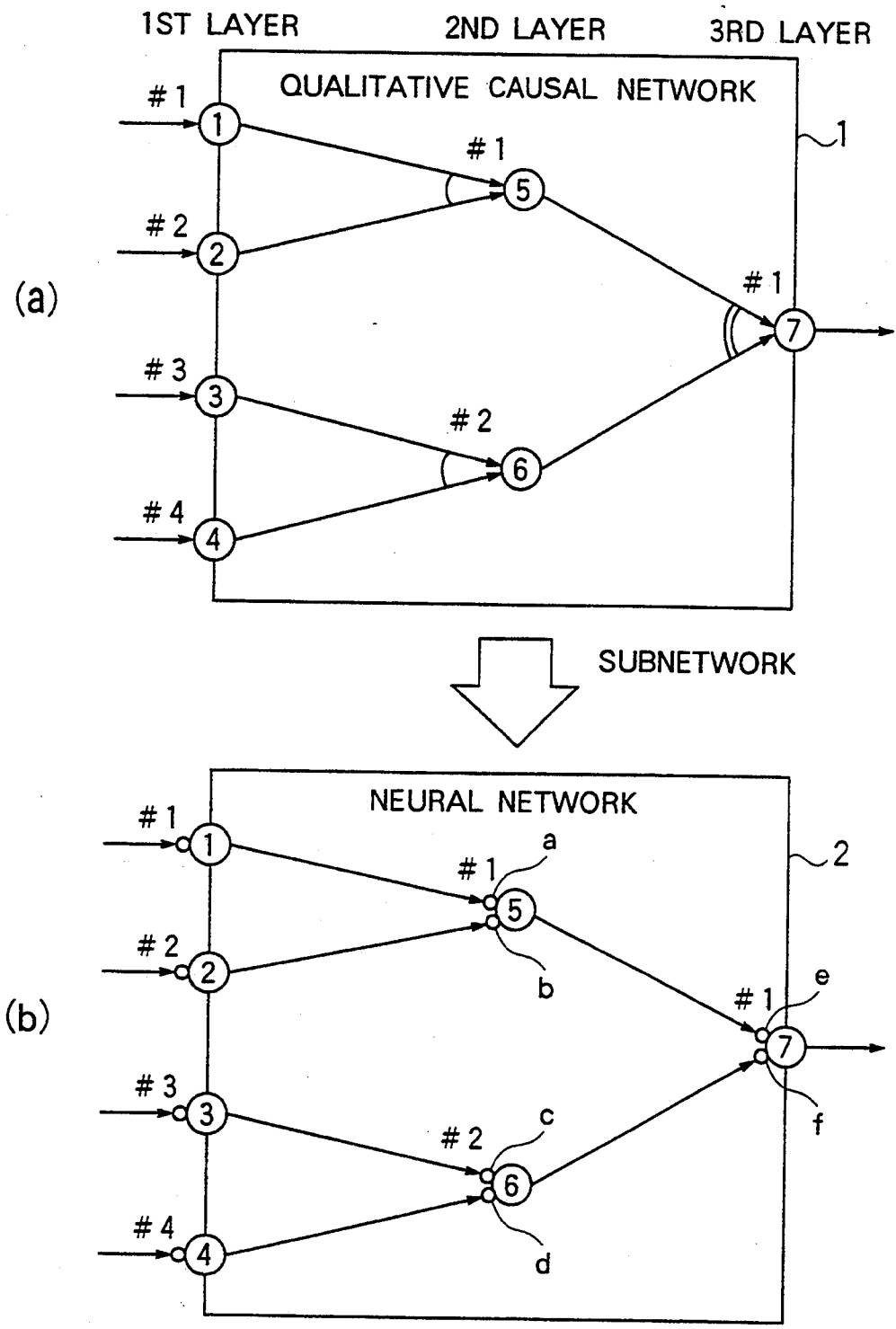
Figure 31:
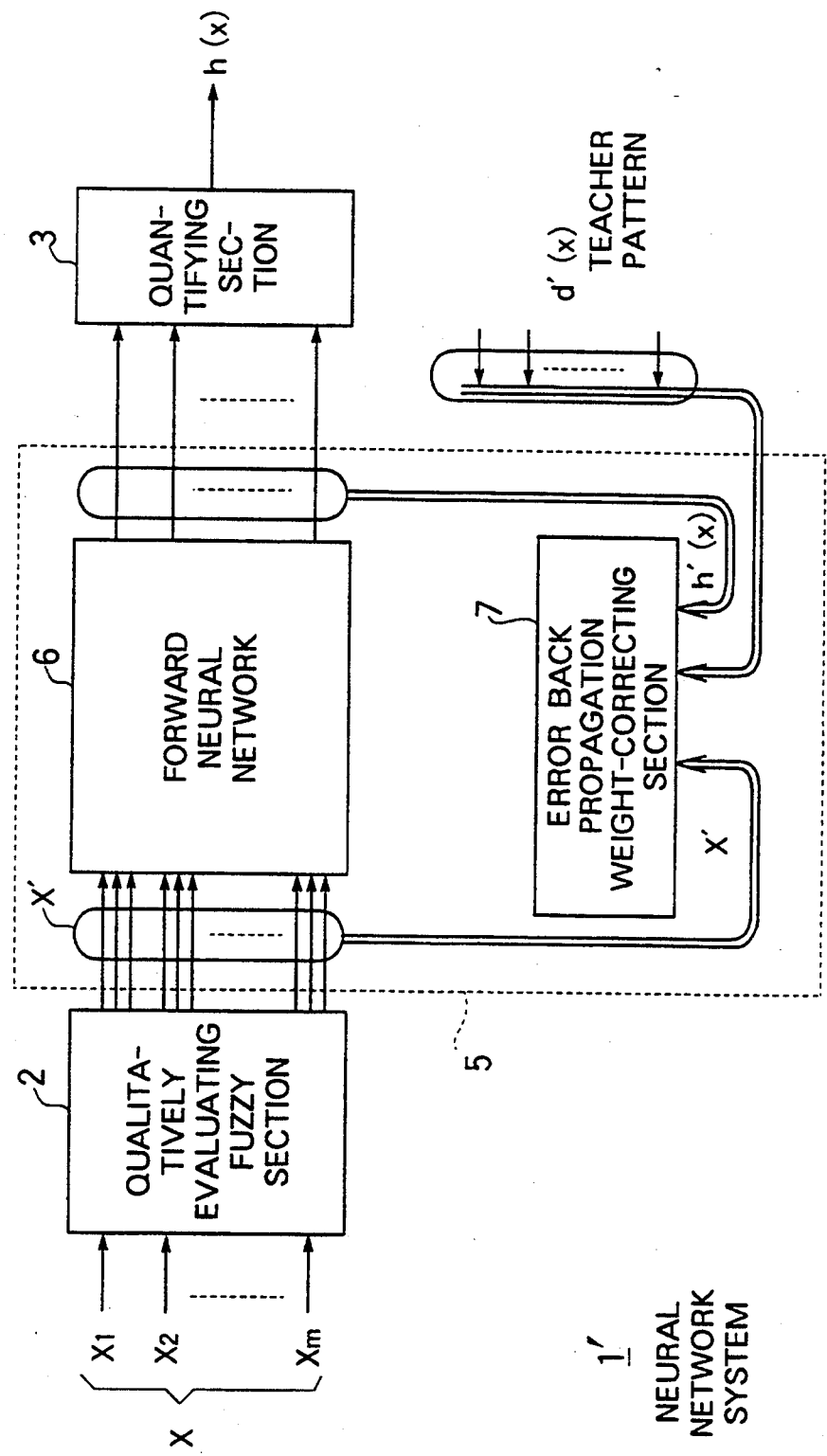
Figure 32:
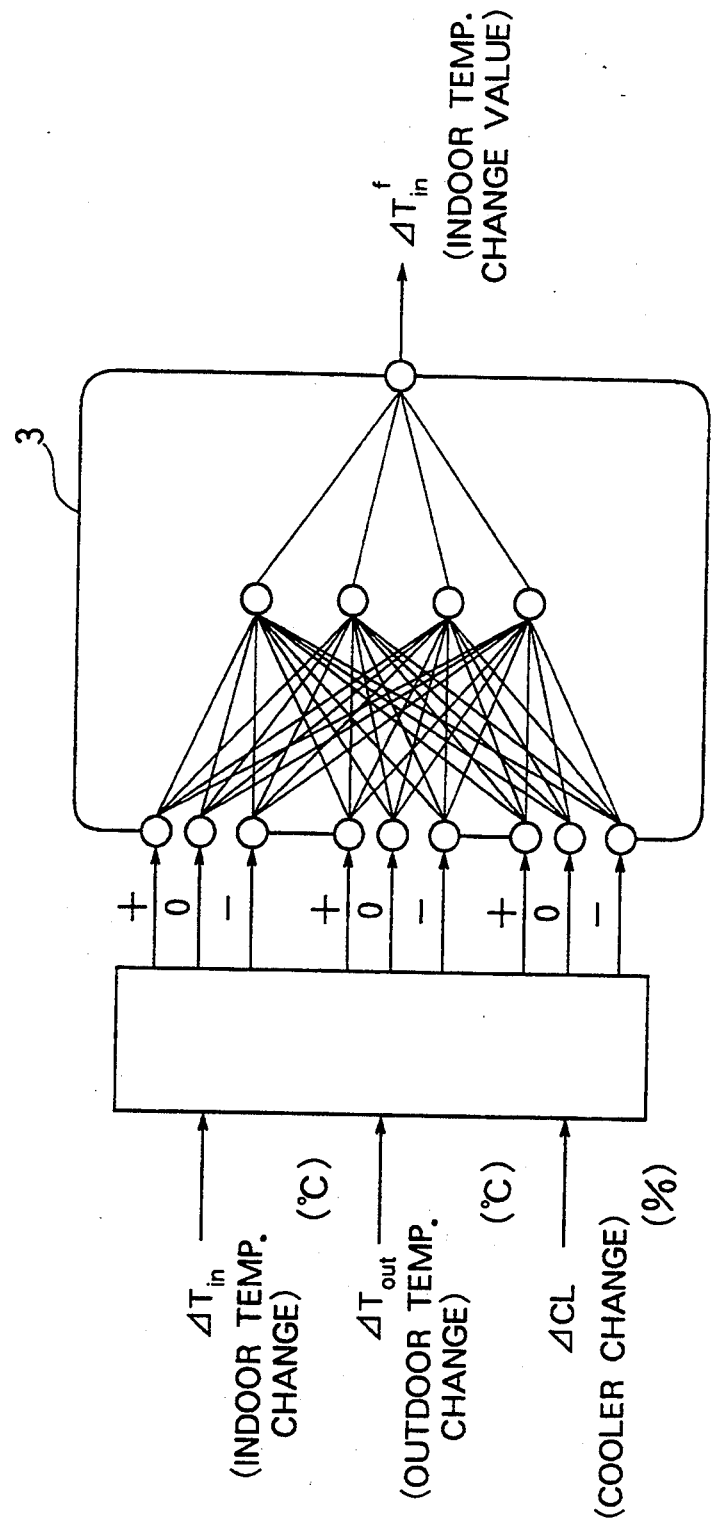
Figure 33:
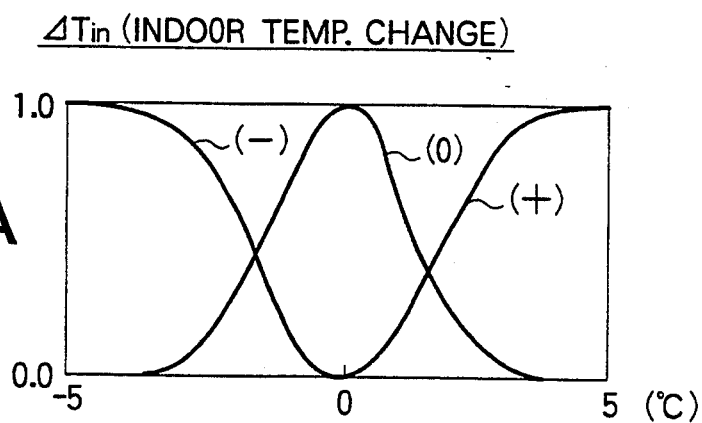
Figure 33:
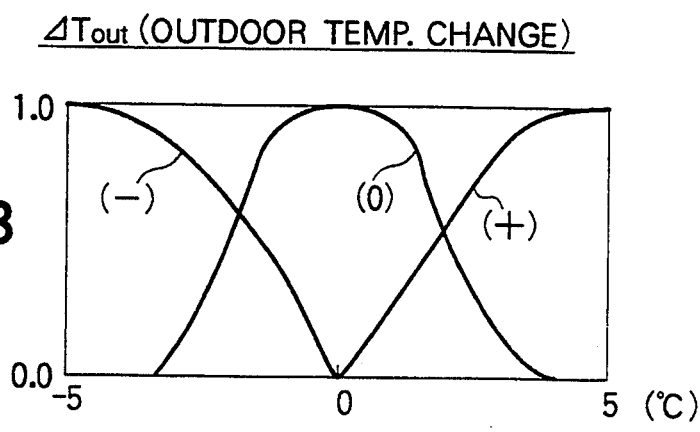
Figure 33:
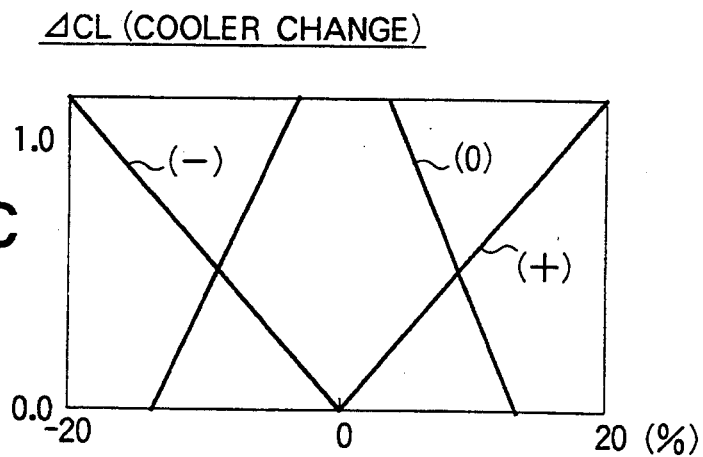
Figure 34:
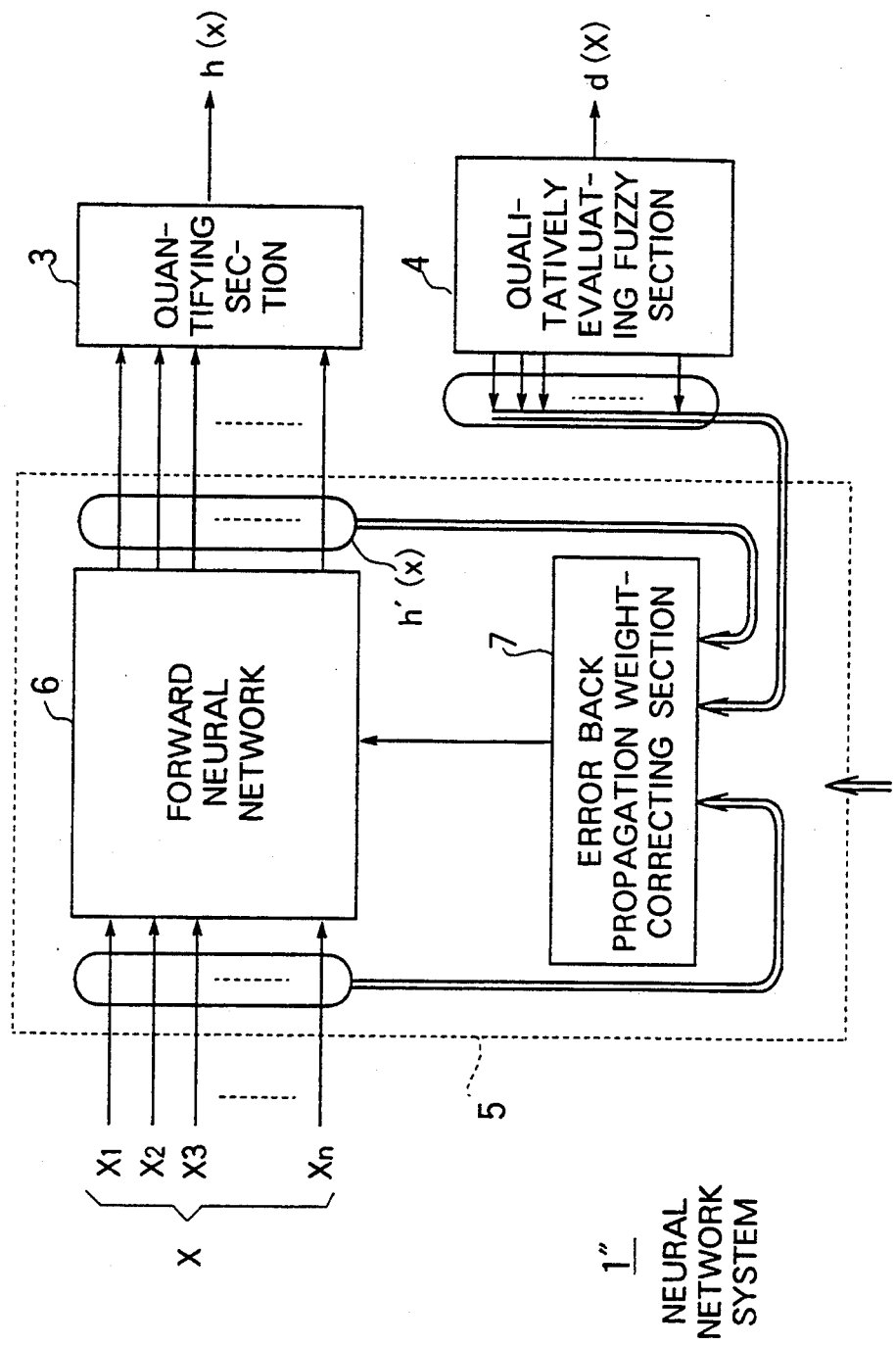
Figure 35:
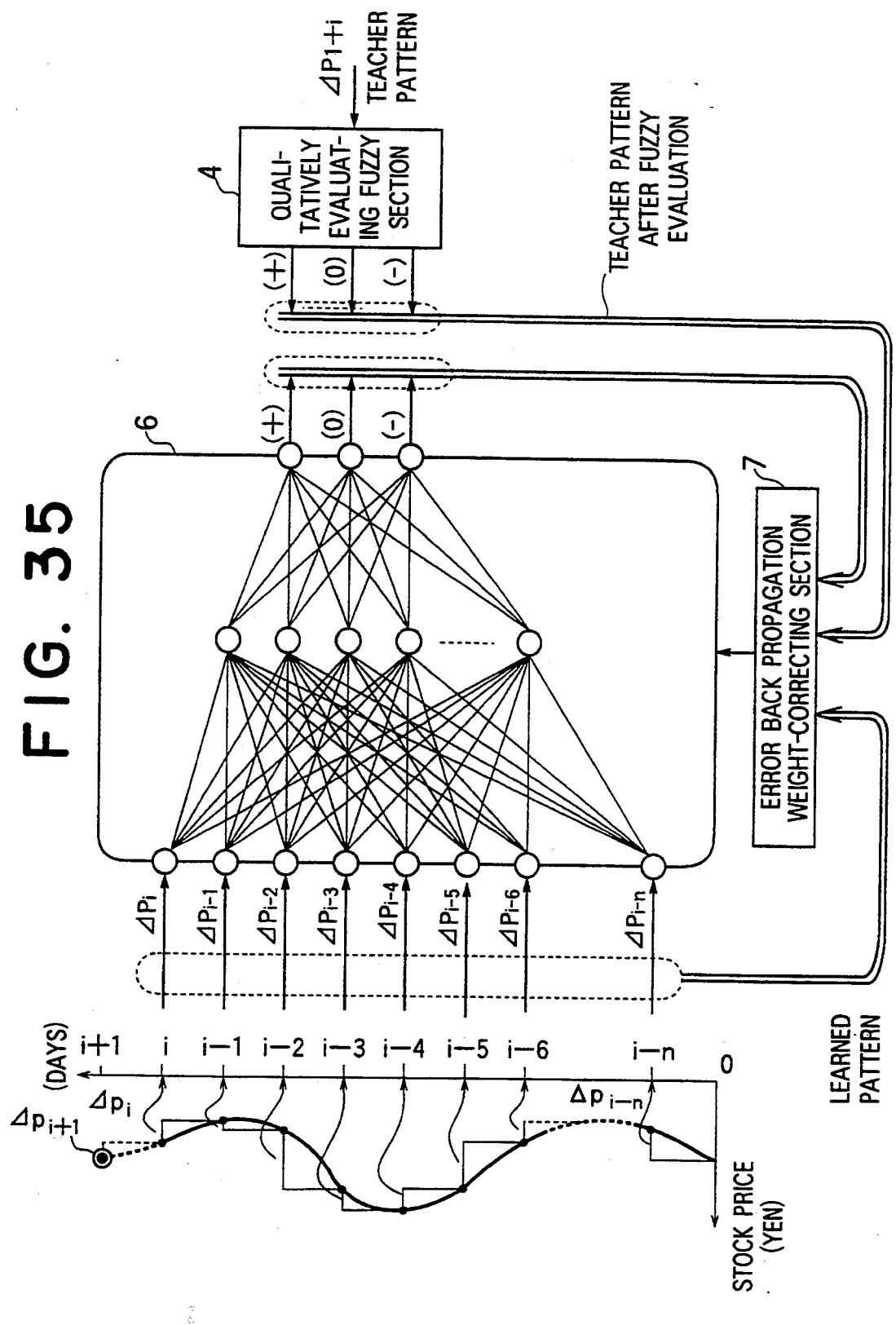
Figure 36:
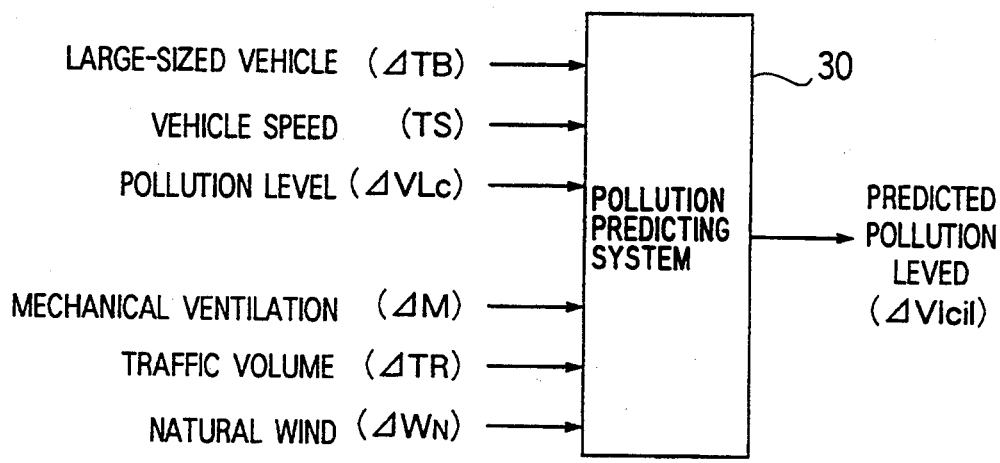
Figure 38:
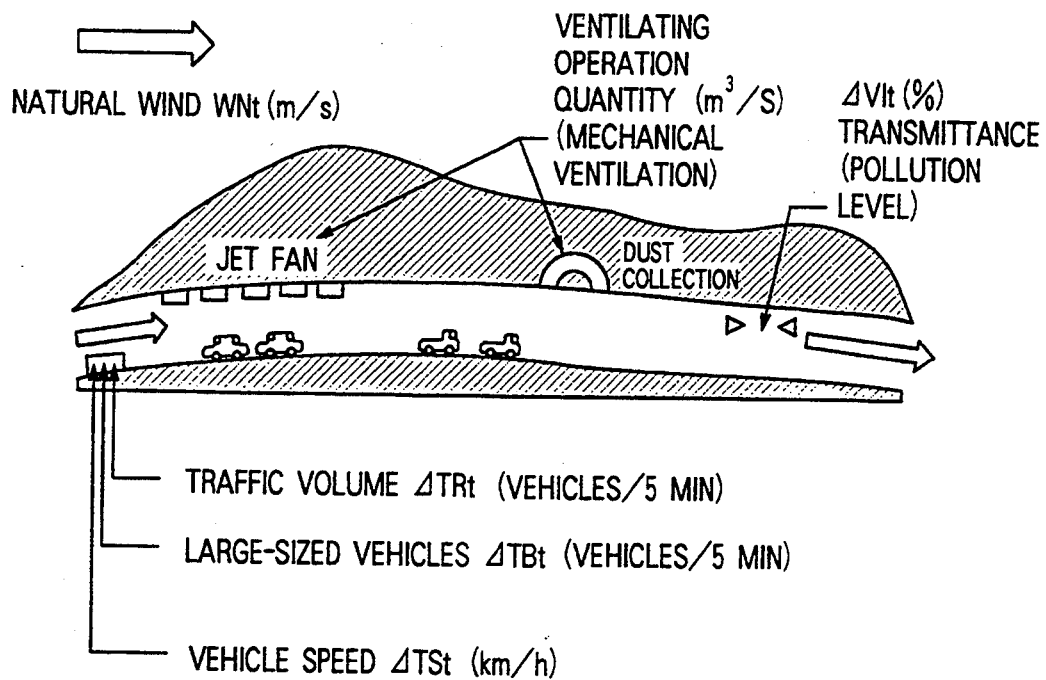
Figure 37:
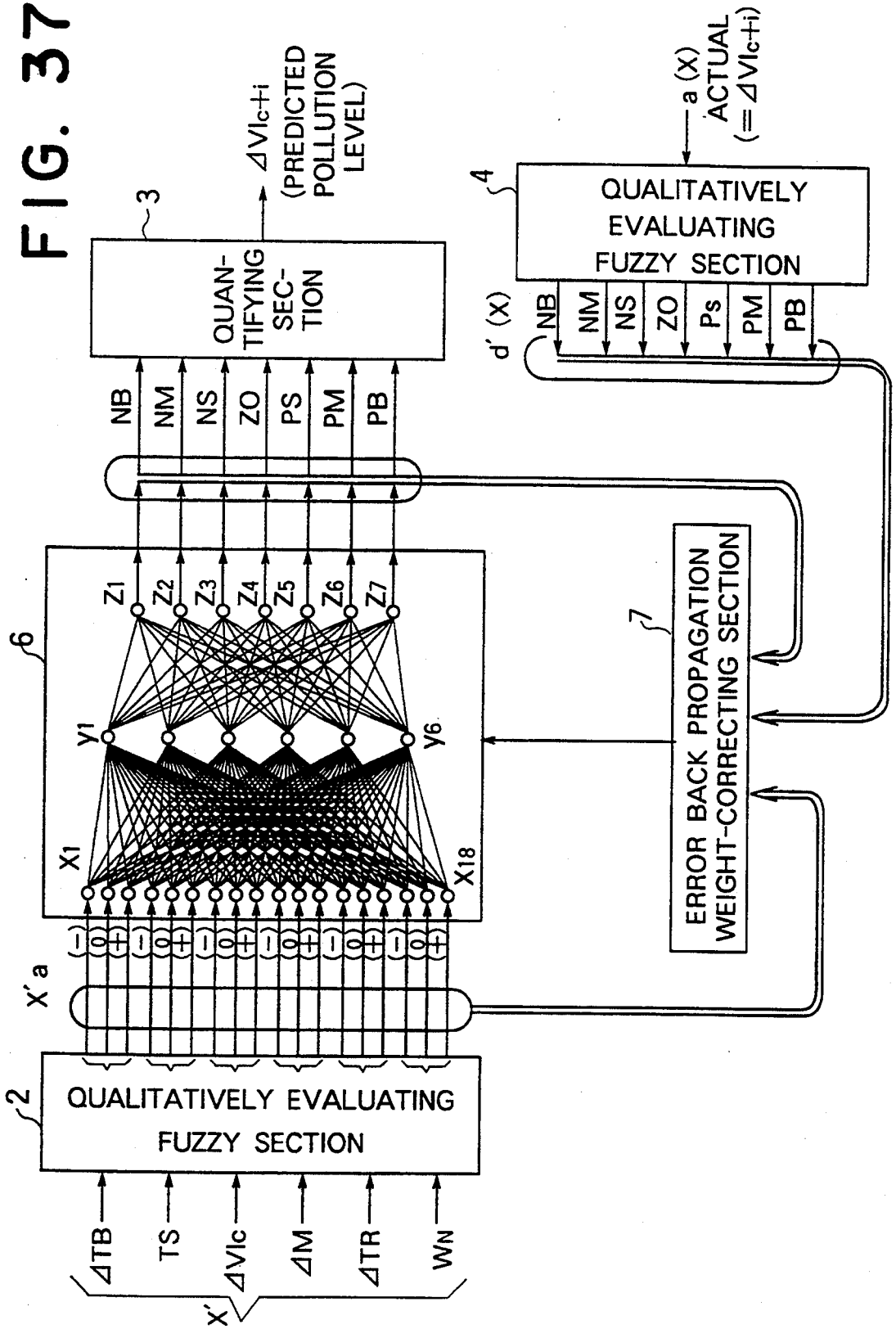
Figure 40:
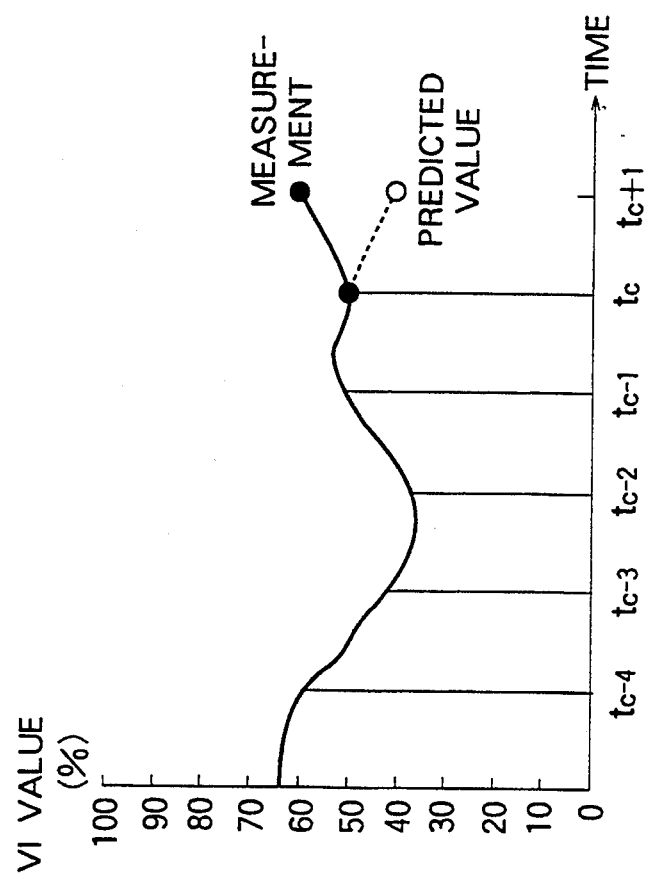
Figure 39:
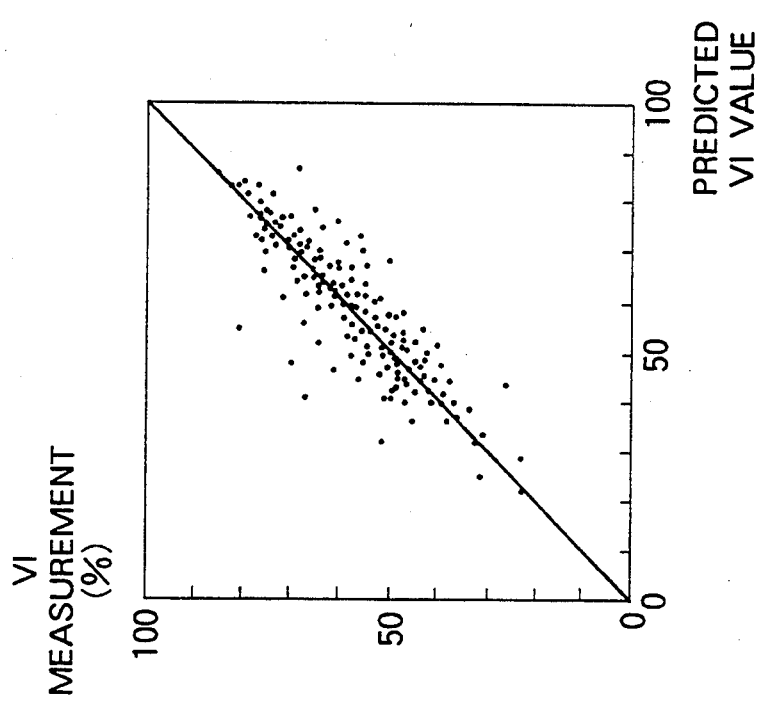
Figure 41:
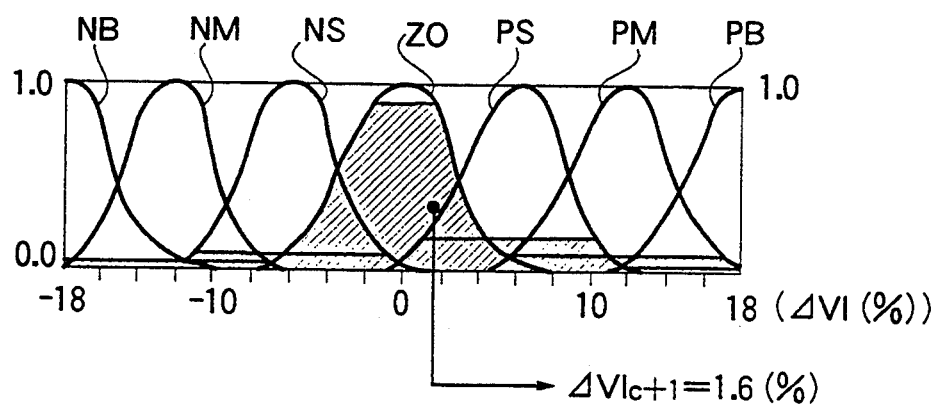
Figure 42:
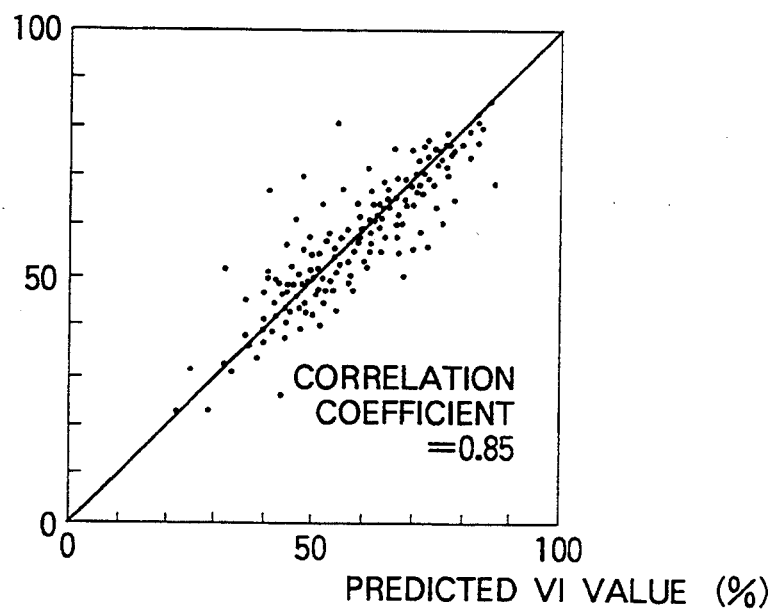
Figure 43:
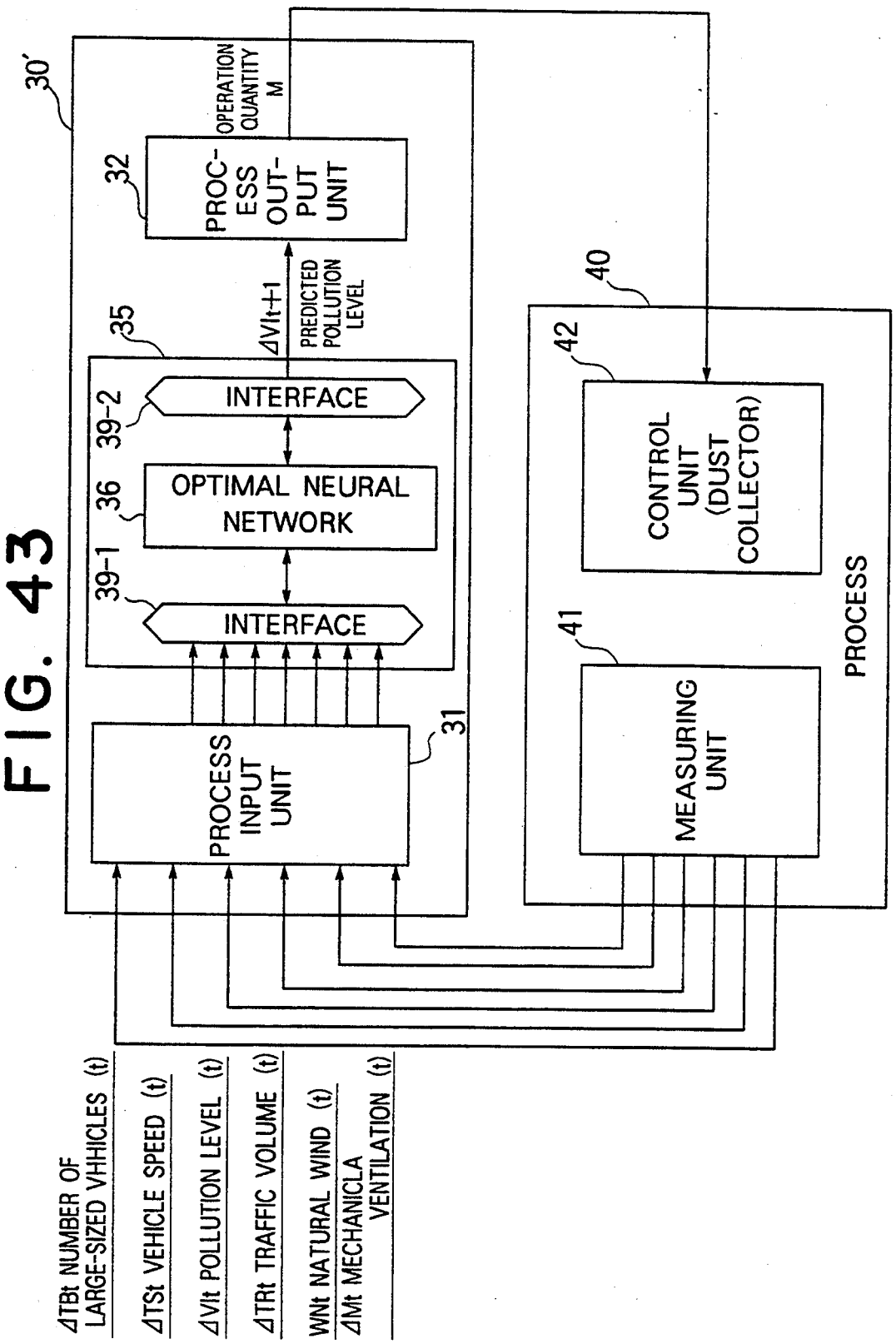
Figure 44:
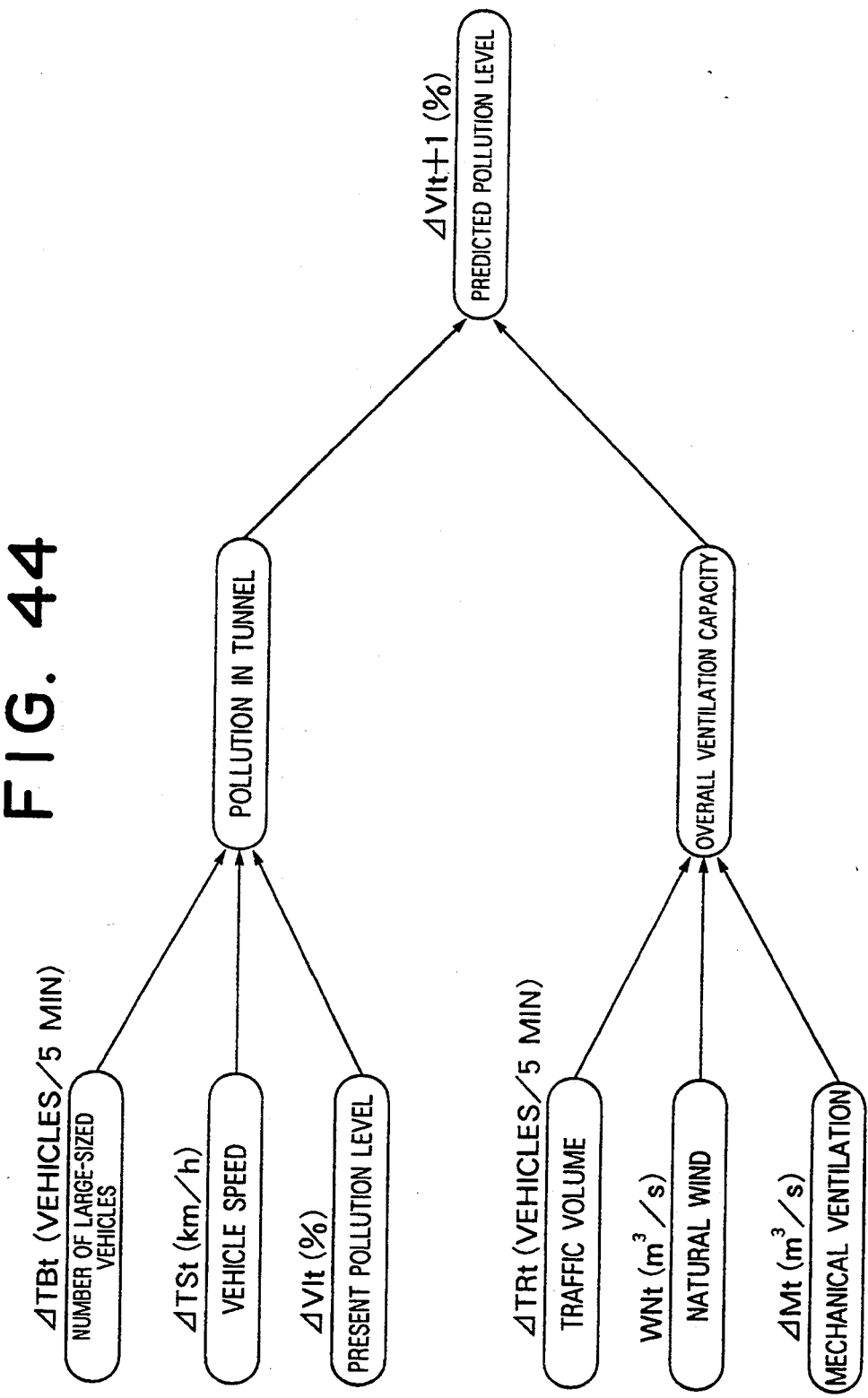
Figures 45B, 45C:
Figure 47:
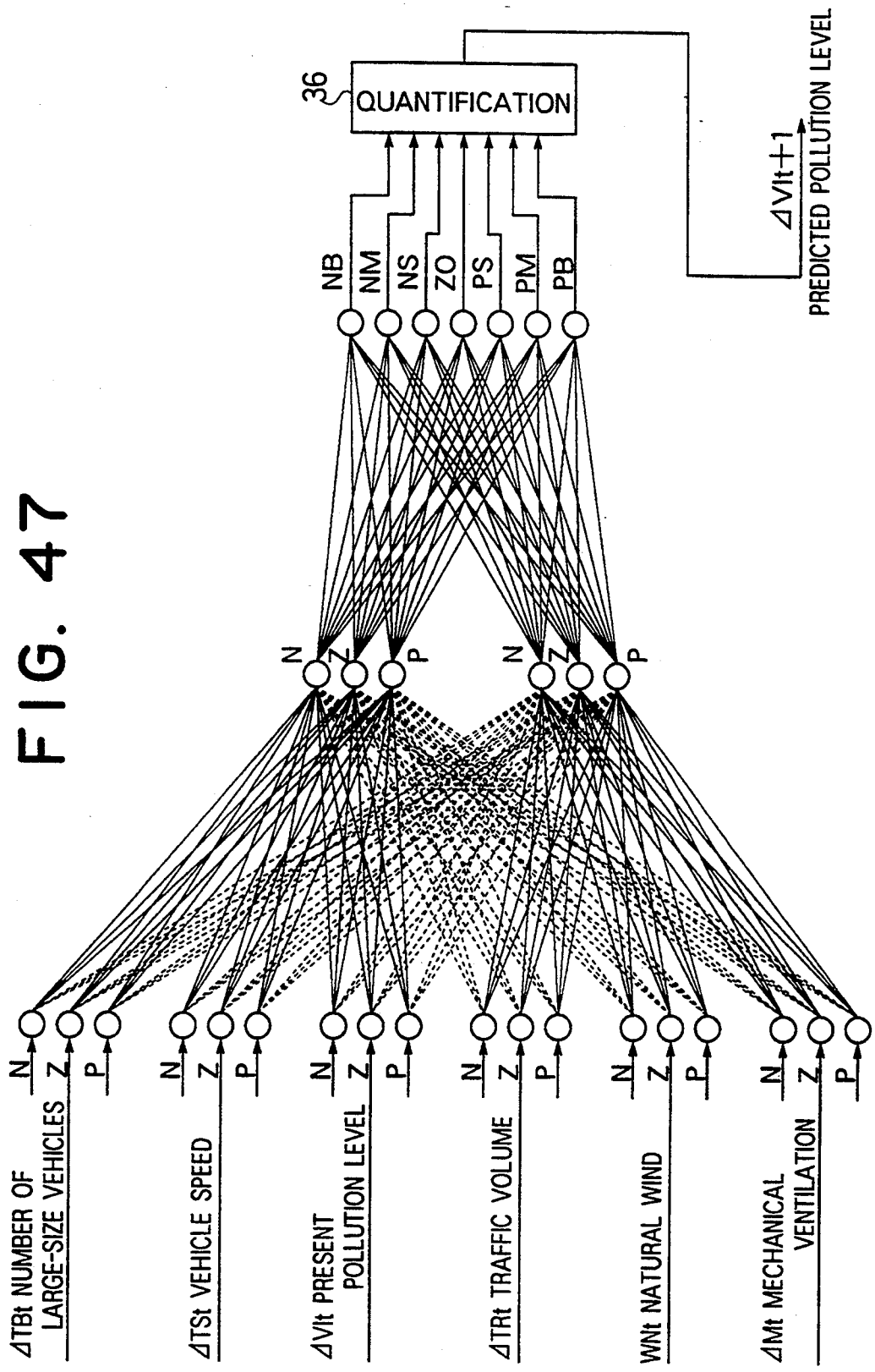
Figure 49A:
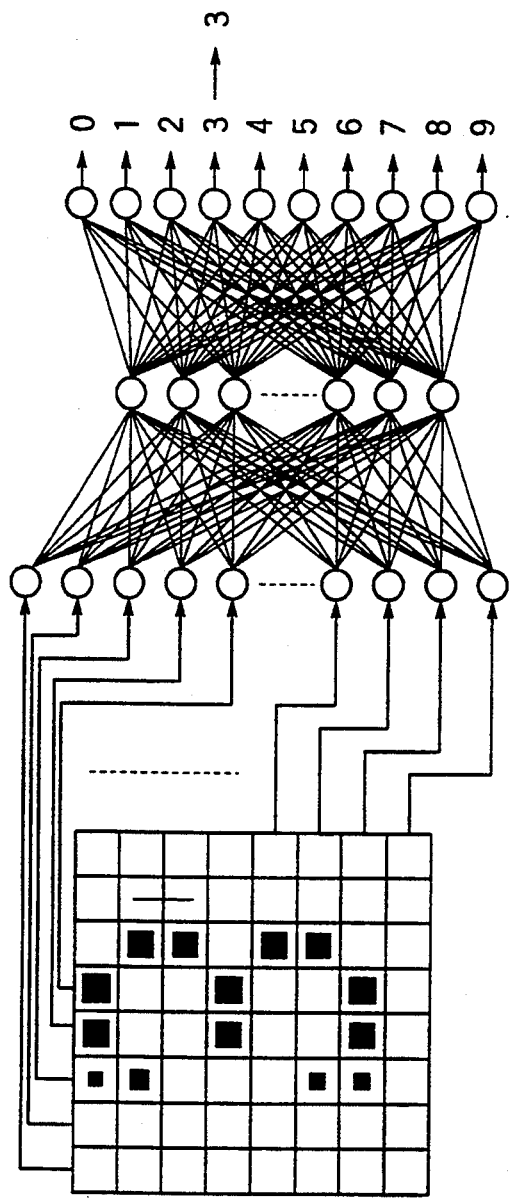
Figure 49B:
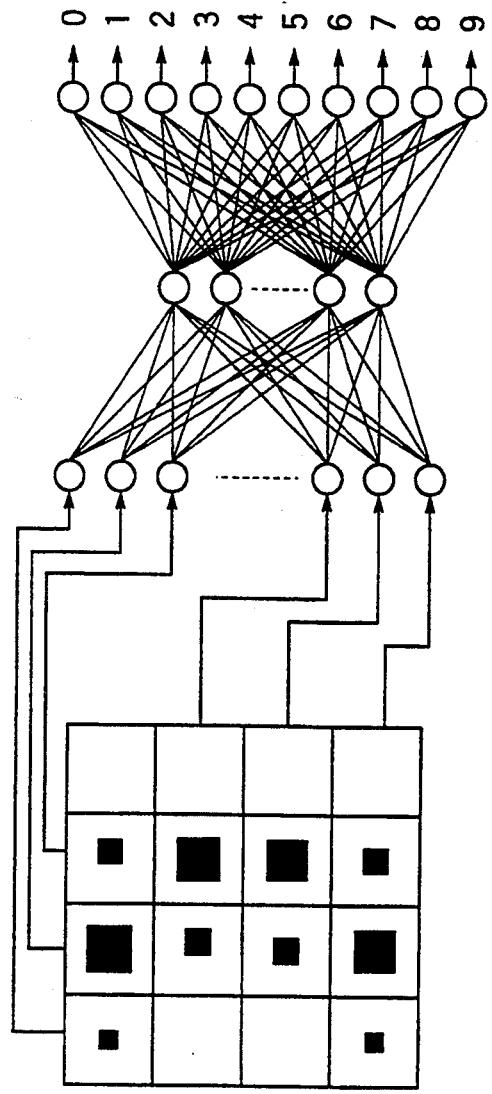

FIG. 11 block diagram showing a configuration of an information normalizing section shown in FIG. 10;

FIG. 12 is a diagram for explaining an operation of the information normalization section having a linear characteristic;

FIG. 13 is a diagram for explaining an operation of the information normalizing section having a non-linear characteristic;

FIG. 14 is a block diagram showing the detailed configuration of the neural network section according to the second modification;

FIG. 15 is a diagram for explaining the neural network section according to the second modification;

FIGS. 16A and 16B are diagrams showing product value and function value tables, respectively;

FIGS. 17A and 17B are diagrams showing specific examples of the product value and function value tables, respectively;

FIG. 18 is a flowchart for explaining a recalling operation of the neural network system including the neural network section according to the second modification;

FIG. 19 is a diagram for explaining the effect of a neural network system including the neural network section according to the second modification;

FIG. 20 is a block diagram showing a configuration of the third modification of the neural network section;

FIG. 21 a block diagram showing a configuration of the fourth modification of the neural network section;

FIG. 22 is a functional block diagram showing the configuration of the fourth modification of the neural network section;

FIG. 23 is a flowchart showing a basic definition processing of a neural network and a qualitative causal network;

FIGS. 24A, 24B and 24C are diagrams showing definition files of the qualitative causal network in FIG. 23; respectively;

FIGS. 25A and 25B are diagrams showing examples of the definition files of the neural network used in FIG. 23, respectively;

FIG. 26 is detailed flowchart for defining synapse connections in FIG. 23;

FIG. 27 is a diagram showing definition files for the synapse connections used in the flowchart of FIG. 26;

FIG. 28 is a diagram for explaining synapse connections of a conventional neural network as compared with those of the present invention;

FIG. 29 is a diagram for explaining the concept of fuzzy inference as compared with that of neural network inference;

FIG. 30 is a diagram for explaining the basic concept for generating the neural network according to the present invention from the qualitative causal network;

FIG. 31 is a block diagram showing a configuration of the first modification of the neural network system according to the present invention;

FIG. 32 is a block diagram showing a configuration of the second modification of the neural network system according to the present invention;

FIGS. 33A, 33B and 33C are diagrams showing membership functions for qualitative evaluation of information inputted to the neural network system according to the second modification, respectively;

FIG. 34 is block diagram showing a configuration of the neural network system according to the third modification of the present invention;

FIG. 35 is a block diagram showing a configuration of the neural network system according to the fourth modification of the present invention;

FIG. 36 is a diagram for explaining the input/output information of a pollution prediction system;

FIG. 37 is a block diagram showing a configuration of the neural network system according to the present invention which is applied to a pollution prediction system;

FIG. 38 is a diagram showing a model of a tunnel ventilation process;

FIG. 39 is a diagram showing correlations between a measured value and a value predicted by multi-stage fuzzy reasoning;

FIG. 40 is a diagram showing a time-depending characteristic of the correlation between the measured value and the predicted value;

FIG. 41 is a diagram for explaining an operation of a quantifying section shown in FIG. 37;

FIG. 42 is a diagram for explaining the effect of the neural network system according to the present invention which is applied to a pollution prediction system;

FIG. 43 is a block diagram showing a configuration of the neural network system according to the present invention which is applied to a process controller;

FIG. 44 is a diagram showing a qualitative causal network for a tunnel ventilation system as the process controller;

FIGS. 45A, 45B and 45C are diagrams showing definition files of the qualitative causal network for the tunnel ventilation system respectively; FIGS. 46A, 46B, 46C-1 and 46C-2 are diagrams showing definition files of the neural network for the tunnel ventilation system, respectively;

FIG. 47 is a block diagram showing a configuration of the neural network of the present invention applied to the tunnel ventilation system;

FIG. 48 is a diagram for explaining an operation of the process controller shown in FIG. 45; and FIGS. 49A and 49B are diagrams for explaining conventional neural networks, respectively.

DESCRIPTION OF THE PREFERRED EMBODIMENTS

A neural network system according to the present invention as an expert system will be described with reference to the accompanying drawings.

First, a neural network system according to an embodiment of the present invention will be explained. FIGS. 1 to 4 are diagrams for explaining the embodiment of the present invention. A general configuration of the neural network system according to the present invention is shown in the block diagram of FIG. 1. The system 1 includes a fuzzy section 2 for qualitatively evaluating a pattern X of learned/unknown information input from an input unit 3', a forward neural network 6, a fuzzy section 4 for qualitatively evaluating a teacher information pattern d(X), a weight-correcting section 7 for correcting weights of synapse connections by back propagation of an error, a quantifying section 3 for converting an output of the neural network 6 into a quantified value, an output unit 32 for outputting the result by display thereof, for example, and a control section 8 for controlling operations of the respective sections. The sections 6, 7 and 8 make up a neural network section 5. The fuzzy sections 2, 4, the correcting section 7, the control section 8 and the network 6 constitute a learning unit, while the fuzzy section 2, the network 6, the control section 8 and the quantifying section 3 make up a recalling unit.

In the present embodiment, the neural network 6 includes an input layer for inputting information, an output layer for outputting the final result, at least one intermediate layer interposed between the input and output layers, a plurality of neurons and synapses having weight coefficients for connecting between neurons of adjacent layers. The input information is subjected to qualitative evaluation by the fuzzy sections 2 and 4 by use of fuzzy membership functions predetermined according to empirical knowledge and normalized in a dynamic range, and then input to the input layer of the neural network 6. The output value of the neural network 6, which is regarded as a qualitative evaluation of fuzzy membership functions predetermined empirically, is quantified by the quantifying section.

Figure 2:
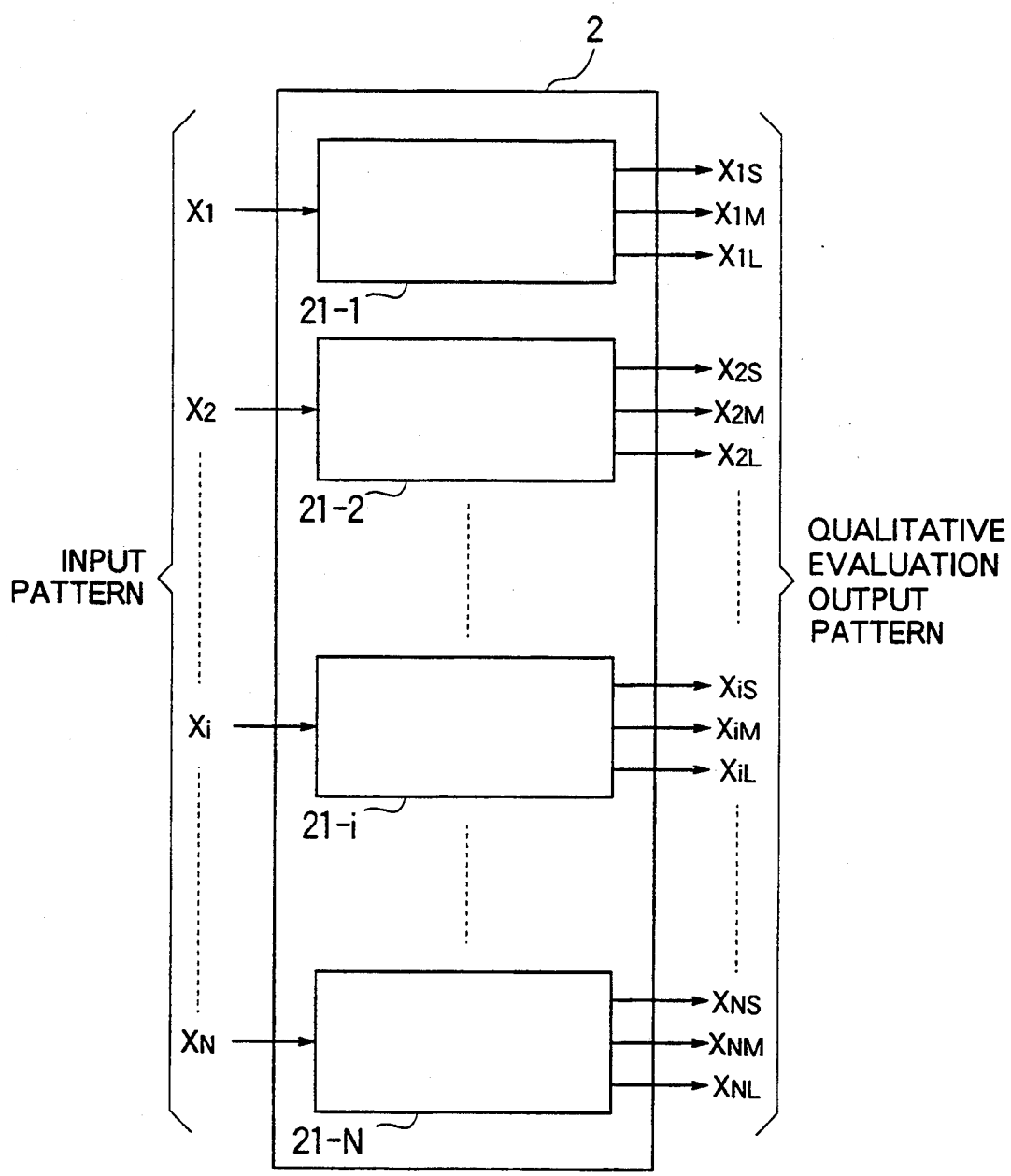
FIG. 2 is a block diagram showing a qualitatively evaluating fuzzy section shown in FIG. 1.

FIG. 2 shows a configuration of the fuzzy section 2, which is similar to that of the section 4. This section 2 includes adaptability processing section 21 (21-1, ..., 21-n) for qualitatively evaluating information X (=$X_1$, $x_2$, ..., $x_n$) as a pattern of the learned/unknown information input to the section 2 and outputting three evaluations for each element of the information X.

Figure 3:
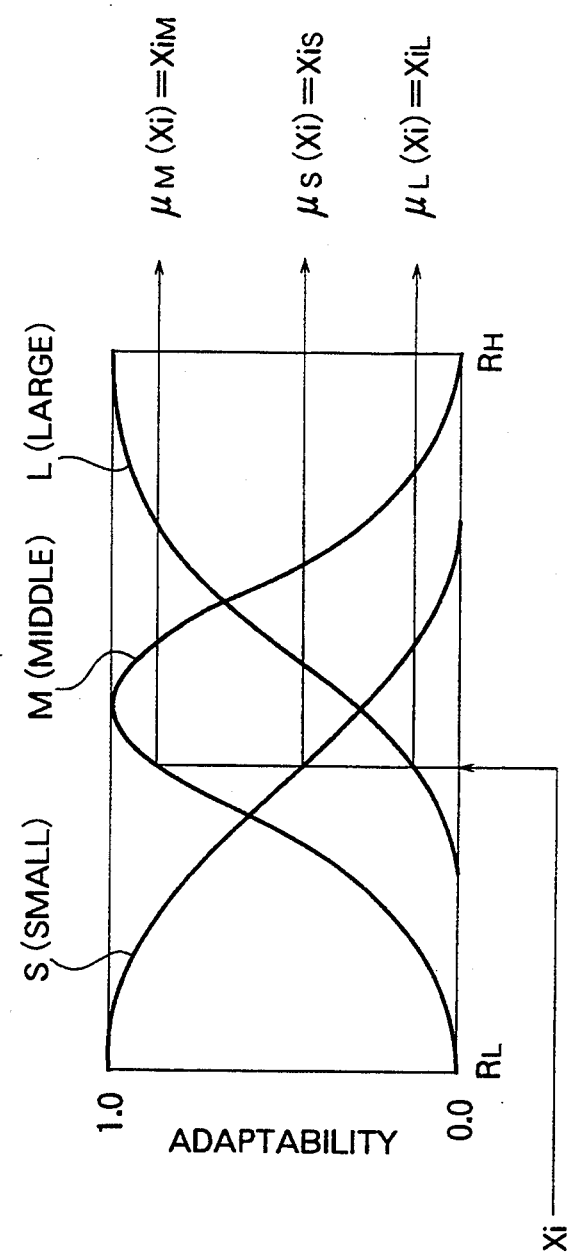
FIG. 3 is a diagram for explaining membership functions of the fuzzy section and an operation thereof.

FIG. 3 is a diagram for explaining an operation of the adaptability processing section 21. As shown in the diagram, the section 21 has prestored therein membership functions respectively corresponding to three types of qualitative evaluations such as S (small), M (medium) and L (large), for example, on the basis of the empirical information from experiences and experiments. Each element $x_i$ (i=1, 2, ..., n) of the input information is evaluated by use of the curves of the three types of membership functions and thereby is converted into three evaluations shown below.

$$\mu_S(x_i) = x_{iS}$$

($\mu S$ represents an adaptability function for the evaluation type S)

$\mu_M(x_i)=x_{iM}$ $\mu_L(x_i)=x_{iL}$

A pattern X' of these qualitative evaluations is inputted to the neural network 6.

The teacher information pattern d(X), on the other hand, is converted to three types of evaluations for respective elements of the information pattern d(X) by the fuzzy section 4 as a pattern d'(X) of the qualitative evaluations.

Figure 4:
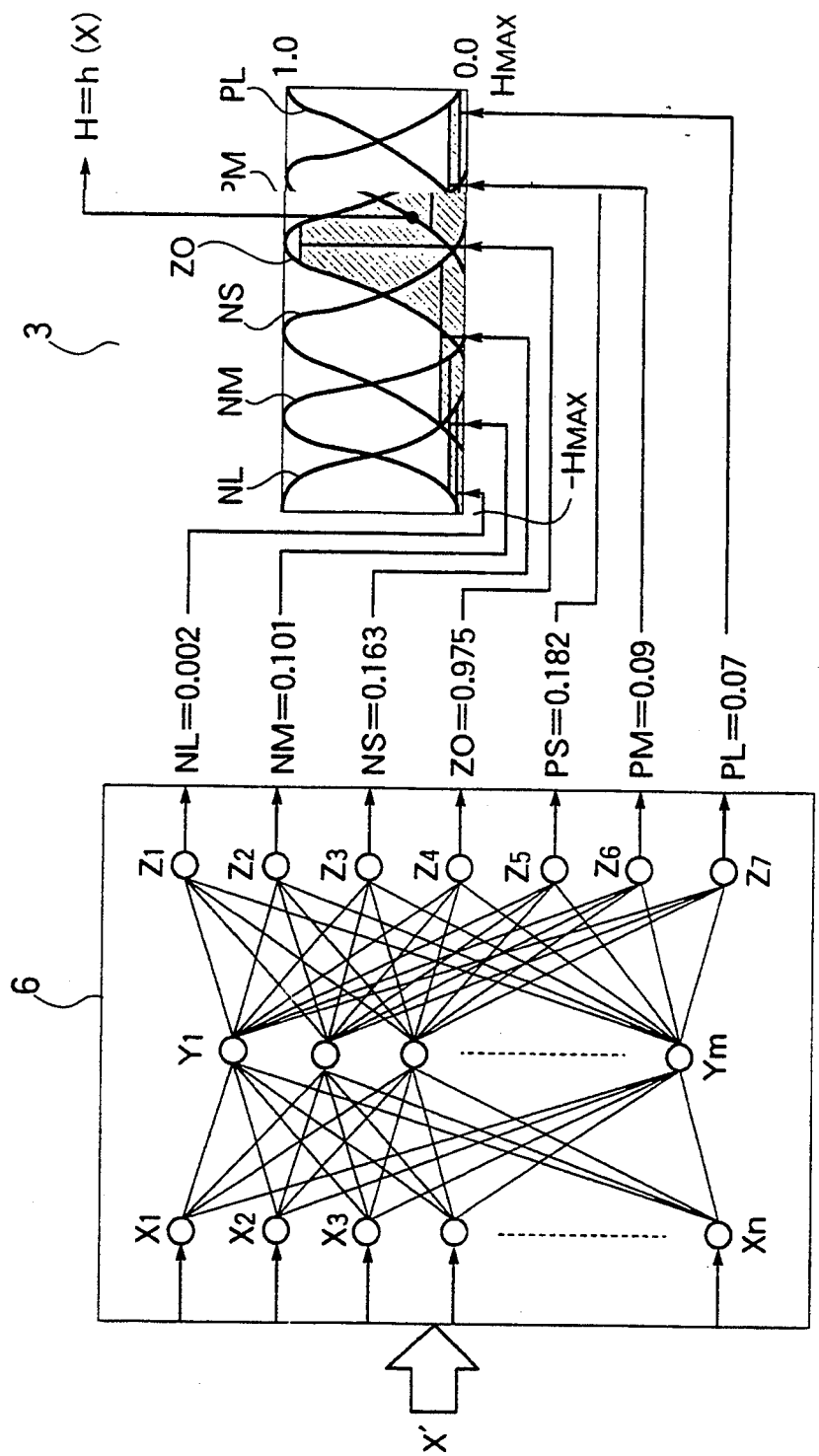
FIG. 4 is a diagram for explaining operations of a forward neural network and a quantifying section shown in FIG. 1.

FIG. 4 schematically shows a configuration of the forward neural network 6 and the quantifying section 3. Although a forward three-layer network model is illustrated in the diagram, the present invention is also applicable to a network multilayered structure having four or more layers.

Figure 6:
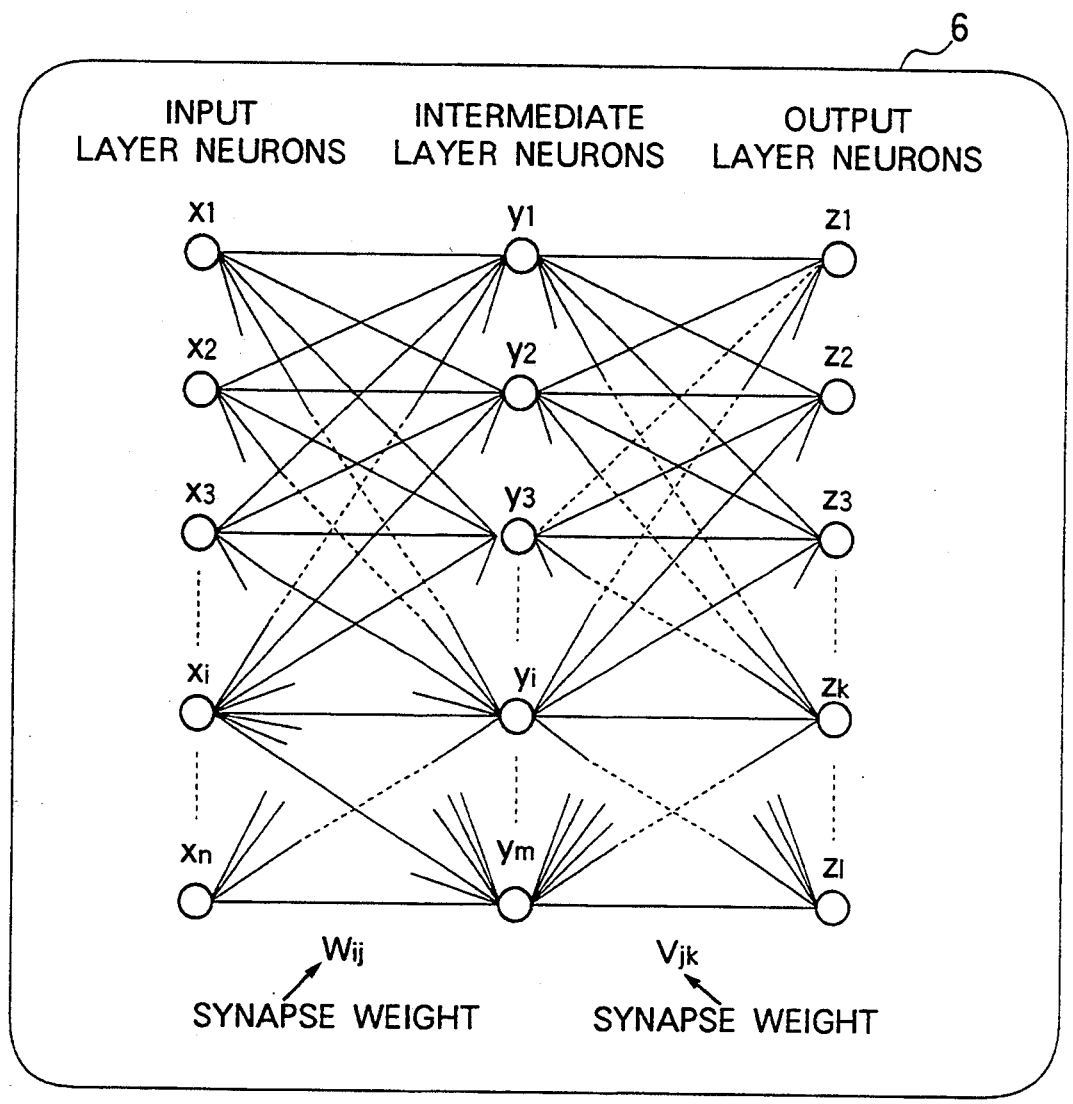
FIG. 6 is a diagram for schematically explaining a neural network shown in FIG. 1.

The neural network 6 shown in FIG. 6 includes n neurons x ($x_1, x_2, \ldots, x_n$) of an input layer, m neurons y ($y_1, y_2, \ldots, y_m$) of an intermediate (hidden) layer, l neurons z ($z_1, z_2, \ldots, z_l$) of an output layers, synapses for connecting the neurons between the input and intermediate layers and having weights $W_{ij}$ (i=1 to n; j=1 to m), and synapses for connecting the neurons between the intermediate and output layers and having weights $V_{jk}$ (j=1 to m; k=1 to l). The weights $W_{ij}$ and $V_{jk}$ range from −1.0 to 1.0. Each neuron has spatial additive and non-linear characteristics and is subjected to the processing (recalling) described later.

The correcting section 5, which is supplied with outputs X' and d'(X) from the fuzzy sections 2 and 4 and a recalled output h'(X) of the neural network 6, corrects the weight of synapses of the neural network 6 in such a manner as to minimize or reduce below a predetermined value difference between the outputs h'(X) and d'(X).

The system 1 configured as described above performs the learning as explained below when the evaluated pattern X' (=$x_{1S}, x_{1M}, x_{1L}, x_{2S}, x_{2M}, x_{2L}, \ldots$) of the learned information pattern X and the evaluated pattern d'(X) of the corresponding teacher information pattern d(X) are given.

Step (1) An output value of each neuron of the intermediate layer is calculated:

The output value of each neuron of the intermediate layer is calculated. Specifically, after the product of each element of the evaluated pattern d'(X) of the learned information pattern as each input value and the weight $W_{ij}$ of each synapse of each neuron is computed, and the total sum of the products for each neuron is determined, computation of the value of a non-linear function (the value of a sigmoid function in the case under consideration) is performed for the total sum for each neuron, thereby determining output values of the neurons of the intermediate layer.

$$y_j = \sigma(w_{0j} + w_{1jS}x_{1S} + w_{1jM}x_{1M} + \quad (1)$$
$$w_{ijL}x_{1L} + w_{2jS}x_{2S} + w_{2jM}x_{2M} + \ldots + w_{njL}x_{nL})$$

(j = 1, 2, ..., m)

where
y: the output values of the neurons of the intermediate layer,
$\sigma$: Sigmoid function $$\sigma(S)=1/(1+e^{-S}) \quad (2)$$

Step (2) Output values of the neurons of the output layer are calculated:

The product of the output value of each neuron of the intermediate layer determined in the above Step (1) and the weight $V_{jk}$ is calculated, after the total sum of the products is computed for each neuron. Further, the value of a non-linear function (sigmoid function) for the total sum is computed to determine the output values of the neurons of the output layer.

$$z_k = \sigma(v_{0k} + v_{1k}y_1 + v_{2k}y_2 + \ldots + v_{mk}y_m) \quad (3)$$

(k=1, 2, ..., l)

With regard to the set of the output value $z_k$ of the neural network obtained by the above steps (1) and (2), i.e., the recalled information pattern h'(X), the learning process described below is effected by the correcting section 7 shown in FIG. 1, to thereby correct the synapse weight. By repeating the weight corrections, the learning of the neural network 6 is effected.

Step (3) The correction amount of each synapse weight is computed.

The correction amounts $\delta_{2k}(X)$ and $\delta_{ij}(X)$ of each synapse weight minimizing the error between the pattern d'(X) of the evaluated values of the known teacher information and the recalled information pattern h'(X) obtained in the above Step (2) are computed.

$$\delta_{2k}(X) = \alpha(X)(h'_k(X) - d'_k(X)) \cdot h'_k(X)(1 - d'_k(X))$$

$$\delta_{1k}(X) = \left\{ \sum_{k=1}^{l} \delta_{2k}(X)v_{jk} \right\} \cdot f_j(X)(1 - f_j(X))$$

(j = 1, ..., m)

where $\alpha(X)$ is the degree of importance relating to the proximity of the output information pattern, i.e., a vector h'(X) against an input information pattern, i.e., a vector X', and is a known item, and $f_j(X)$ is m n-variable functions given as $$f_j(X)=\delta(w_{0j}+w_{1j}x_1+ \ldots w_{nj}x_n)=y_j(j=1, \ldots, m)$$

Step (4) Weight is corrected:

The present synapse weights $v_{jk}^{old}$, $w_{ij}^{old}$ are corrected to new weights $v_{jk}^{new}$, $w_{ij}^{new}$ by use of the result of Step (3).

$$v_{jk}^{new} = v_{jk}^{old} - \frac{\Delta}{|X|} \sum_X \delta_{2k}(X)f_j(X)$$

(j = 0, ..., m; k = 1, ..., l)

$$w_{ij}^{new} = w_{ij}^{old} - \frac{\Delta}{|X|} \sum_X \delta_{ij}(X)x_i$$

(i = 0, ..., n; j = 1, ..., m)

where |X| is the number of elements of the evaluated pattern and $\Delta$ a differentiation width as a known item.

As explained above, according to the neural network system of the present invention, a learned information pattern and a teacher information pattern are qualitatively evaluated, and the value of each element is normalized in a range of 0 to 1 by membership functions. As a result, the consistency of correlation between the learned information pattern and the teacher information pattern is improved, thereby making possible stable and high-accuracy learning.

After completing the learning by the abovementioned procedure, the weights of synapses are fixed. The neural network having the fixed weights may be transplanted to a system used as a recalling unit. As a result, the recalling unit is able to make accurate decisions even with unknown input information. An operation of the recalling unit is identical to the one described in the above Steps (1) and (2). Specifically, the total sum of the products of the qualitative evaluations of the input information and the synapse weights is computed for each neuron and then values of the sigmoid function is determined for the neurons, thereby obtaining output values of the neurons of the intermediate layer. Next, the output values of the neurons of the output layer, i.e., the recalled result, are generated from the output values of the neurons of the intermediate layer and the synapse weights of the neurons of the output layers.

The recalling unit is configured of the fuzzy section 2 for inputting an unknown information pattern $X(=x_1, x_2, \ldots, x_i, \ldots, x_N)$ and for outputting a qualitative evaluation pattern $X'$, the neural network 6 for inputting the qualitative evaluation pattern $X'$ output from the section 2 and for outputting an evaluated pattern $h'(X)$ for the object of recalling, the quantifying section 3 for inputting the evaluated pattern $h'(X)$ and for converting it into and outputting a quantified value, and the control section 8. Of these component parts, the section 2 and the neural network 6 perform the same operation as the learning unit and will not be described again.

FIG. 4 is a diagram for explaining an operation of the quantifying section 3. In this case, seven types of evaluations including

- NL (large minus),
  NM (medium minus),
  NS (small minus),
  Z0 (zero),
  PS (small plus),
  PM (medium plus) and
  PL (large plus)

are defined as a value of each neuron of the output layer, i.e., a qualitative evaluation of the output value of the network 6. Seven types of qualitative evaluation curves are prepared with the ordinate representing an adaptability in the range of 0.0 to 1.0 and the abscissa representing the value of the recalled object H ($-H_{MAX}$ to $+H_{MAX}$) on the basis of empirical information. The number of neurons of the output layer of the network 6 is seven in the present embodiment and corresponds to the qualitative evaluations NL, NM, NS, Z0, PS, PM and PL. According to the recalled result of the network 6, the evaluation curve of each membership function is cut off by the output value of each neuron, to thereby determine the gravity center of the hatched area. A value H corresponding to this gravity center is output as a recalled result $h(X)$.

When recalling is effected by the recalling unit such as described above, the input information is qualitatively evaluated and normalized before being input to the neural network 6, so that the recalled output of the network 6 can be handled as a qualitative evaluation pattern. It is possible to quantify the output by defuzzying this recalled output by predetermined membership functions.

According to the present invention configured as described above, input information is evaluated qualitatively by a fuzzy set and used as an input to the neural network. Therefore, even input information containing a strong non-linearity or many indefinite characteristics can be evaluated accurately. In addition, since the evaluation is normalized within a predetermined range, even input information of different natures can be subjected to learning/recalling with stability and high accuracy.

Also, in view of the fact that the output of the neural network is handled as a qualitative evaluation pattern of an object of recalling and quantified by use of empirically-determined membership functions to obtain an output value, the learning/recalling can be effected with high stability and accuracy.

Further, by combining the above-mentioned advantages, the inference rule of the conventional fuzzy inference system can be replaced with the neural network recalling unit, and therefore the tuning time can be shortened and accuracy of the inference can be improved, compared with the conventional fuzzy system.

Furthermore, the information processing by the neural network which so far could be applied only to very limited objects becomes widely applicable as a means for solving general problems.

A first modification of the neural network section 5 of the neural network system 1 according to the present invention will be explained below with reference to the accompanying drawings.

In a neural network including an input layer for inputting information, an output layer for outputting a final result, at least one intermediate layer interposed between the input and output layers, a plurality of neurons for each layer, and synapses with weight coefficients, for connecting the neurons, when the absolute value of the weight coefficient of a synapse is reduced below a predetermined value, the synapse is removed from the neural network.

Figure 1:
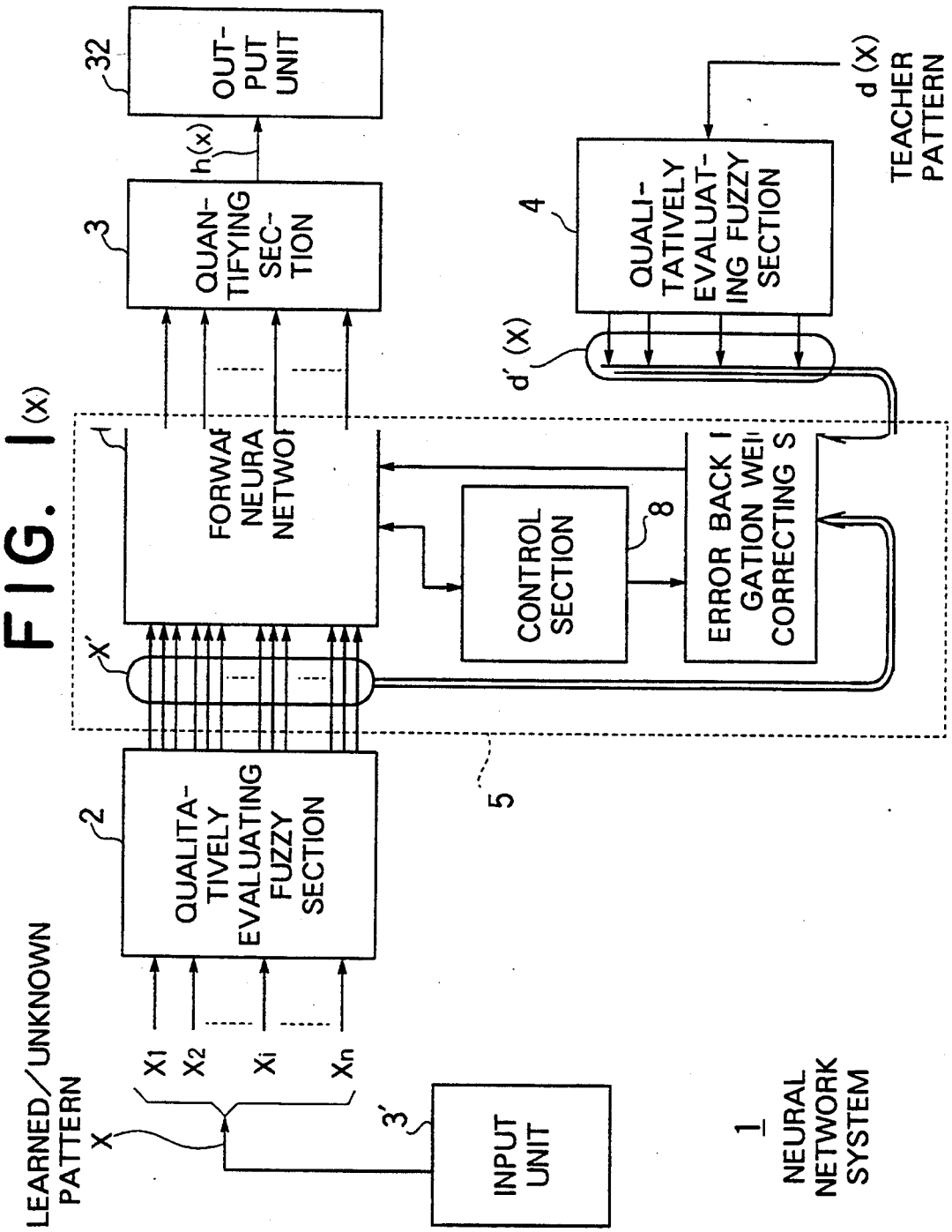
FIG. 1 is a block diagram showing a general configuration of a neural-network system according to a first embodiment of the present invention.

In this embodiment, components of the network section 5 identical to those in FIG. 1 are designated by the same reference numerals, respectively and will not be described in detail again.

Figure 5:
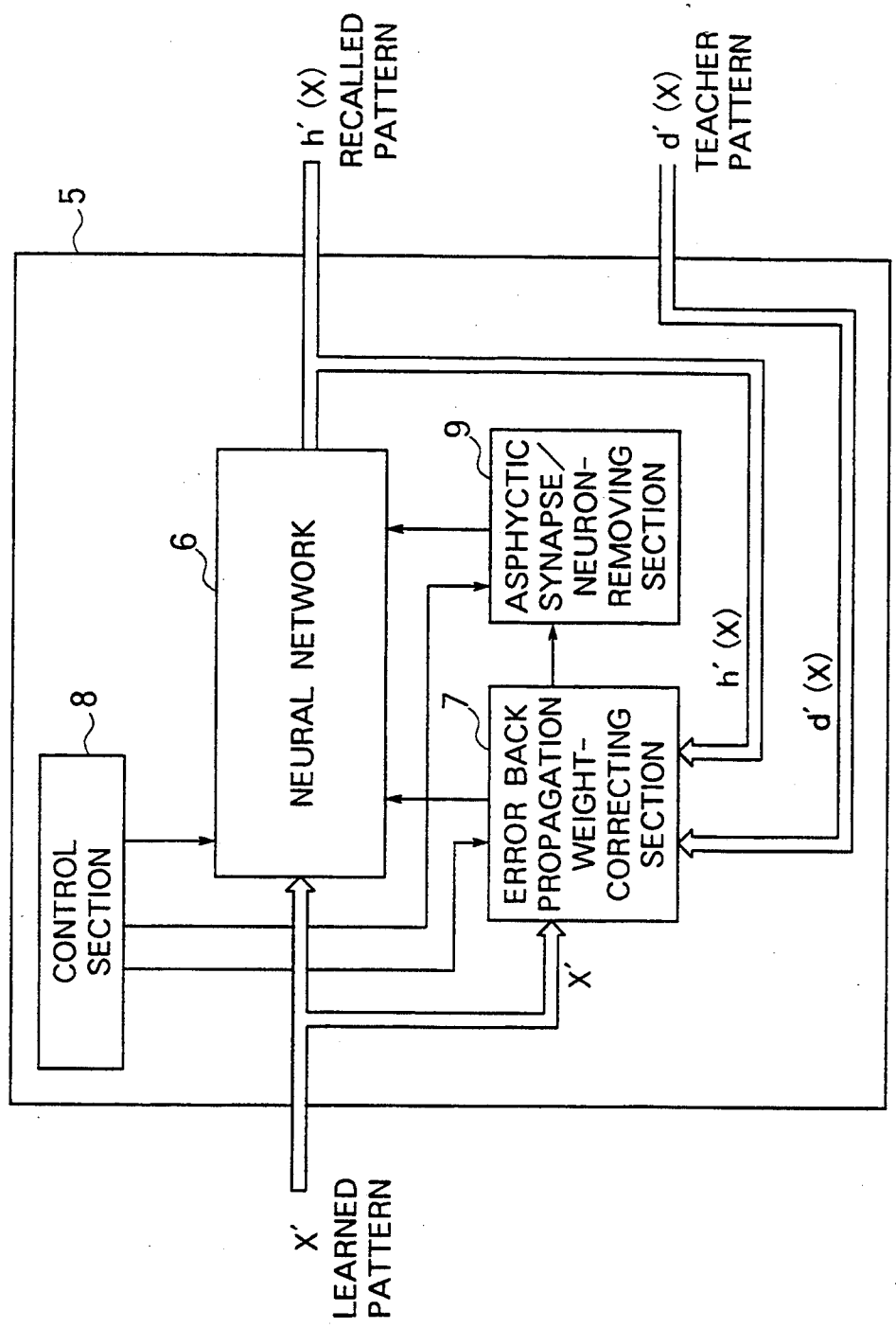
FIG. 5 is a block diagram showing a configuration of a first modification of the neural network section.

FIG. 5 is a block diagram showing a configuration of the neural network section 5 capable of removing asphyctic synapses/neurons from the neural network 6 for an improved computation speed. The section 5 includes a neural network 6, a weight-correcting section 7, a section 9 for removing asphyctic synapses/neurons and a control section 8.

In this network section 5, a qualitatively evaluated pattern $x'$, as the learning information pattern, and a qualitatively evaluated pattern $d'(x)$, as a known teacher information pattern corresponding to the pattern $x'$, are supplied to the correcting section 7. The section 7 computes and sets anew the weight of each synapse in such a manner that the output of the neural network 6 for the input $x'$, i.e., the error between the recalled information pattern $h'(x)$ and the pattern $d'(x)$, is minimized. This process is repeated, and after correction of the synapse weight is completed, the removing section 9 is initialed to remove asphyctic synapse/neurons. The control section 8 controls the processes described above.

FIG. 6 schematically shows a configuration of the neural network 6. Although a network model of three layers is illustrated, the present invention is applicable with equal effect to a multilayered network of four or more layers. The learning process of the neural network 6 is similar to that described above and will not be explained again.

After completion of the learning in the Steps (1) to (4) described above, the corrected weight of each synapse is determined as explained below by the removing section 9, so that asphyctic synapses/neurons are removed from the neural network 6. The removal of the asphyctic synapses/neurons may be effected by a method of omitting the operating procedure for the asphyctic synapses/neurons by the control unit 8 or the like in the recalling/learning process.

Figure 7:
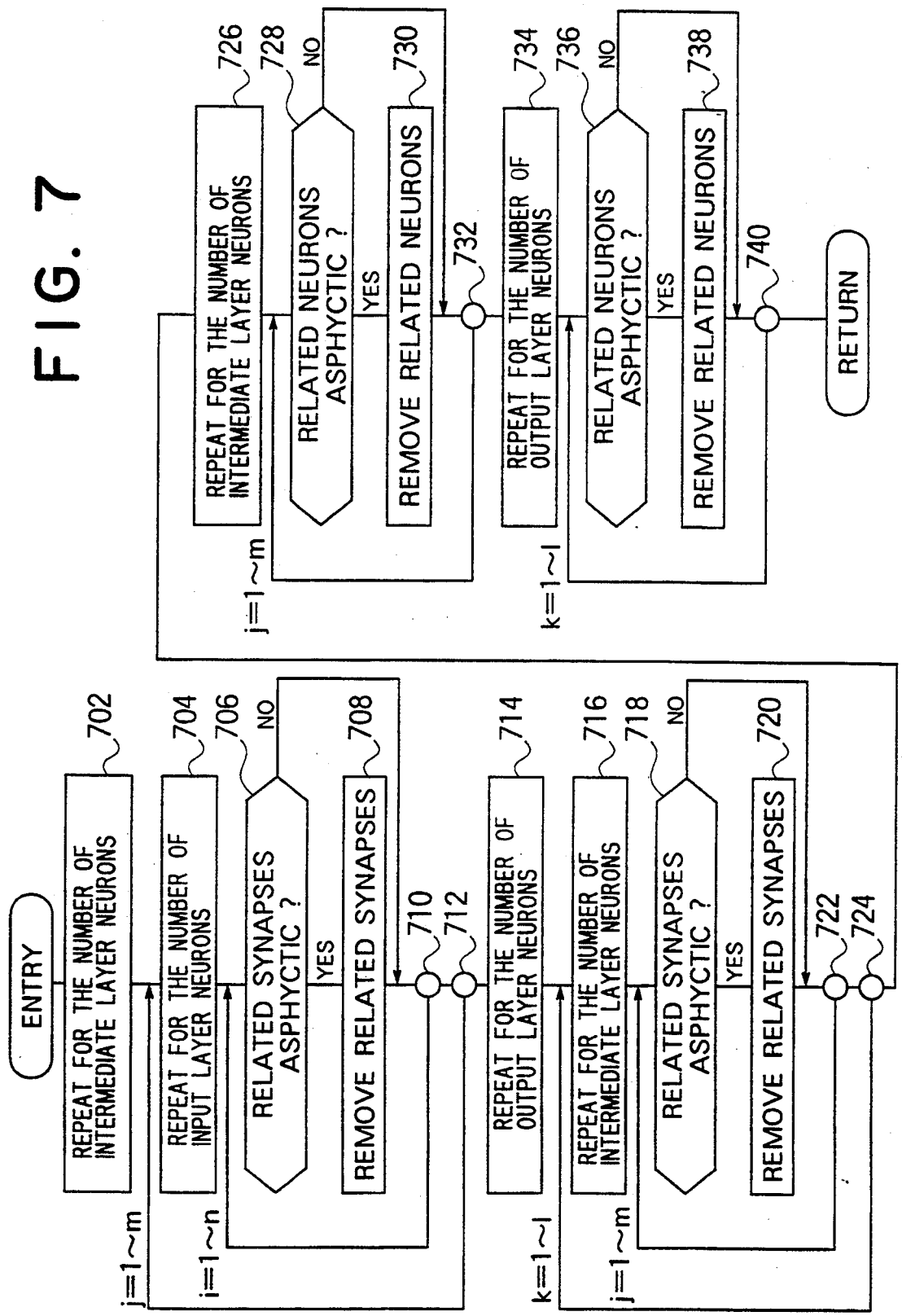
FIG. 7 is a flowchart showing an operation of a removing section shown in FIG. 5 for operatively removing asphyctic syapses/neurons from the neural network.

FIG. 7 shows a flow of the procedure for removing-asphyctic synapses/neurons by the removing section 9. Asphyctic synapses between input and intermediate layers are removed at steps 702 to 712, those between intermediate and output layers at steps 714 to 724, asphyctic neurons in the intermediate layer at steps 726 to 732, and those in the output layer at steps 734 to 740.

(Step 706) As a criterion of asphyxia, a synapse is considered to be asphyctic when $|w_{ij}| < \alpha$ (i=1, ..., n; j=1, ..., m).

(Step 708) the synapse having $w_{ij}$ is removed from the neural network 6.

(Step 718) As a criterion of asphyxia, a synapse is considered to be asphyctic when $|v_{jk}| < \alpha$ (j=1, ..., m; k=1, ..., l).

(Step 720) the synapse having $v_{jk}$ is removed from the neural network 6.

(Step 728) As a criterion of asphyxia, a neuron is considered to be asphyctic when $y_j = \{w_{ij} = \phi \text{ for } i=1 \text{ to } n\}$.

(Step 730) The neuron with $y_j$ is removed from the neural network 6.

(Step 736) As a criterion of asphyxia, a neuron is considered to be asphyctic when $z_k = \{v_{jk} = \phi \text{ for } j=1 \text{ to } m\}$.

(Step 738) The neuron having $z_k$ is removed from the neural network 6.

Figure 8:
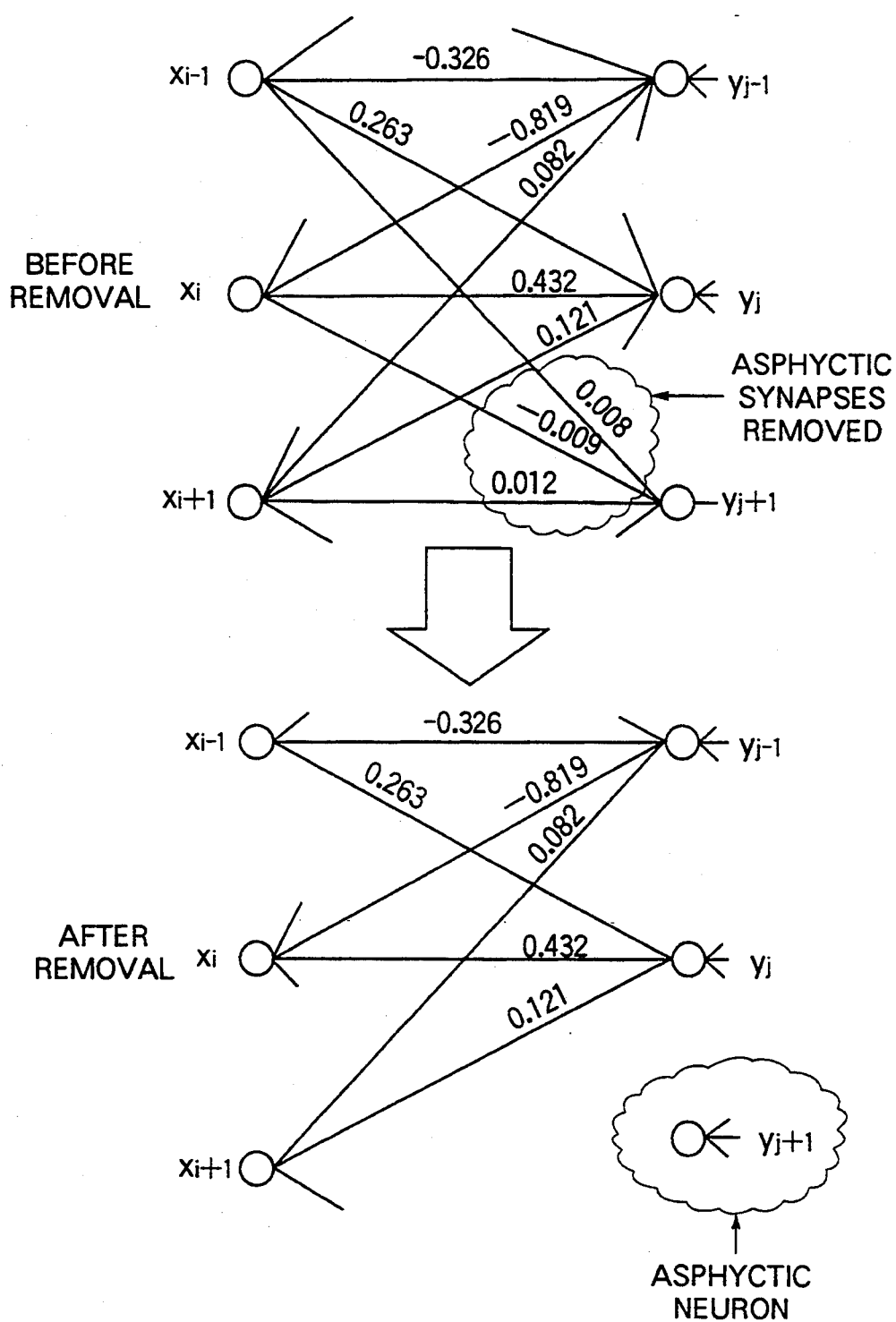
FIG. 8 is a diagram showing the states of a neural network before and after removal of the asphyctic synapses/neurons.

FIG. 8 is a diagram for explaining the operation of the removing section 9. Before the operation of the section 9, all neurons are connected by synapses as shown at the upper part of the diagram. Assume that the constant $\alpha$ used for determing asphyxia is given as 0.013. After the operation, the condition for asphyxia is met by synapses having the following weights:

$|w_{i-1\,j+1}| = 0.008$
$|w_{i\,j+1}| = 0.009$
$|w_{i+1\,j+1}| = 0.012$

Therefore, the synapses are removed. As a result, the neuron $y_{j+1}$ of the intermediate layer also become asphyctic. Thus neuron $y_{j+1}$ is removed together with the output synapses $v_{j+1\,k}$ (k=1 to m).

As described above, the neural network 6 is optimized by removing asphyctic synapses/neurons at the time of completion of learning, with the result that the number of computaitons of the products of neuron output values and synapses weight is reduced at the time of recalling operation, thereby achieving a higher speed.

The foregoing is a description on a method of optimizing a neural network immediately after learning. In contrast, consider a case where the weights of synapses are fixed after the learning is completed and a neural network with the fixed synapses is transplanted to an actual system for the recalling. The "recalling" here means an operation of the neural network of the actual system. The recalling operation is the same as that described in the above Steps (1) and (2). Specifically, the total sum of the products of elements of an evaluated pattern as input information and the synapse weights are computed, and then a value of the sigmoid function for the total sum is computed, so as to determine an output value of each neuron of the intermediate layer. In the next step, the neuron output values of the output layer, i.e., the recalled result is obtained from the neuron output values of the intermediate layer and the synapse weights of the neurons of the output layer.

Although the asphyctic synapses/neurons are removed after completion of the learning in the case described above, they may instead be removed during the process of learning.

Figure 9:
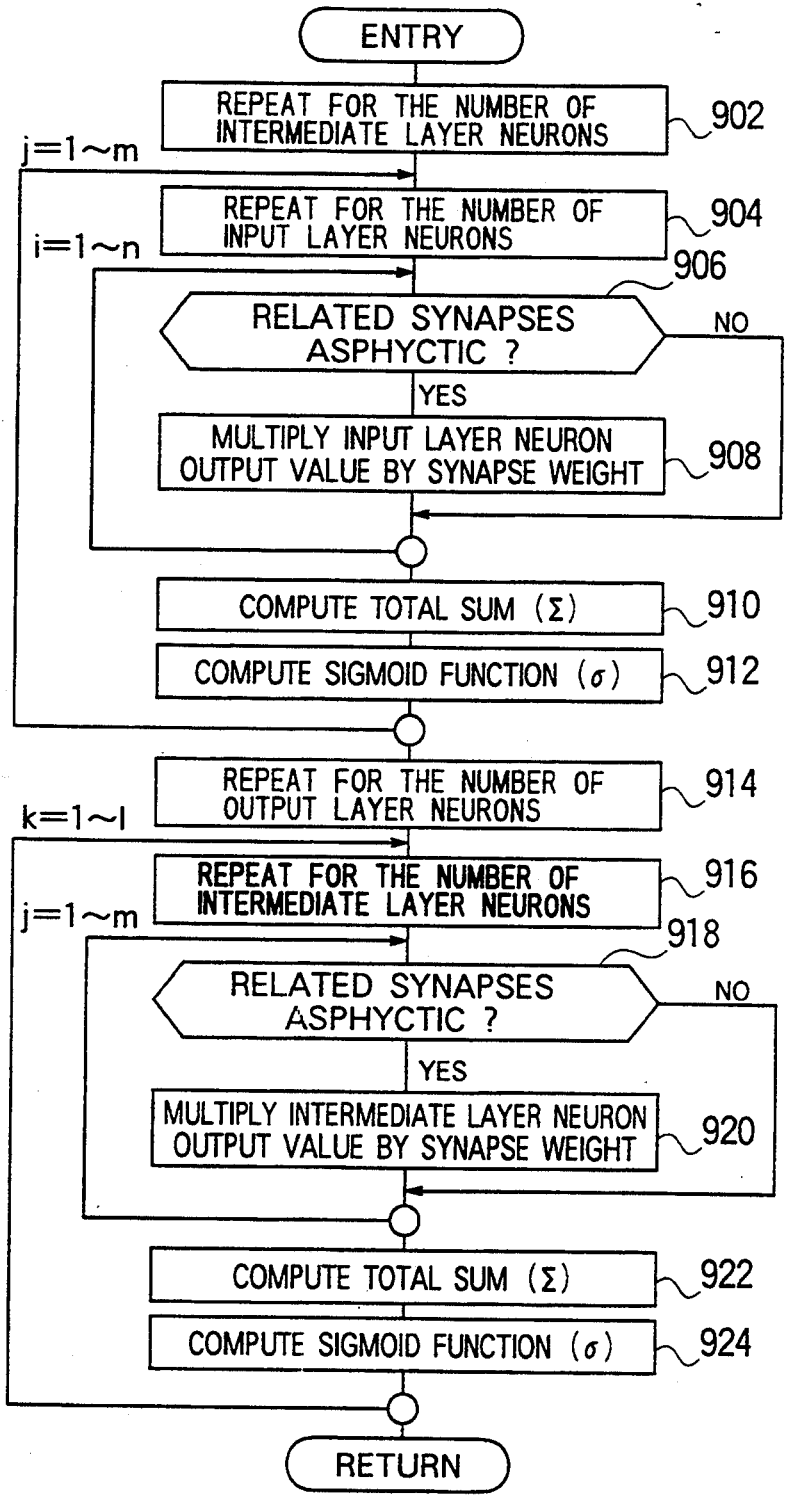
FIG. 9 is a flowchart showing an operation of the removing section in recalling of the neural network.

FIG. 9 is a flowchart for explaining the operation of the neural network system when the present invention is applied for recalling to a neural network 6 from which asphyctic synapses/neurons are not yet removed. Computations are omitted for asphyctic synapses of neurons between input and intermediate layers at steps 902 to 912, and those for asphyctic synapses of neurons between intermediate and output layers at steps 914 to 924. As a result, a high-speed recalling can be realized by the present method even for a neural network not optimized.

Now, explanation will be made about the second modification of the neural network section 5 of the neural network system according to the present invention with reference to FIGS. 10 to 18.

According to this embodiment, in a neural network including an input layer for inputting information, an output layer for outputting a final result, at least one intermediate layer interposed between the input and output layers, a plurality of neurons disposed for each layer and synapses with weight coefficient for connecting the neurons between adjacent layers, there is provided a section for normalizing the input information in a predetermined range and inputting the normalized information to the input layer, whereby a dynamic range of the neuron output value can be determined.

FIG. 10 shows a configuration of the neural network section 5 to which the present invention is applied. An input information normalizing section is for normalizing an information evaluated pattern x' for the learning. A high-speed neural network 6', the error back propagation weight correcting section 7 and the control section 8 10 the section 5 are equivalent to corresponding component parts in FIG. 5. Memory 10 was not included in the network section 5 of FIG. 5. In this configuration (FIG. 10), the weights of synapses in the high-speed neural network 6' is determined by use of the teacher information evaluated pattern d'(X) for the pattern x'.

FIG. 11 shows a configuration of the normalizing section 11, which includes n information normalizing units (11-1, ..., 11-n) for normalizing input data $x'_i$ (i=1, 2, ..., n) to a b-bit digital value. The input data x' is either analog or digital Explanation will be made below about the normalizing operation of the input data $x'_i$ having a bits.

FIG. 12 is a conversion graph for converting the input data $x'_i$ having a range of 0 to $(2^a-1)$ to the range of 0 to $(2^b-1)$ by linear processing. Assume that a>b, a=12 and b=8. At this time, the range of 0 to $(2^{12}-1=4095)$ can be linearly converted to the range of 0 to $(2^{12}-1=255)$. As a result, the input data $x'_i$ having various ranges are entirely normalized to $x''_i$ having a range of b bits or less.

FIG. 13 shows an example of the normalizing section 11 in a case of an input $x'_i$ having indefinite elements and non-linear characteristics. In this case, concept of the fuzzy set is introduced, and three types of qualitative evaluations $x_{iL}$, $x_{iM}$ and $x_{iS}$ having a range of $(2^b-1)$ for the input data $x'_i$ are outputted. In the diagram, the abscissa represents the range of 0 to $(2^a-1)$ of $x'_i$, and the ordinate the range of 0 to $(2^b-1)$ of $x'_i$. Types of qualitative evaluations are defined as membership functions of a degree S (small), M (middle) and L (large). As a result, the input data $x'_i$ of a bits is converted into a b-bit data $x''_{iS}$ (small in degree), $x''_{iM}$ (middle in degree) or $x''_{iL}$ (large in degree). According to this method, stable learning and recalling are made possible even when the input information has considerably indefinite elements and strong non-linear characteristics.

FIG. 16A shows a two-dimensional product value table 10-1 prestored in the memory 10 as a case in which a product value of (b+c) bits is searched from the product value table of $(0 \text{ to } (2^b-1)) \times (0 \text{ to } (2^c-1))$ in accordance with an address including a synapse weight and input data.

FIG. 16B shows a sigmoid function table 10-2 prestored in the memory 10. The S range of the sigmoid function is limited to $(-P \times 2^{b+c})$ to $(P \times 2^{b+c})$ when the maximum number of neurons in the intermediate/output layers is assumed to be P. As a result, as seen in FIG. 16B, it is possible to read out a computating result in accordance with a total sum of product values as an address if the function value table 10-2, in which function values are defined in advance, is stored in the memory 10. Thus, the computation for a non-linear function (sigmoid function) can be omitted.

FIG. 14 is a block diagram showing a configuration of the high-speed neural network 6' aimed at a higher speed by parallel processing with sync signals. The network 6' includes a search section 63 for searching for a value of the product of an output value of a neuron or input value, and a synapse weight from the memory 10 in accordance with the output value or input value and the synapse weight, a total sum computation section 62, and a search section 61 for searching for a sigmoid function value from the memory 10 in accordance with a total sum of product values.

FIG. 15 shows a detailed configuration of a part of the neural network 6'. In FIG. 15, the configuration of the network 6' is shown as an example for securing the coupling between neurons $y_i$ to $y_n$ of the intermediate layers and the output neurons $z_1$.

The section 63, which is supplied with the output value $y_1$ of a neuron of the intermediate layer and the synapse value $w_{11}$, determines the product $y_1 \times w_{11}$ without any product computation by reference to the above-mentioned product value table 10-1. The total sum computation section 52 is supplied with the output values of all the neurons of the intermediate layer and outputs the total sum thereof. The search section 61 is for determining a value of the sigmoid function without any non-linear computation by reference to the above-mentioned sigmoid function value table 10-2.

The recalling time $T^{parallel}$ of the neural network 6' is given as $T^{parallel} = t_1$ (processing time of input value $\times$ synapse weight) + $t_2$ (total sum processing time) +

$t_3$ (processing time of sigmoid function) + $t_4$ (processing time of output value of intermediate layer neuron $\times$ synapse weight coefficient) + $t_5$ (processing time of total sum) + $t_6$ (processing time of sigmoid function)

$= t_a + m \times t_{add} + t_a + l \times t_{add} + t_a$ $= 1004 \ (\mu s)$ $\approx 1 \ (ms)$ A processing time one thousands of that of the conventional system can be thus achieved.

FIG. 18 is a flowchart for explaining the recalling operation of the neural network 6' shown in FIG. 10. The output values of neurons of the intermediate layer are determined at steps 1802 to 1814, and the output values of neurons of the output layer, i.e., the output values of the high-speed neural network 6' at steps 1816 to 1826. Important steps included in this process are 1806, 1812, 1820 and 1826. Since steps 1806 and 1820 perform the same operation as steps 1812 and 1826 respectively, the process of steps 1806 and 1812 will be explained below.

(Step 1806)

The product of an input value $x''_i$ (b bits) obtained by normalizing information and a synapse weight $w_{ij}$ (c bits) is determined as $x''_i \times w_{ij}$. In the prior art, the range of input value $x'_i$ is indefinite and therefore there has been no way but to actually carry out the product computation. According to the present invention, however, the value $x'_i$ is normalized to b bits by the normalizing section 11, and therefore the computation result is obtained directly by searching the product value table 10-1 stored in the memory 10 in advance, in accordance with the b bits and c bits as an address.

(Step 1812)

The sigmoid function value for the total sum of the products determined above is calculated.

$$\delta(S) = \frac{1}{1 + e^{-S}}$$

An example associated with a general formula of the product and function values was described above. Additional explanation will be made using specific numerical values.

FIGS. 17A and 17B show an example in which both bit numbers of b and c are 11 and an effective range is set from $-1000$ to $1000$.

In the product value table 10-1a of FIG. 17A, the ordinate represents the neuron output value of $-1000$ to $1000$ and the abscissa the synapse weight of $-1000$ to $1000$, each product value being stored in each column. When the output value of a neuron is 998 and the synapse weight is 999, for instance, 997002 is search for directly as a product value.

The sigmoid function table 10-2a of FIG. 17B is one-dimensional and as many memory areas as the product of the synapse weight range, the neuron output value range and the maximum value P of the number of neurons of each layer in an object neural network 6' are secured in the table 10-2a. Since the maximum number of neurons is ten in this example, $-10,000,000$ to $10,000,000$ areas are available. Assuming that a value is S, the memory area has stored therein $$\delta(S) = \frac{1}{1 + e^{-(S/1000000)}} \times 1000$$

The value S is divided by 1,000,000 in order to effect dimensional adjustment, and is multiplied by 1,000 in order to set the range of the object neural network 6' at −1000 to 1000.

In this way, by disposing the tables 10-1a and 10-2a in the memory 10, the computations of the products and values of the non-linear function which consumed considerable time in the prior art are eliminated.

The degree of speed increase in the second modification described above will be evaluated quantitatively with reference to the recalling time. As a prerequisite for evaluation, assume that $t_a = 1$ ($\mu$s): Unit time of address search
$t_{add} = 5$ ($\mu$s): Unit time of sum computation
$t_m = 50$ ($\mu$s): Unit time of product/quotient computation The number of computations and the processing time for each procedure are as shown in FIG. 19.

Also assume that the number of neurons n, m and l for the respective layers of a neural network is n=m=l=100. Then the unit recalling time according to the prior art is given as $$T_A^{old} = t_{add} \times (2 \times (m + l)) + t_m \times$$

$$((n + 2) \times m + (m + 2) \times l)$$

$$= 5 \times (2 \times (100 + 100)) + 50 \times$$

$$((100 + 2) \times 100 + (100 + 2) \times 100)$$

$$= 1{,}022{,}000 \ (\mu s)$$

$$= 1{,}022 \ (secs)$$

In constrast, the recalling time for the neural network system according to the present invention is expressed as $$T_A^{new} = t_a \times (n \times m + m \times l) + t_{add} \times (m + l)$$

$$= 1 \times (100 \times 100 + 100 \times 100) +$$

$$5 \times (100 + 100)$$

$$= 21{,}000 \ (\mu s)$$

$$= 0.021 \ (secs)$$

It is seen that the processing time according to the present invention is one fiftieth that required in the prior art.

FIG. 20 is a block diagram showing a configuration of the third modification of the neural network section 5 combined with the second modification.

The section 5 includes a normalizing section 11, a high-speed neural network 6', a memory 10, a control section 8 and an asphyctic synapse/neuron removing section 9. Since this modification has the operation of the second modification at the same time to achieve dual effects, an even higher speed of a learning unit is realized.

The present invention, which is configured as described above, is adapted to optimize a neural network as redundant asphyctic synapses/neurons not contributing to recalling are removed by the removing section 9.

Also, the normalizing section 11 makes it possible to replace the computation of the product of a neuron output and synapse weight and that of non-linear function (sigmoid function) by the above address search process. As a result, the learning and recalling of the neural network are remarkably increased in speed. This in turn leads to the advantage that the neural network is applicable also to real-time control and diagnosis of a process unlike in the prior art. Taking this effect into consideration, it can be said that the function of qualitative evaluation has remained while removing the normalizing function from the section 2 shown in FIG. 1.

Further, if the address search is synchronously executed in parallel for each layer, an even higher speed is achieved.

Now, the fourth embodiment of the neural network section 5 of the neural netowrk system 1 according to the present invention will be explained with reference to FIGS. 21 to 26.

This embodiment is presented considering the characteristics of an object that will be described. Some processes (which may or may not be due to a natural event) have and others have not, a direct causal relationship between a multiplicity of quantitative and qualitative process data varying in accordance with the behaviour of the process. Specifically, all the events expressed by given data are not organically connected in a process, but the whole motion is determined by an accumulation of causal relations between events. In the present invention, the "causal relation" is defined as a fact that an event in a given step of a process provides a direct cause of another event in a subsequent step, and the events have the relation of cause (or a part thereof) and effect (or a part of thereof).

According to the present embodiment, a subneural network 7-2 having a unit as the direct qualitative causal relation between events handled as variables in the statement of an object (hereinafter called the "subnetwork") is used as a basic configuration. By accumulating subnetworks, qualitatively meaningless connections are removed and an optimized neural network is constructed. In other words, according to the present embodiment, a qualitative causal relation between variables, i.e., directly-coupled neurons are defined on the basis of a qualitative causal network providing a method of statement of a qualitative model. This definition is extended sequentially to neurons of each layer, to thereby construct the neural network. As a result, the method of learning in the neural network according to the present embodiment handles the processing only between the neurons whose coupling is defined by the initial qualitative causal relation, and the method of recalling thereof is related to the processing only between the neurons connected by the qualitative causal relation.

FIG. 22 is a diagram showing a functional configuration of the neural network section 5 according to the present embodiment, for effecting the learning and recalling as applied to an expert system. This system includes a neural network section 5 having a control section 8 for computation or control operations in accordance with a program and a memory 10' for storing a program and data, a man-machine unit 27 for displaying the result of processing and a designation input by an operator, an input unit 25 for inputting input data or a teacher data for learning, and an output unit 26 for outputting recalled data. The network section 5 includes a defining section 12 for defining a neural network 6'', neural network 6'' for executing the learning or recalling, the memory 10' for storing parameters of the neural network defined or learned, and the control section 8 for controlling these units and sections directly or through interfaces 19-1 and 19-2.

FIG. 21 is a block diagram showing a configuration of the neural network section 5. The neural network 6", when learned information evaluated pattern x' is input thereto by the control section 8, computes a value of the non-linear function for the total sum of the product values of the output values of neurons and synapse weights for each neuron and outputs an output value pattern h'(x). The section 5 includes a weight-correcting section 7 for correcting each synapse weight in such a manner as to minimize the error between known teacher information evaluated pattern d'(x) and the output value pattern h'(x).

In the network section 5 configured in this way, the definition of the neural network determines the connection of the synapses of the neural network shown at the lower part of FIG. 30 on the basis of the qualitative causal network shown at the upper part of FIG. 30. The qualitative causal network here means that it hierarchically described the coupling from input information to output information in a model of a process or the like on the basis of the qualitative causal relation between a multiplicity of information (which can be expressed by variables for statement) representing events. Such a qualitative causal network, though the quantitative expression thereof by equations or the like is difficult, can be utilized as a model in the case of qualitative inference by an empirical or fuzzy rule for an object for which the input-output causal relation is known to some extent. An actual example of this model is described in detail in JP-A-1-243102.

The qualitative causal network shown at the upper part of FIG. 30 is comprised of first to third layers, and a variable set representing an event (information) is described by numerals ① to ⑦. An input to the causal network corresponds to input variables ① to ④ of the first layer, the output of the network to the output variable ⑦ of the third layer, and the variables ⑤ and ⑥ of the second layer to the output variable of the first layer. In FIG. 30, the numbers with # at the upper left part of the variables indicate serial numbers of the variables for each layer. With regard to the qualitative causal relation between variables, the variables ①, ② and ⑤ represent a logic product (AND), and the variables ③, ④ and ⑥ a logic product (AND) and the variables ⑤, ⑥ and ⑦ a combination (COMB).

The neural network 6" is such that in a three-layered structure of input, intermediate and output layers as shown at the lower part of FIG. 30 and the neurons ① to ⑦ are defined as corresponding to the variables ① to ⑦ of the qualitative causal network, and only neurons corresponding to causal network variables connected to each other are connected by weighted synapses a to f. As a consequence, the neurons ① and ② of the input layer are connected to the neuron ⑤ of the intermediate layer by the synapses a and b, to thereby make up a single subnetwork. Also, the neurons ③ and ④ are connected to the neuron ⑥ of the intermediate layer by the synapses c and d, thereby to make up another subnetwork. The neurons ⑤ and ⑥ of the intermediate layer are connected to the neuron ⑦ of the output layer, thus constituting another subnetwork. In this way, the neural network is defined in such a manner that a plurality of subnetworks in the same layer are arranged in parallel independently of each other and connected in series to the subnetworks with another layer. This system is thus configured in the same manner as if a causal network is transplanted to the neural network in a projection manner.

Next, referring to FIG. 23, explanation will be made about the processing steps of the defining section 12 for defining (constructing) a neural network from the qualitative causal network shown in FIG. 30.

Step 2302: A variable of a qualitative causal network is defined. At this step, all the variables No. (assigned with serial numbers from input side) of the qualitative causal network, variable names and the like are set from the man-machine unit 27, and are stored in a qualitative causal network table 10-3 as shown in FIG. 24A.

Step 2304: A qualitative causal relation is defined. By use of the variable No. defined at step 2302, the minimum unit of the qualitative causal relation between a plurality of input variables and a single output variable is set in the causal relation table group 10-4 as shown in FIG. 24B.

Step 2306: The qualitative causal network is defined. From the table group 10-4 shown in FIG. 24B, a variable No. appearing only as the input variable No. is assigned to the first layer, the variable No. appearing only at the output variable No. to the final layer, and the other variables to each layer sequentially automatically from the qualitative causal relation thereof, so that the variable No. for each layer shown in FIG. 24C and the sequence thereof are stored in the definition table 10-5, thereby defining the causal network. Since a variable No. is assigned in the order of serial number, automatic definition is possible even when a variable is involved over a layer.

Step 2308: A neuron is defined. The same neuron number (assigned as a serial number) and the name thereof are generated automatically in the neuron table 10-6 as shown in FIG. 25A. The variable and neuron are not necessarily at a ratio of 1:1, and even if the ratio is 1:n (n=1, 2, ...) for each variable, this will be explained with another embodiment.

Step 2310: The correspondence between neuron and variable is defined. With regard to all the variable No. set at step 2302, the neuron No. automatically generated in the neuron variable table 10-7 at step 2308 is set in correspondence automatically as shown in FIG. 25B.

Step 2312: The synapse connection is defined. As the final step, a synapse connection between neurons are defined by the flow shown in FIG. 26 and is stored in a synapse connection table group 10-8 shown in FIG. 27. The synapse connection table group 10-8 is entirely initialized without any connection at step 2602. At step 2604, subsequent processes are repeated from the second to the final (maximum) layer, followed by step 2606 where the subsequent processes are repeatedly executed from the minimum neuron No. to the maximum neuron No. of the particular layer. At step 2608, a determining section for determining presence or absence of synapse connection determines whether a particular neuron is connected with the neuron of the preceding layer on the basis of the qualitative causal relation table group 10-4. In the case of FIG. 30, the neuron No.=⑤ (j=1) of the second layer, the neuron No.=① (i=1) of the first layer and the neuron No.=② (i=2) have a causal relation, and therefore, "1" is stored at the areas of i=1, j=1 and i=2, j=2 the second layer (i, j) file in FIG. 27.

As a synapse connection table group 10-8, there are prepared the second-layer (i, j) file for the connection states between the first and second layers of the neural network, and the third-layer (j, k) file for the connection states between the second and third layers. In this way, all tables up to the final layer are prepared. The number of neurons of each layer is determined from the definition table 10-5 of the qualitative causal network defined at step 2306 and the correspondence relation between the neuron No. and the variable No. in the neuron variable relation table 10-7 defined at step 2310. In the case of the neural network and the qualitative causal network shown in FIG. 30, n=4, m=2 in the second-layer (i, j) file, and m=2, l=1 in the third layer (j, k) file. The excitation degree of the neurons in the learning/recalling described later is computed only between connected neurons with reference to the abovementioned file.

As will be seen from the foregoing description, according to the present invention, a definition is made automatically on the basis of the causal relation between variables and the variables of the qualitative causal network, and an optimized neural network 6″ is configured free of wasteful connections which died in the learning of the prior art. Each table in steps 2302 to 2312 and the network shown in FIG. 30 is displayed in the man-machine interface unit 27 and therefore the definition can be confirmed by the operator.

Now, explanation will be made about a method of learning of the neural network according to the present invention. The method of learning is based on the well-known error back propagation learning method. As shown in FIG. 21, in the case where a learned information evaluated pattern X′ {=$x_1, x_2, \ldots x_n$} and a teacher information evaluated pattern d′(x) for the pattern x′ are given, a defined neural network 6″ is subjected to learning in a manner similar to steps (1) to (4) described above. Therefore, explanation will be omitted.

In the error back propagation learning method, the number of computations of the products of the synapse weights and the neuron outputs shown in equations (1) and (3) is enormous in the conventional neural network with all neurons connected as shown at the upper part of FIG. 28. In the neural network 6″ according to the present invention, in contrast, as shown at the lower part of FIG. 29, the synapse connections between adjacent layers as between input and intermediate layers or between intermediate and output layers are divided into two including finite subsets (Xa), (Yb) and (X-Xa), (Y-Yb) of neurons. Therefore, the computation of equation (1) is divided into $$y_j = \sigma(wa_{1j}xa_1 + wa_{2j}xa_2 + \ldots + w n_j \times n) \ (j=b+1, \ldots, m)$$

$$y_j = \sigma(w_{0j} + w_{1j}x_1 + w_{2j}x_2 + \ldots + wa_{j}x_a) \ (j=1, \ldots, b)$$

and the number of product computations is reduced by one half as compared with that before division of the upper part of FIG. 28, i.e., equation (1). Of course, division by a factor of n reduces the number of product computations to 1/n, and therefore the learning can be effected with a correspondingly higher speed.

Now, explanation will be made about the fact that an optimized neural network according to the present invention is configured not merely by reducing the synapse connections but also by holding the characteristics (qualitative causal relation) of a qualitative causal network.

The upper part of FIG. 29 shows an example of the fuzzy inference model called the "MAX-MIN combination method" stated by the qualitative causal network. In the conditional section of the method of inference the qualitative relation of AND is satisfied, that is "if $x_1$ and $x_2$ then y, ty=MIN ($ty_1, ty_2$)", and the minimum one of the adaptability $ty_1$ of the variable $x_1$ and that of the variable $x_2$ is used as an adaptability ty of the variable y. The inference of adaptability at the conclusion section, on the other hand, is associated with the qualitative relation of a combination (COMB), so that the maximum one of $ty_1, ty_2$, that is, "if $x_1$ then y ($ty_1$), if $x_2$ then y ($ty_2$), ty=MAX ($ty_1, ty_2$)", is used as an adaptability ty of the variable y. Although this fuzzy inference model is superior in modelling a process not quantitatively grasped, a long time is required for tuning of membership functions providing a formula relating to the process quantity and adaptability, thus making application difficult to a complex process.

As shown in FIG. 29, on the other hand, according to the learning of the present invention, $$S = w_0 + w_1 x_1 + w_2 x_2, \ ty = \sigma(S),$$

where S is the sum-of-products function for the process quantities $x_1$ and $x_2$, and ty the adaptability of the output value. Thus the relation between AND and COMB described above is reflected in the synapse connections (weight $w_1, w_2, \ldots$) in the process of learning, with the result that the weights at the time of convergence are adjusted in association with these qualitative relations. This indicates that conversions of the process quantity and the process control quantity are embodied as the neural network adjusted to optimum values of weights and is virtually equivalent to the transplantation of the qualitative causal network.

After the learning is completed, the synapse weights are fixed, so that the neural network makes up a recalling unit for an actual system. As shown in the embodiment of FIG. 21, the recalling unit is supplied with input data through the input unit 25 for adapting to the input layer of the neural network and computes the same forward propagation as in the learning steps (1) and (2) described above. In the process, the recalled output obtained from the output layer provides a prediction for the present input and the diagnosis result for the causal input, and is output and converted appropriately through the output unit 26. It may alternatively be displayed on the man-machine interface unit 27.

The recalling according to this embodiment, in which the synapse connections of the neural network are optimized from dual viewpoints of processing speed and accuracy, improves both the processing characteristic of recalling and accuracy at the same time. Further, the qualitative inference equivalent to the fuzzy inference is easily realized without using any membership function.

According to the present invention, the minimum unit of the causal relation between variables is set to subnetworks which are accumulated to constitute a neural network. As a result, the neural network is provided in which the synapse connections are reduced remarkably, while improving the processing characteristics and accuracy of learning/recalling. Further, since the connections (synapse weights) of the neural network are obtained as the result of substantial transplantation of the causal relation of a qualitative causal network, a qualitative inference equivalent to the fuzzy inference can be realized. In addition, not much time is required for tuning the membership functions unlike in the fuzzy inference, thereby leading to the advantage of easy applicability to the diagnosis and control of a complicated process.

The description made above has referred to a neural network system in which the neural network section 5 is connected with the fuzzy unit 2 for inputting a learned-/unknown information pattern, the quantifying section 3 for quantifying the output from the section 5, and the fuzzy unit 4 for inputting a teacher information pattern. However, it is appreciated that the neural network system can be constructed of only the neural network section 5 according to any of the first to fourth modifications without the fuzzy sections 2 and 4, and the quantifying section 3. Therefore, when the neural network system using only one of the fuzzy units 2 and 4 can be obtained the similar effect depends upon an object to be recalled.

FIG. 31 shows a configuration of the neural network system for subjecting only an input to qualitative evaluation. FIG. 32 is a diagram for explaining an operation of this system. The learning of a change in indoor temperature due to an air-conditioner is effected in accordance with a learned information pattern including a known indoor temperature deviation $\Delta T_{in}$, an outdoor temperature deviation $\Delta T_{out}$ and an air-conditioner operation deviation $\Delta CL$, after a predetermined time period, and a known indoor temperature deviation $\Delta T_{in}$ after the predetermined time period as a teacher information pattern. In this case, as shown in FIGS. 33A, 33B and 33C, the temperature deviation of indoor or outdoor temperature is in a range of $\pm 5°$ C. and that of the air-conditioner is in the range of $\pm 20°$ C., and these deviations have different non-linear characteristics. As a result, inputting information data in its direct form would make convergence difficult in some cases.

For this reason, each input information is subjected to a qualitative evaluation (doubling as a normalization) by a predetermined fuzzy membership functions based on experiences or actual measurements, and the resulting evaluation is input to the neural network 6, whereby the features of each information can be extracted in satisfactory manner for an improved learning accuracy and efficiency at the same time.

FIG. 34 shows a configuration of the neural network system for quantitative evaluation of an output alone. This system is suitable for homogenous time series information (voice, image or the like). FIG. 35 is a diagram for predicting a change in stock price for the next day from a information group (widths of change $\Delta P_{i-n}$, where n=0, 1, 2, . . .) of the past stock price change widths (yen) on daily basis. In the case where the behavior of past changes is oscillatory or gradually expansive (triangular change), a non-linear change is involved. In such a case, if a recalled data is defined from an output of only one neuron, it would result in delayed convergence and deteriorate accuracy.

In this case, three neurons are used for the output layer, for example, and define evaluation types of evaluations, i.e., "up (+)", "same (0)" and "down (−)", respectively. On the other hand, a known stock price change width $\Delta P_{i+1}$ for the next day as a teacher information pattern is qualitatively evaluated by the fuzzy unit 4 to generate the above-mentioned three types of evaluations, a pattern including which is used as a teacher information evaluated pattern. As a consequence, the non-linear characteristics between input information can be grasped sufficiently, to thereby improve both the accuracy and speed of learning. This is because the inherent ability of the forward neural network 6 to grasp non-linear features is reasonably utilized by defining outputs from the neurons of the output layer as qualitative values.

In the case where a recalled output is to be obtained as a quantitative value or requires no quantitative conversion, the quantifying section 3 may be omitted. Also, when a qualitative evaluation is recalled or inferred from input information requiring no qualitative evaluation (as in the case of FIG. 35 above), the recalling may be effected with a configuration without a qualitative evaluation section 2. Further, in the case where a recalled output is generated as a quantitative value and it is desired to generate it as a qualitative evaluation, the quantifying section 3 may be replaced by a qualitative evaluation fuzzy section such as the section 2 in FIGS. 31 and 34.

FIGS. 36 to 42 are diagrams for explaining application of the present invention to actual processes.

A tunnel ventilation process as an object process is shown in FIG. 38. The ventilation process in a road tunnel has many indefinite elements and large non-linear elements, which make it difficult to obtain a satisfactory result from conventional control methods. An example of application of a neural network according to the present invention to pollution prediction in this process will be described below.

FIG. 36 shows input information to a pollution predicting system 30. Main factors determining a pollution change during a predetermined time period (A VI value representing the visibility, i.e., transmittance is used as a pollution index in this case, in such a way that the VI value ranging from 0 to 100% indicates a higher visibility as it approaches to 100%) include a change in the number of large-sized vehicles ($\Delta TB$, where $\Delta$ is a symbol indicating a change, defined as "present value minus preceding value"), a vehicle speed (TS), a pollution value change ($\Delta VI$), a change in mechanical ventilation capability ($\Delta M$), a change in traffic volume ($\Delta TR$) and natural wind ($W_N$). The latest prediction method using a fuzzy multi-stage inference is performed in practice. The accuracy of this method stands at about 0.72 in correlation coefficient, as shown in FIG. 39. The "correlation coefficient" is an index representing accuracy of a prediction value $VI_{c+1}^{predicted}$ and an actual measurement $VI_{c+1}^{actual}$ at time point tc, as shown in FIG. 40.

FIG. 37 shows a configuration of a pollution prediction system according to the present invention. A learned information pattern X includes the data $\Delta TB$, $TS$, $\Delta VI_c$, $\Delta M$, $\Delta TR$ and $W_N$. These six types of data are subjected to qualitative evaluation by the fuzzy unit 2 according to an empirically-determined membership functions representing three types of qualitative evaluations, i.e., "down (−)", "unchanged (0)" and "up (+)". The number of neurons of the input layer of the neural network 6, therefore, is 18. On the other hand, the pollution level change measurement $\Delta VI_{c+1}^{actual}$ after a predetermined time period, which is known, is also qualitatively evaluated by the fuzzy unit 4 by use of the empirically-determined membership functions.

The weight-correcting section 7, using the data qualitatively evaluated by the section 2 as the learned information pattern, is supplied with a qualitative evaluation of the measurement $\Delta VI_{c+1}^{actual}$ from the section 4 as a teacher information pattern and correct the synapse weights of the neural network 6 according to the steps mentioned above to conduct the learning.

The synapse weights of the neural network 6 after learning has been completed, are fixed in the manner mentioned above.

In the recalling process, the fuzzy unit 2 and the forward neural network 6 perform the same operation as in the learning process. The neural network 6 outputs from the neurons of the output layer seven types of evaluations including $N_{NL}$ ($\Delta VI_{c+1}$) (considerably down), $N_{NM}$ ($\Delta VI_{c+1}$) (down) $N_{NS}$ ($\Delta VI_{c+1}$) (rather down), $N_{ZO}$ ($\Delta VI_{c+1}$) (unchanged), $N_{PS}$ ($\Delta VI_{c+1}$) (slightly up), $N_{PM}$ ($\Delta VI_{c+1}$) (up) and $N_{PL}$ ($\Delta VI_{c+1}$) (considerably up) on the pollution value change $\Delta VI$. The quantifying section 3, which is supplied with these data, quantifies these evaluations by use of membership functions determined on the basis of empirical data and outputs a pollution change prediction value $\Delta VI_{c+1\text{-}predicted}$ as an output of the predicting system. FIG. 41 shows a specific example of such operation, in which qualitative evaluations including $N_{NB}(\Delta VI_{c+1}) = 0.082$
$N_{NM}(\Delta VI_{c+1}) = 0.102$
$N_{NS}(\Delta VI_{c+1}) = 0.113$
$N_{ZO}(\Delta VI_{c+1}) = 0.932$
$N_{PS}(\Delta VI_{c+1}) = 0.221$
$N_{PM}(\Delta VI_{c+1}) = 0.110$
$N_{PB}(\Delta VI_{c+1}) = 0.085$ i.e., the neuron output values of the output layer, are used to predict the increase of a qualification value of +1.6 (%).

According to a pollution predicting system of the present invention, as shown in FIG. 42, the correlation coefficient between prediction value and measurement is 0.85, indicating a remarkable improvement as compared with the conventional methods.

In the pollution predicting system according to the present invention described above, the inference rule for the conventional fuzzy inference system is replaced by a neural network, and a recalling system according to the present invention, i.e., a neural network system combining the qualitative evaluation of input data with the quantification of the recalled result realizes a novel fuzzy inference system.

An example of application of the present invention to a pollution predicting/exhausting system will be explained.

A process control method according to the present invention conducts a qualitative prediction of a process behaviour by use of a neural network including a transplant of a qualitative causal network instead of the fuzzy theory, for instance.

A pollution predicting/exhausting system as a process control system will be explained with reference to FIGS. 43 to 48. FIG. 38 is a schematic diagram showing a tunnel ventilation process as an example of actual process. The tunnel ventilation control is intended to determine and control the operation quantity of a duster and a jet fan and to maintain the pollution within a reference range by predicting a pollution quantity VI of smoke (soot) from process quantities such as traffic volume.

FIG. 43 shows a configuration of a process control unit 30' according to the present embodiment and an example of application to a tunnel ventilation process. An inference section 35 similar to the neural network section 5 is configured of input-output interfaces 39-1, 39-2 and a neural network 36 optimized by a causal network, and is connected with a process 40 through a process input unit 31 and a process output unit 32.

The inference section 35 is supplied periodically (at intervals of five minutes in the case under consideration) from the process input unit 34 with a change $\Delta TBt$ (vehicles/five min) of the number of large-sized vehicles, a vehicle speed change $\Delta TRt$ (vehicles/five min), a pollution change $\Delta VIt$ (%), a traffic volume change $\Delta TRt$ (vehicles/five min), a natural wind velocity $WNt$ (m/s) and a change in mechanical ventilation (m$^3$/s), at a time point t (current), which are measured by a process quantity measuring unit 41 (each change is determined as a difference from the preceding value). Each process quantity is adapted at the interface 39-1 and input to the neural network 36. The neural network 36 predicts the pollution change $\Delta VI_{t+1}$ at a time point (t+1) by the steps (1) and (2) mentioned above in such a manner as to maintain the pollution level within a reference level the process output unit 32 determines and outputs to a control unit 42 an operation quantity (a quantity variable from the present control quantity) of the control unit 42 from the pollution change $\Delta VI_{t+1}$. At this time the recalling computation is conducted in accordance with the synapse connections.

Now, explanation will be made about a qualitative causal network for the tunnel ventilation process and a method of configuring the neural network 36 based thereon. FIG. 44 shows a qualitative causal network for a tunnel ventilation process. The change in the number of large-sized vehicles, vehicle speed and pollution level from a time point (t−1) to the current time point are in causal relation with the pollution level change in tunnel. The change in traffic volume and mechanical ventilation and the natural wind velocity, on the other hand, is causally related with the overall ventilation capacity change. Further, the pollution level change in tunnel and the overall ventilation capacity change are in causal relation with the predicted pollution level change at a predetermined time later (t+1). The data representing process factors and the causal relation thereof are obtained in this way as empirical data from a causal network.

FIGS. 45A, 45B and 45C show an example in which variables, causal relation and qualitative causal network are defined from this qualitative causal network at steps 2302 to 2306 in FIG. 23. FIG. 45A is a table for storing variables Nos. 1 to 9 corresponding to the process quantities mentioned above and names thereof with appropriate values of upper and lower limits of each variable. FIG. 45D shows definition of the causal relation in minimum unit and the process quantities are divided into a subnetwork of variables 1, 2 and 3 of the first layer and variable 7 of the second layer and another subnetwork of variables 4, 5 and. 6 of the first layer and the variable 8 of the second layer. In FIG. 45C, on the other hand, the respective variables are arranged in order of serial numbers in a layer unit and a configuration of a qualitative causal network is defined.

FIGS. 46A, 46B, 46C-1 and 46C-2 are for defining the relation between neurons and variables and the synapse connections at steps 2308 to 2312. In the tunnel ventilation process, when a process quantity is normalized by the interface 39-1 and input to the neurons of the input layer, three types of evaluations including $\mu+$ (up), $\mu 0$ (unchanged) and $\mu-$ (down) are used for the normalization for neuron inputs. The normalization is performed by use of membership functions (empirically determined in advance) representing the adaptability $\mu$ (a value of 0 to 1) of the process quantity for each evaluation (+, 0, −), for instance. Nevertheless, an ordinary linear normalizing method may be performed.

As a result, as shown in FIG. 46A, evaluations including N-TBt, Z-TBt and P-TBt, for example, are input to the neurons Nos. 1 to 3 as a change ΔTBt in the number of large-sized vehicles. According to the present embodiment, neurons corresponding to three types of evaluations are arranged for a process quantity of the second layer, as in the case of the input layer, as compared with seven neurons corresponding to seven types of evaluations arranged for the output layer. Specifically, the predicted pollution level change $\Delta VI_{t+1}$ is evaluated according to the criteria including $\mu nl$ (considerably down), $\mu nm$ (down), $\mu ns$ (slightly down), $\mu z0$ (unchanged), $\mu ps$ (slightly up), $\mu pm$ (up) and $\mu pl$ (considerably up), and the resulting adaptability value $\mu$ is output to the neurons Nos. 25 to 31. FIG. 46B shows a correspondence relation between the variable No. and neuron No. of the causal network, and the relation between variables and neurons is defined as 1:n (n=1, 2, ..., n) by a parameter n set in advance. FIGS. 46C-1 and 46C-2 show a synapse connection table group. In the synapse connections of the neurons in the second layer, the neurons Nos. 1 to 9 of the first layer are interconnected with the neurons Nos. 19 to 21 of the second layer (serial Nos. 1 to 3 for the second layer), and the neurons Nos. 10 to 18 of the first layer are interconnected with the neurons Nos. 22 to 24 of the second layer (serial Nos. 4 to 6 for the second layer), each constituting a subnetwork.

FIG. 47 is a diagram showing the neural network 36 constructed according to the above definitions. In this example, the neurons of the input and intermediate layers are divided into two subnetworks, and therefore only synapses indicated by a solid line are actually connected. As a result, the number of synapses is reduced from 108 (=18×6) connections indicated by the solid and dotted lines to 54 (=9×3+9×3) by one half, thereby improving the processing capability remarkably for subsequent learning/recalling operations.

The neural network initially defined in this way has the synapse weights thereof determined by the learning of a teacher information pattern based on actual measurement data of a tunnel process, and after a qualitative causal network of a tunnel ventilation process is substantially transplanted, is incorporated into an inference section 35 of the process control unit. The seven adaptability values from the neurons of the output layer are inversely transformed from a fuzzy quantity by the interface 39-2 into a quantitative value, so as to determine a predicted pollution level change. This inverse transformation is effected by a defuzzy section similar to the above quantifying section by the center-of-gravity computation conducted when each adaptability value crosses a corresponding membership function in an evaluation unit.

FIG. 48 is a graph plotting the time along the abscissa and the transmittance TI (reciprocal of pollution level VI) in tunnel along the ordinate for explaining the operational relation between TI and the ventilation control unit. The thick solid line represents an actual measurement of TI, and a double line a prediction value of TI according to the inference unit 31. Also, the target range of TI is set to 30% in upper limit and 40% in lower limit.

An actual TI measurement (=49%) at the current time 16:50 or the like is input and the TI five minutes later (16:55) is predicted to be 42%. If the current operating condition is maintained, the TI value is liable to be reduced soon below the lower limit thereof. To meet this situation, in accordance with the error between the current and predicted values or in such a manner as to secure a value intermediate of the target range (dotted line), the power or the number of units in operation of the dust collectors or jet fans is determined by the process output unit 32, thereby controlling the control unit 42 real time (16:50), with the result that the actual measurement at 16:55 is improved to 57%.

The optimization of a neural network improves the effect of shortening the recall time as the increase in the complexity of a process and input data as in the present embodiment, thereby making possible a real-time prediction control. As a result, the tuning of membership functions for fuzzy control in a complicated process which requires as long as one year or two in the prior art is processed within one day or two by the learning of a neural network with equivalent accuracy according to the present invention.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. A neural network system comprising:
    qualitative evaluation means for qualitatively analyzing unknown data supplied thereto and normalizing the qualitatively analyzed unknown data within a predetermined range;
    computing means, including a neural network having a plurality of neurons, for computing desired data from the normalized unknown data from said first qualitative evaluation means, each neuron being connected to other neurons through synapses, each synapse being given a weight, each neuron outputting a value of an output function given to the neuron in accordance with a total sum of product values of output function values from said connected neurons and said synapse weights,
    wherein said computing means further includes:
        means for storing a causal network representing qualitative causal relation between the unknown data and the desired data, and
        network defining means for defining said neural network by connecting neurons through synapses in accordance with the causal network; and
    quantitative evaluation means for quantitatively analyzing desired data received from said computing means and outputting the quantitatively analyzed desired data.

2. A neural network system according to claim 1, wherein said computing means further comprises:
    removing means for removing computation on the synapses whose weights are smaller than a predetermined value and a neuron, weights of the synapses connected to which are smaller than said predetermined value, from the computation of the desired data based on the analyzed unknown data.

3. A neural network system according to claim 1, wherein said computing means further comprises:
    table storage means for storing a product value table which stores product values and a function value table which stores output function values; and means for determining a product value for each output function value of neurons connected to said each neuron with reference to said product value table, determining a total sum of the product values, and determining an output function value of neurons with reference to the function value table according to the total sum.

4. A neural network system according to claim 3, wherein the neurons of said neural network are layered, and said computing means further includes means for causing said neural network to synchronously perform processing for referring to said product value table, processing for determining the total sum, and processing for referring to said function value table, in units of layered neurons.

5. A neural network system according to claim 3, wherein said computing means further comprises:

removing means for removing computation on the synapse whose weight is smaller than a predetermined value and a neuron, weight of the synapse connected to which are smaller than the predetermined value, from computation of the desired data from the unknown data.

6. A neural network system comprising:

first evaluation means for qualitatively analyzing unknown data supplied thereto;

computing means, including a neural network having a plurality of neurons, for computing desired data from the qualitatively analyzed unknown data output from said first evaluation means, each neuron being connected through synapses to other neurons, each synapse being given a weight, each neuron outputting an output function value in accordance with a total sum of products of output function values from the connected neurons and synapse weights, wherein said computing means further includes:

means for storing a network of qualitative causal relation between unknown and desired data, and network definition means for defining the neural network by connecting neurons through synapses in accordance with the qualitative causal network; and second evaluation means for quantitatively analyzing desired data received from said computing means and outputting the result of analysis.

7. A neural network system according to claim 6, wherein said computing means further comprises:

removing means for removing computation on the synapse whose weight is smaller than a predetermined value, and a neuron, weights of the synapses connected to which are smaller than said predetermined value, from computation of the desired data from the analyzed unknown data.

8. A neural network system according to claim 6, wherein said computing means further comprises:

table storage means for storing a product value table which stores product values and a function value table which stores output function values; and means for determining the product value for each output function value of neurons referring to the product value table in response to the supply of the output function values of the neurons connected to sail each neuron, determining the total sum of the product values, and determining an output function value with reference to the function value table associated with the total sum thereby to determine the output function value of the particular neurons.

9. A neural network system according to claim 8, wherein the neurons of the neural network are tiered, and said computing means further includes means for determining the output function value of the neurons in a given tier with reference to the function value table subsequent to the product value table in synchronism with the particular neurons.

10. A neural network system according to claim 8, wherein said computing means further comprises:

removing means for removing synapses of the neural network means whose weight coefficients are smaller than a predetermined value, and also a neuron and synapses connected thereto whose weight coefficients are all smaller than a predetermined value, from the computation of desired data based on unknown data.

11. A neural network system comprising:

fuzzy means for fuzzy conversion of an unknown data supplied thereto;

neural network means including a neural network having a plurality of neurons for computing the network output data from the unknown data fuzzy-converted by said fuzzy means, each neuron being connected through synapses to other neurons, each synapse being given a weight coefficient, each neuron being adapted to output an output function value assigned thereto associated with the total sum of the products of the output from the neurons connected and the synapse weight coefficient, wherein said neural network means further includes:

means for storing a network of qualitative causal relation between unknown and desired data, and network definition means for defining the neural network by connecting neurons through synapses in accordance with the qualitative causal network; and defuzzy means for defuzzy-converting output data of said neural network means and outputting a desired data.

12. A neural network system according to claim 11, wherein said neural network means further comprises:

removing means for removing synapses in the neural network whose weight coefficients are smaller than a predetermined value and a neuron, weights of the synapses connected thereto which are all smaller than a predetermined value, from the computation of the network output data based on unknown data.

13. A neural network system according to claim 11, wherein said neural network means further comprises:

table storage means for storing a product value table which stores product values and a function value table which stores output function values, and means for determining the product value for each output function value of neurons with reference to the product value table in response to the supply thereto of the output function value of neurons connected to each neuron, determining the total sum of the product values, and determining an output function value with reference to the function value table associated with the total sum to thereby determine the output function value of the particular neurons.

14. A neural network system according to claim 13, wherein
   the neurons of said neural network are layered, and
   said neural network means further includes means for determining the output function value of the neurons in a given layer with reference to the function value table subsequent to the product value table in synchronism with the particular neurons.

15. A neural network system according to claim 13, wherein said neural network means further comprises:
   removing means for removing the synapses of the neural network whose weight coefficients are smaller than a predetermined value, and also a neuron and synapses connected thereto whose weight coefficients are all smaller than a predetermined value, from the computation of desired data based on unknown data.

* * * * *